United States Patent
Kohda et al.

[11] Patent Number: 6,014,445
[45] Date of Patent: Jan. 11, 2000

[54] ENCIPHERING/DECIPHERING APPARATUS AND METHOD INCORPORATING RANDOM VARIABLE AND KEYSTREAM GENERATION

[75] Inventors: Tohru Kohda; Akio Tsuneda, both of Fukuoka, Japan

[73] Assignee: Kabushiki Kaisha Toshiba, Kawasaki, Japan

[21] Appl. No.: 08/734,919

[22] Filed: Oct. 22, 1996

[30] Foreign Application Priority Data

Oct. 23, 1995 [JP] Japan .................................. 7-274292
Apr. 22, 1996 [JP] Japan .................................. 8-099985

[51] Int. Cl.$^7$ .............................. H04L 9/20; H04K 1/06
[52] U.S. Cl. ................. 380/28; 380/42; 380/43
[58] Field of Search ................. 380/28, 42, 43; 364/717.01

[56] References Cited

U.S. PATENT DOCUMENTS

| | | | |
|---|---|---|---|
| 4,606,039 | 8/1986 | Nicolas et al. .............................. | 375/1 |
| 5,454,039 | 9/1995 | Coppersmith et al. ................... | 380/28 |
| 5,696,826 | 12/1997 | Gao ......................................... | 380/28 |
| 5,703,952 | 12/1997 | Taylor ...................................... | 380/44 |
| 5,796,836 | 8/1998 | Markham ................................. | 380/28 |
| 5,850,481 | 12/1998 | Rhoads .................................... | 382/232 |
| 5,872,864 | 2/1999 | Imade et al. ............................. | 382/176 |

OTHER PUBLICATIONS

C.E. Shannon, "Communication Theory of Secrecy Systems", Bell Syst. Tech. J., 28 656–715, 1945.

H.J. Beker and F.C. Piper, "Communications Security, A Survey of Cryptography", IEE Proc., 129, Pt. A, No. 6, 357–376, Aug. 1982.

D.E.R. Denning, "Cryptography and Data Security", (Chp. 2—Encryption Algorithms and Chp. 3—Cryptographic Techniques (pp. 59–190)), Addison–Wesley Publishing, 1982.

James L. Massey, "An Introduction to Contemporary Cryptology", Proc. IEEE, 76–5, pp. 533–549, May 1988.

K. Zeng, C.H. Yang, D.Y. Wei and T.R.N. Rao, "Pseudo-random Bit Generators in Stream–Cipher Cryptography", IEEE Computer, –2, 8–17, 1991.

H. Niederreiter, "Quasi–Monte Carlo Methods and Pseudo–Random Numbers", Bull. Am. Math. Soc., 84, 957–1041, 1978.

D. Knuth, "The Art of Computer Programming", vol. 2 Seminumerical Algorithms, 2nd Ed. (Chapter 3–Random Numbers (pp. 1–160)) (Addison–Wesley, Reading, Mass, 1981).

(List continued on next page.)

*Primary Examiner*—Tod R. Swann
*Assistant Examiner*—Justin T. Darrow
*Attorney, Agent, or Firm*—Finnegan, Henderson, Farabow, Garrett & Dunner, L.L.P.

[57] ABSTRACT

An enciphering apparatus embodying this invention comprises chaos generation means for generating a real-valued sequence along a chaotic orbit in accordance with a predetermined number of first common keys and a predetermined nonlinear map, bit generation means for performing predetermined binarization on each real value in the generated real-valued sequence based on a predetermined number of second common keys to generate a binary sequence, and logic operation means for executing a predetermined logic operation on a binary sequence of an input plaintext and the generated keystream sequence bit by bit to generate a binary sequence of a ciphertext. For example, the first common keys are an initial seed of a nonlinear map and a value of a parameter k, and the bit generation means acquires plural pieces of binary data for each real value in the real-valued sequence using values indicated by a plurality of second keys as thresholds and obtains exclusive OR of those binary data.

78 Claims, 32 Drawing Sheets

OTHER PUBLICATIONS

A. Yao, "Theory and Applications of Trapdoor Functions", Proc. the 23rd Annual Sympo. Foundations of Computer Science, 80–91, 1982.

M. Blum and S. Micali, "How to Generate Cryptographically Strong Sequences of Pseudo–Random Bits", SIAM J. Comput., 13, 850–864, Nov. 1984.

L. Blum, M. Blum and M. Shub, "A Simple Unpredictable Pseudo–Random Number Generator", SIAM J. Comput., 15, 364–383, May 1986.

L. Levin, "One–Way Functions and Pseudorandom Generators", Proc. the 17th Annual ACM Sympo. on Theory of Computing, 363–365, 1985.

O. Goldreich, S. Goldwasser and S. Micali, "How to Construct Random Functions", J. ACM, 33, 792–807, Oct. 1986.

T. Habutsu, Y. Nishio, I. Sasase, and S. Mori, "A Secret Key Cryptosystem by Iterating a Chaotic Map", Proc. Eurocrypt '91, 127–140, 1991.

L.M. Pecora and T.L. Carroll, "Synchronization in Chaotic Systems", Physical Review Letters, 64, 821–824, Feb. 1990.

K.M. Cuomo and A.V. Oppenheim, "Circuit Implementation of Synchronized Chaos with Applications to Communications", Physical Review Letters, 71, 65–68, Jul. 1993.

U. Parlitz and S. Ergezinger, "Robust Communication based on Chaotic Spreading Sequences", Physics Letters A, 188, 146–150, 1994.

E. Biham, "Cryptanalysis of the Chaotic Map Cryptosystem Suggested at EUROCRYPT '91", Eurocrypt '91, 532–534, 1991.

Th. Beth, D.E. Lazic and A. Mathias, "Cryptanalysis of Cryptosystems based on Remote Chaos Replication", Proc. Crypt '94, 318–331, 1994.

S.L. Ulam and J. von Neumann, "On Combination of Stochastic and Deterministic Processes", Bull. Math. Soc., 53, p. 1120, Nov. 1947.

D.S. Ornstein, "Ergodic Theory, Randomness and 'Chaos'", Science 243, pp. 182–186, 1989.

T. Kohda and A. Tsuneda, "Pseudonoise Sequence by Chaotic Nonlinear Maps and Their Correlation Properties", IEICE Trans. on Communications, E76–B, 855–862, Aug. 1993.

T. Kohda and A. Tsuneda, "Explicit Evaluations of Correlation Functions of Chebyshev Binary and Bit Sequences Based on Perron–Frobenius Operator", IEICE Trans. on Fundamentals of Electronics, Communications and Computer Sciences, E77–A, 1794–1800, Nov. 1994.

E. Atlee Jackson, "Perspectives of Nonlinear Dynamics", (Chapter 4–Models based on first order difference equations (pp. 142–225)), Cambridge Univ. Press, 1989.

A. Lasota and M.C. Mackey, "Chaos, Fractals and Noise" (Chapter 1–Introduction (pp. 1–15) and Chapter 6–The Behavior of Transformations on Intervals and Manifolds (pp. 139–188)), Springer–Verlag, 1994.

S. Oishi and H. Inoue, "Pseudo–Random Number Generators and Chaos", Trans. IEICE Japan, E65, pp. 534–541, Sep. 1982.

L.O. Chua, Y. Yao and Q. Yang, "Generating Randomness from Chaos and Constructing Chaos with Desired Randomness", Int. J. Circuit and Applications, 18, pp. 215–240, 1990.

A.R. Murch and R.H.T. Bates, "Colored Noise Generation Through Deterministic Chaos", IEEE Trans. on Circuits and Systems, 37, 5, pp. 608–613, May 1990.

G.M. Bernstein and M.A. Lieberman, "Secure Random Generation Using Chaotic Circuits", IEEE Trans. Circuits and Systems, 37–9, pp. 1157–1164, Sep. 1990.

R.L. Adler and T.J. Rivlin, "Ergodic and Mixing Properties of Chebyshev Polynomials", Proc. Amer. Math. Soc., 15, pp. 794–796, 1964.

T.J. Rivlin, "Chebyshev Polynomials—From Approximation Theory to Algebra and Number Theory", (Chapter4—Iterative Properties and Some Remarks About the Graphs of the Tn (pp. 192–216)), A Wiley–Interscience Publication, (1990).

S. Grossman and S. Thomae, "Invariant Distributions and Stationary Correlation Functions of One–Dimensional Discrete Processes", Z. Naturforsch. 32a, pp. 1353–1363, 1977.

T. Kohda and A. Tsuneda, "Auto–/Cross–Correlation Functions of Chaotic Binary/Bit Sequences", Proc. of International Conference on Dynamical Systems and Chaos, vol. 1, pp. 331–334, 1994.

T. Kohda and A. Tsuneda, "Statistics of Chaotic Binary Sequences", IEEE Trans. Information Theory, Jan. 1997 (submitted 1995).

Ross Anderson, "Fast Software Encryption", Lecture Notes in Computer Science, No. 809, (Stream Ciphers, pp. 41–63), Springer–Verlag, 1994.

M. Kac, "Statistical Independence in Probability, Analysis and Number Theory", The Carus Mathematical Monographs, No. 12, The Mathematical Association of America, 1959.

P. Billingsley, "Probability and Measure", (Chapter 1–Borel's Normal Number Theorem (pp. 1–17)), John Wiley and Sons, 1995.

C.M. Goldie and R.G.E. Pinch, Communication Theory, (Chapter 2.1—Introduction: Probability (pp. 34–37)), London Mathematical Soc. Student Texts, 20, Cambridge Univ. Press, 1991.

A. McGrail, "Randomness Properties of Two Chaotic Mappings", Cryptography and Coding III, edited by M.J. Ganley, Clarendon Press, Oxford, pp. 265–295, 1993.

A. Boyarsky and M. Scarowsky, "On A Class of Transformations Which Have Unique Absolutely Continuous Invariant Measures", Tran. Am. Math. Soc., vol. 255, pp. 243–262, Nov. 1979.

Smith, J.L., "High–Speed One–Bit Cipher Feedback Arrangement," in IBM Technical Disclosure Bulletin, vol. 26, pp. 2813–2816, Nov. 1983.

Vizirani, U.V. et al., "Efficient and Secure Pseudo–Random Number Generation," in 25th Annual IEEE Symposium on Foundations of Computer Science, pp. 458–463, Oct. 1984.

Dawson, E. in "Number Theory and Cryptography," Loxton, J.H. ed., Cambridge University Press, pp. 106–119, Mar. 1990.

Promise, J., "How Secure Is Encrypted Data?," in PC Magazine, vol. 13, No. 18, pp. 291–293, Oct. 1994.

Microsoft Press, "Computer Dictionary," 2nd Ed., p. 330, Mar. 1994.

| n | $\omega_n$ | 0. | $A_1(\omega_n)$ | $A_2(\omega_n)$ | $A_3(\omega_n)$ | $A_4(\omega_n)$ | $A_5(\omega_n)$ |
|---|---|---|---|---|---|---|---|
| 0 | 0.300000 | 0. | 0 | 1 | 0 | 0 | 1 |
| 1 | -0.820000 | 0. | 1 | 1 | 0 | 1 | 0 |
| 2 | 0.344800 | 0. | 0 | 1 | 0 | 1 | 1 |
| 3 | -0.762226 | 0. | 1 | 1 | 0 | 0 | 0 |
| 4 | 0.161977 | 0. | 0 | 0 | 1 | 0 | 1 |
| 5 | -0.947527 | 0. | 1 | 1 | 1 | 1 | 0 |
| 6 | 0.795615 | 0. | 1 | 1 | 0 | 0 | 1 |
| 7 | 0.266007 | 0. | 0 | 1 | 0 | 0 | 0 |
| 8 | -0.858481 | 0. | 1 | 1 | 0 | 1 | 1 |
| 9 | 0.473978 | 0. | 0 | 1 | 1 | 1 | 1 |

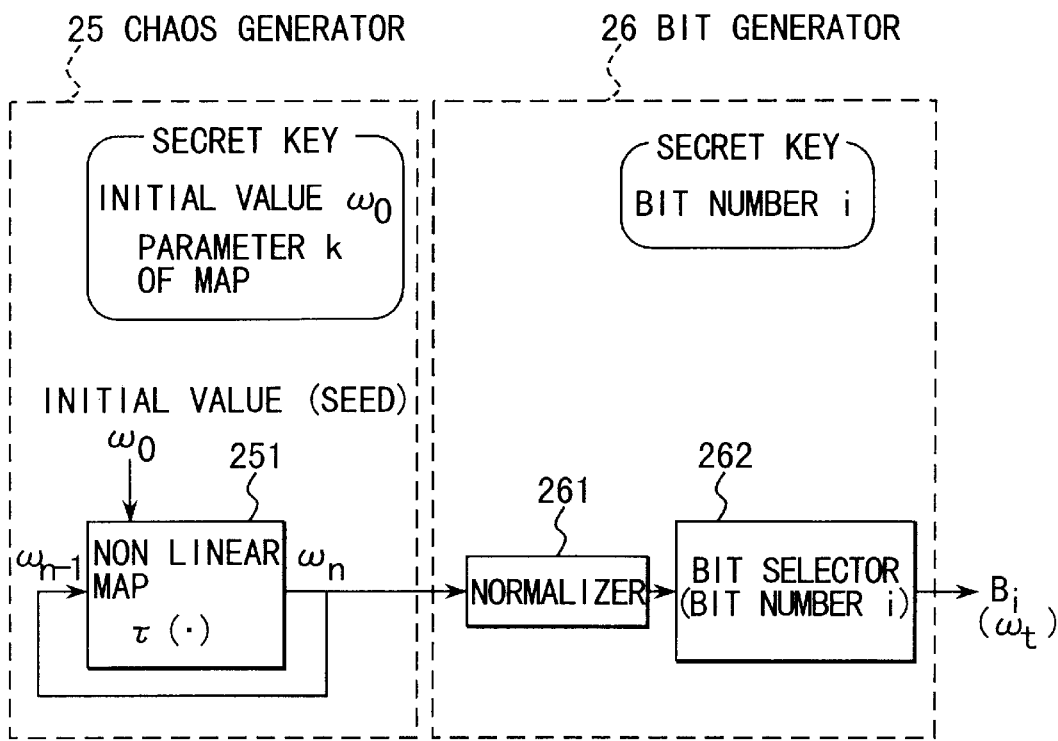
F I G. 8
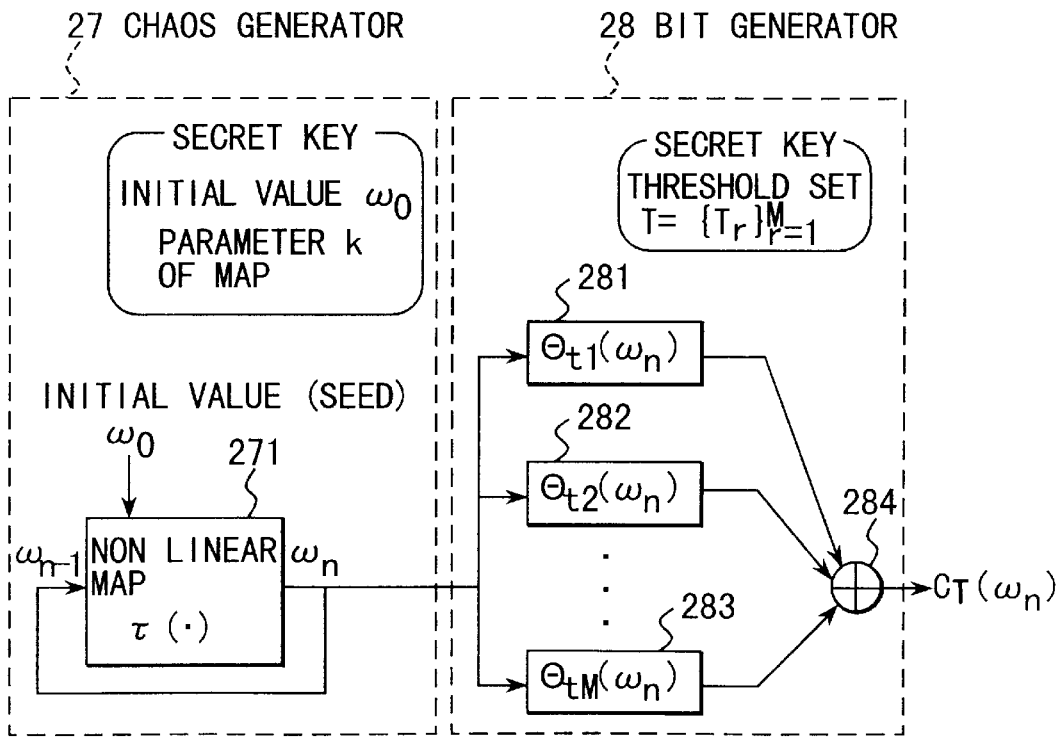
F I G. 9

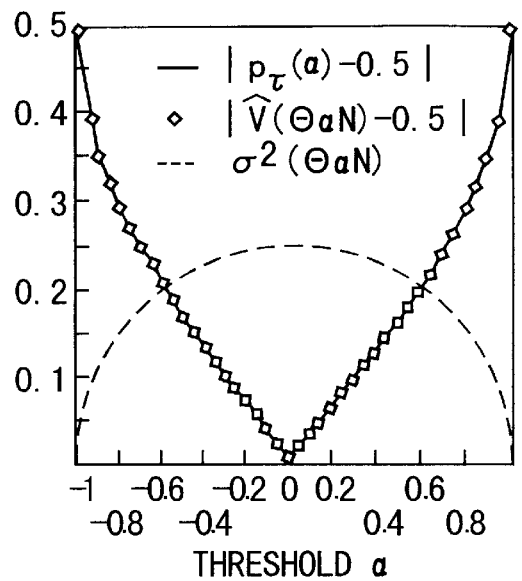
F I G. 1 0 A
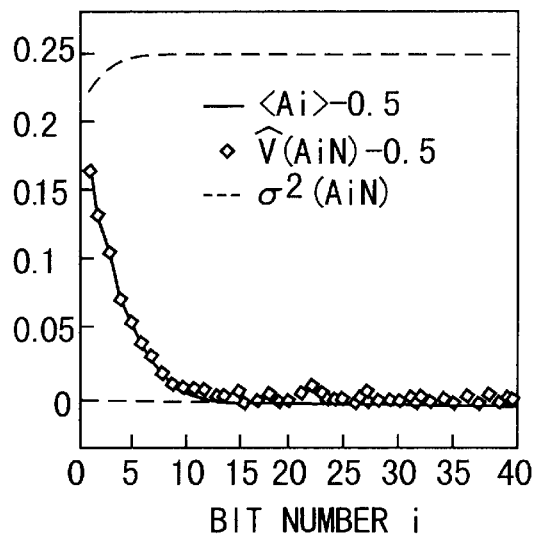
F I G. 1 0 B
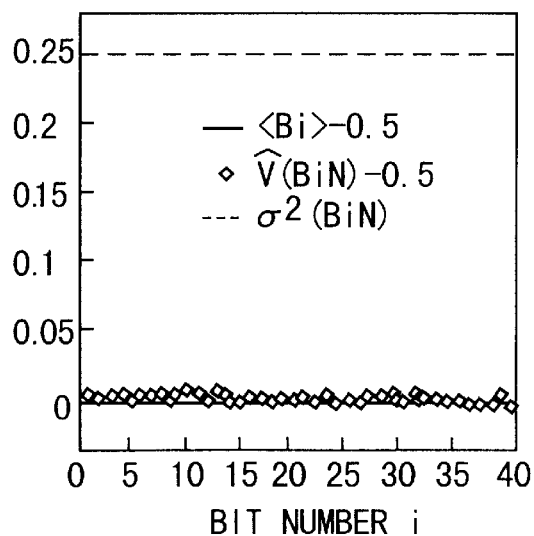
F I G. 1 0 C

| j \ i | 1 | 2 | 4 | 8 | 16 |
|---|---|---|---|---|---|
| 1 | 0.50000 | 0.33333 | 0.30075 | 0.26451 | 0.25094 |
| 2 | — | 0.50000 | 0.29773 | 0.26431 | 0.25094 |
| 4 | — | — | 0.50000 | 0.26359 | 0.25094 |
| 8 | — | — | — | 0.50000 | 0.25092 |
| 16 | — | — | — | — | 0.50000 |

FIG. 11

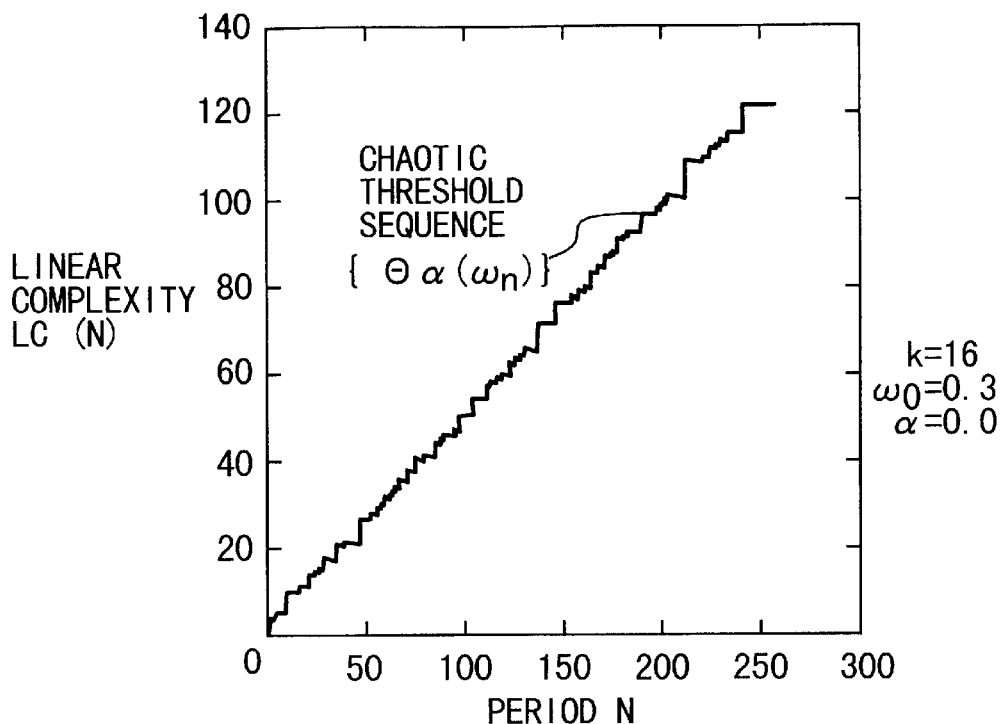
F I G. 12A
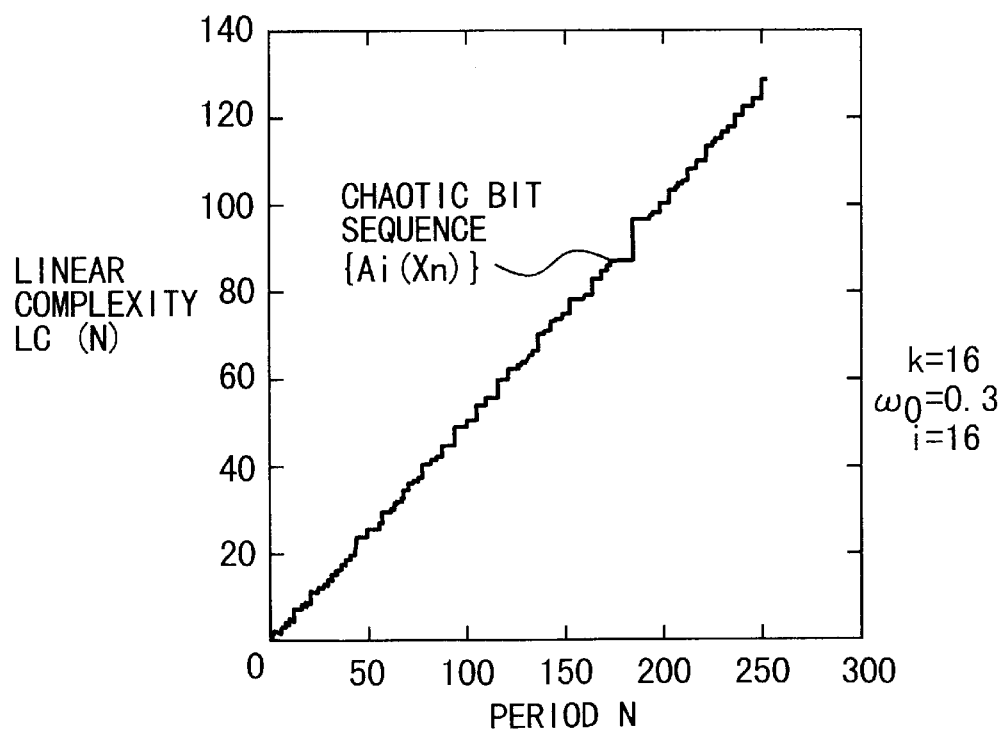
F I G. 12B

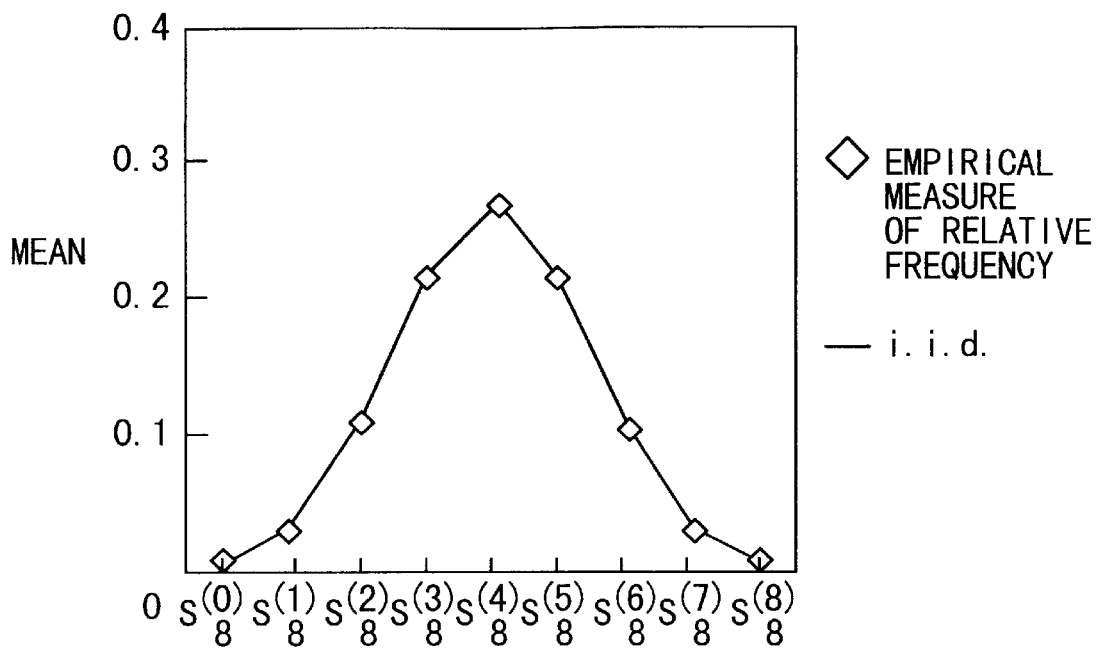
F I G. 14A
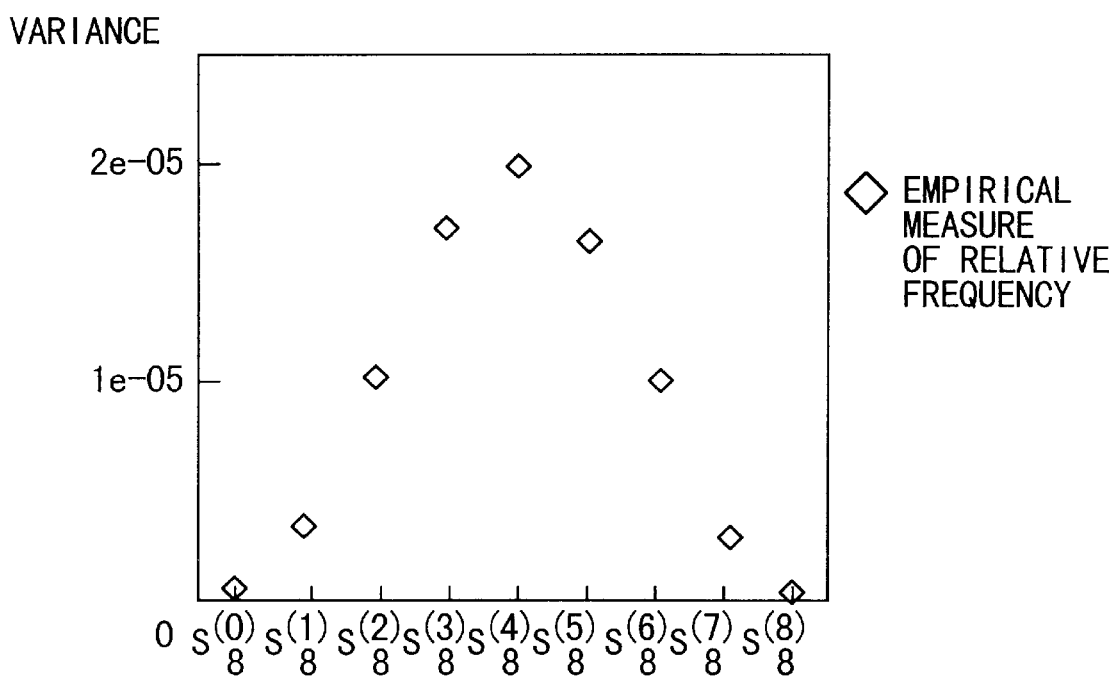
F I G. 14B

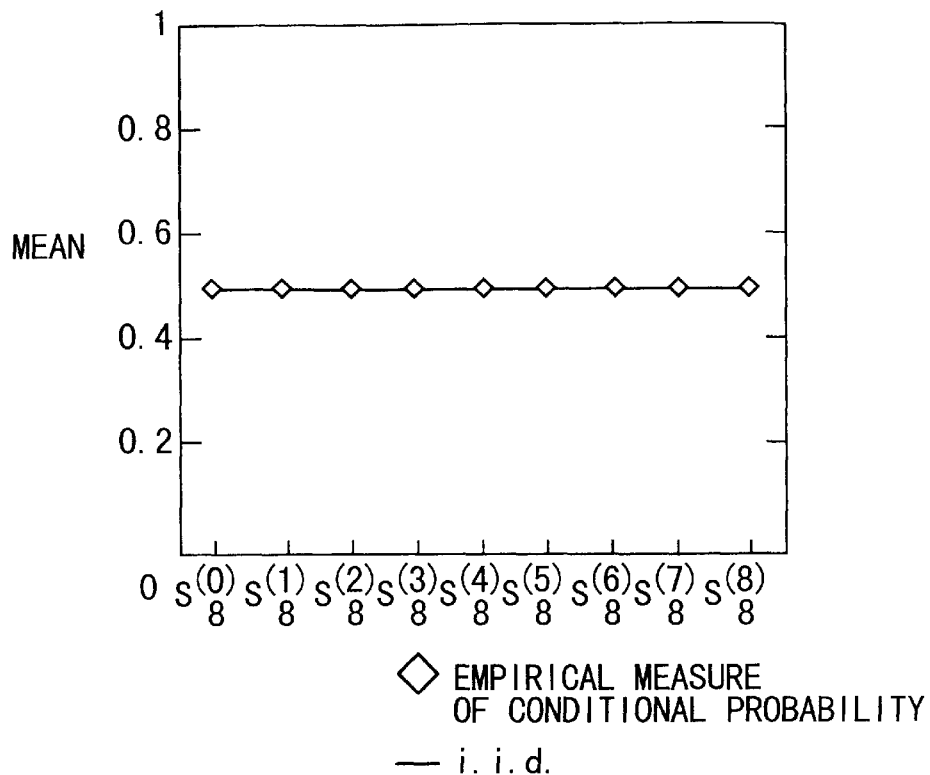
F I G. 1 5 A
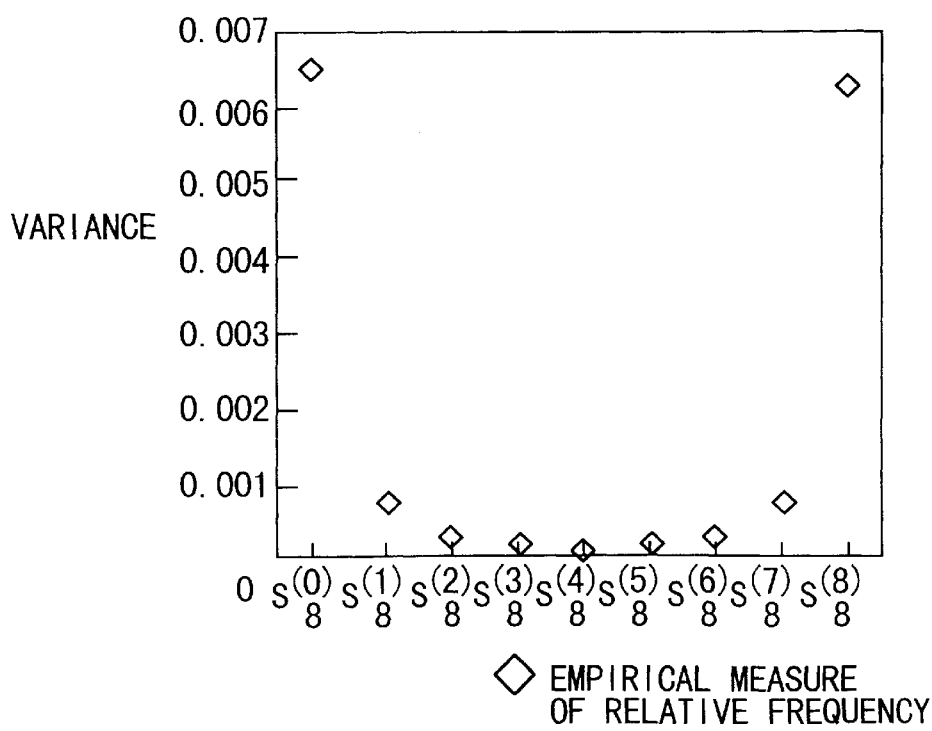
F I G. 1 5 B

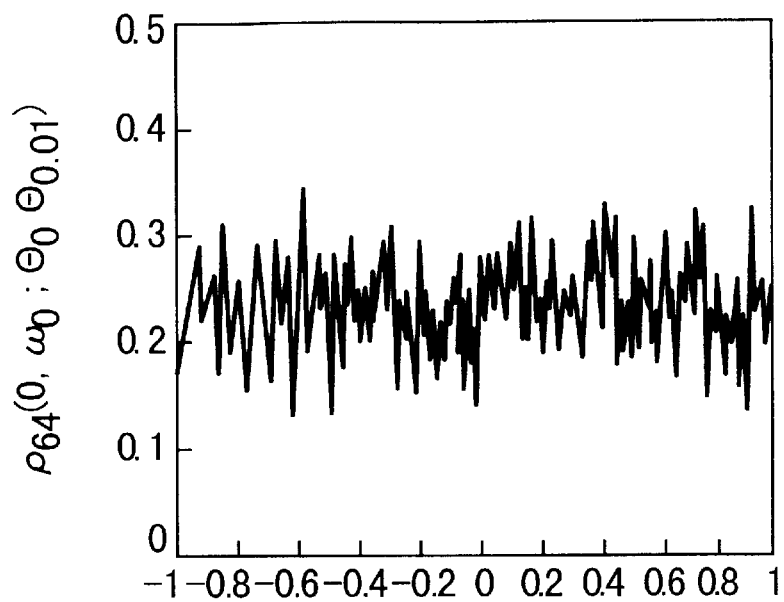
F I G. 17A
INITIAL VALUE $\omega_0'$ (7bits)
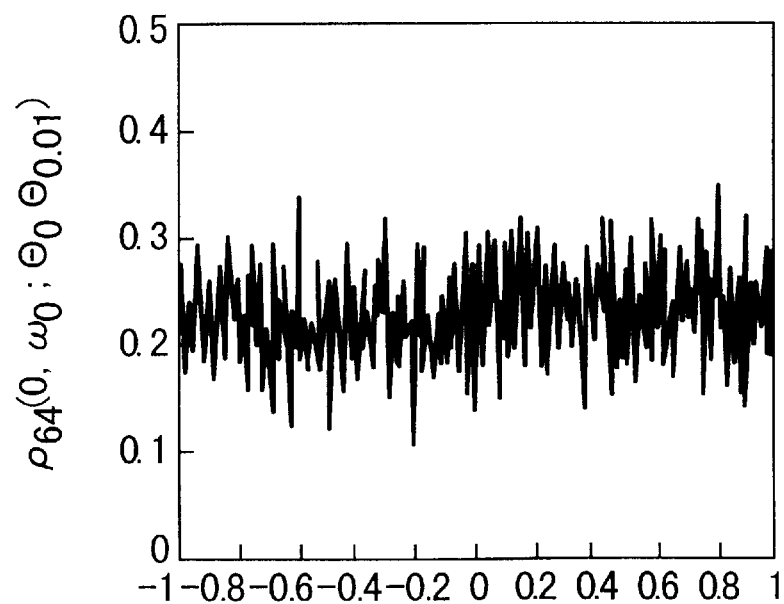
F I G. 17B
INITIAL VALUE $\omega_0'$ (8bits)

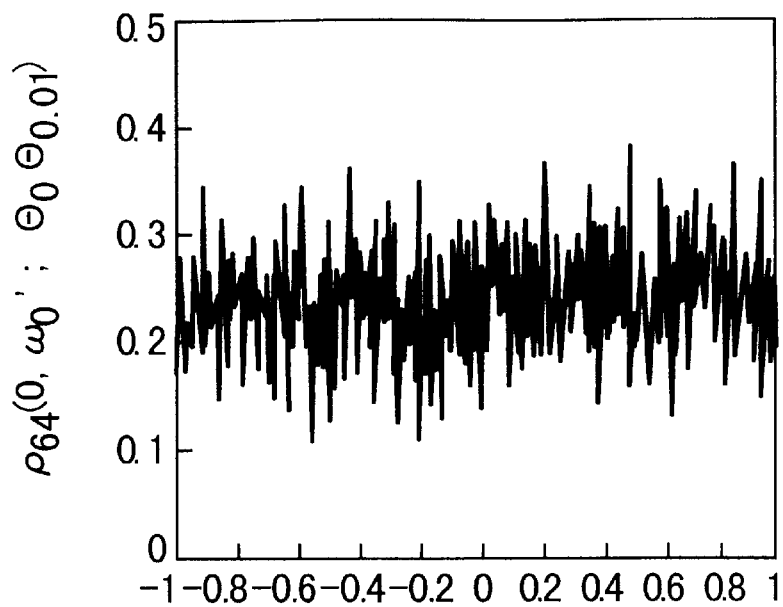
F I G. 18A
INITIAL VALUE $\omega_0'$ (9bits)
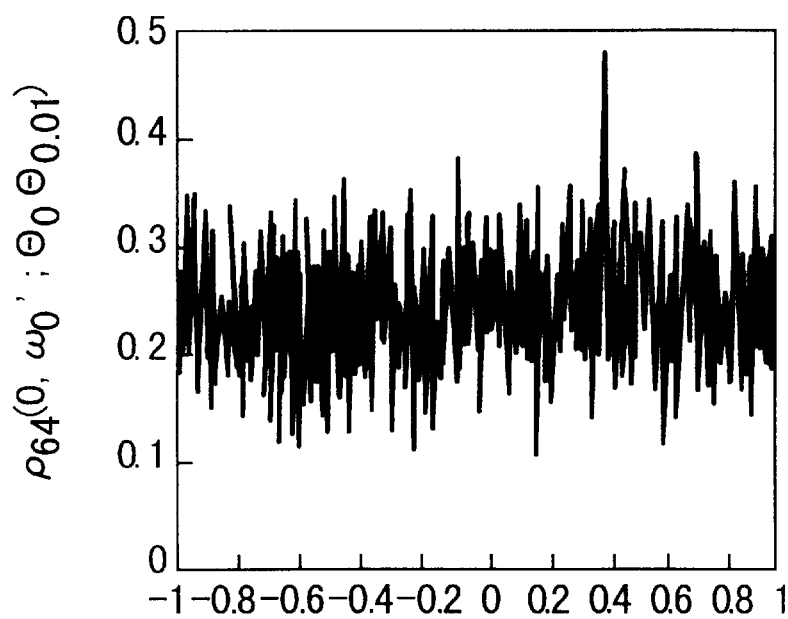
F I G. 18B
INITIAL VALUE $\omega_0'$ (10bits)

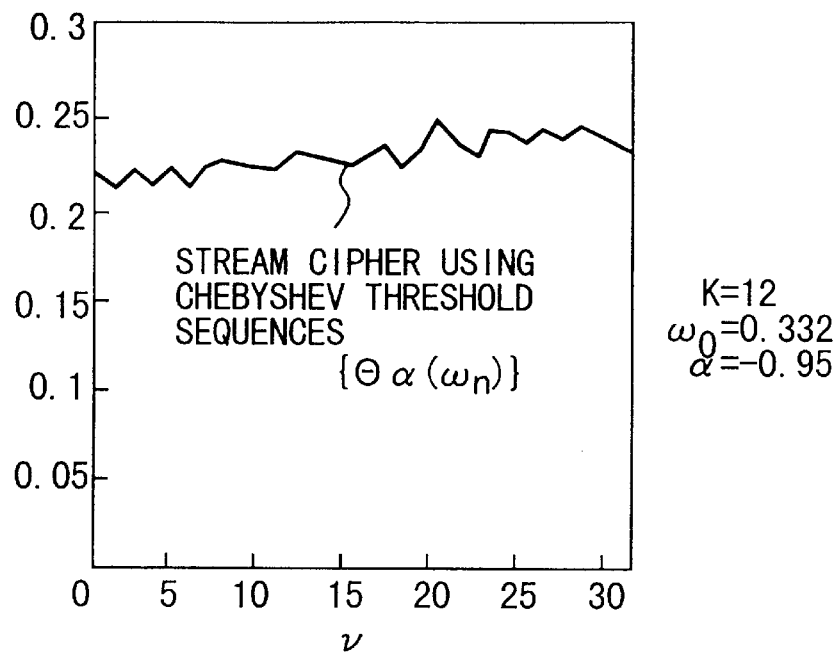
F I G. 19 A
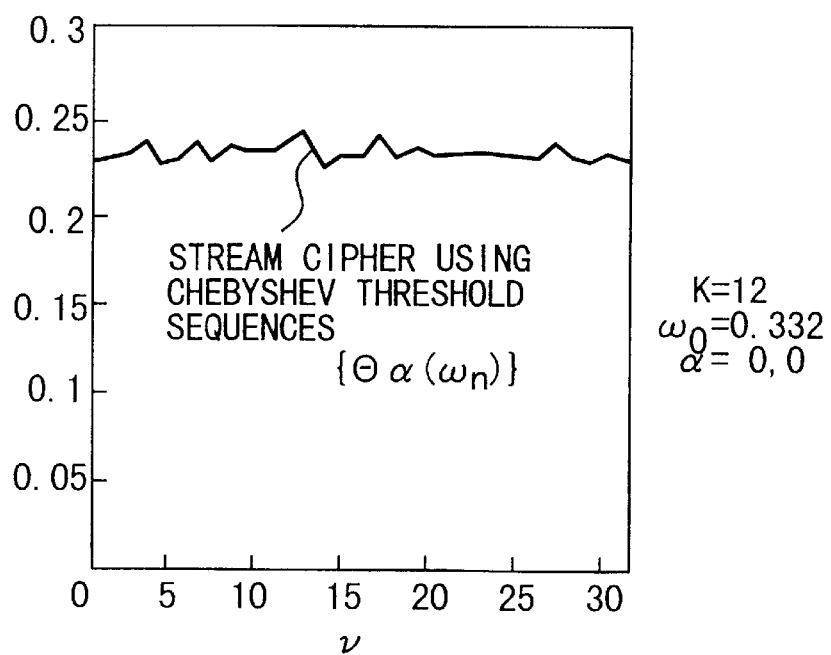
F I G. 19 B

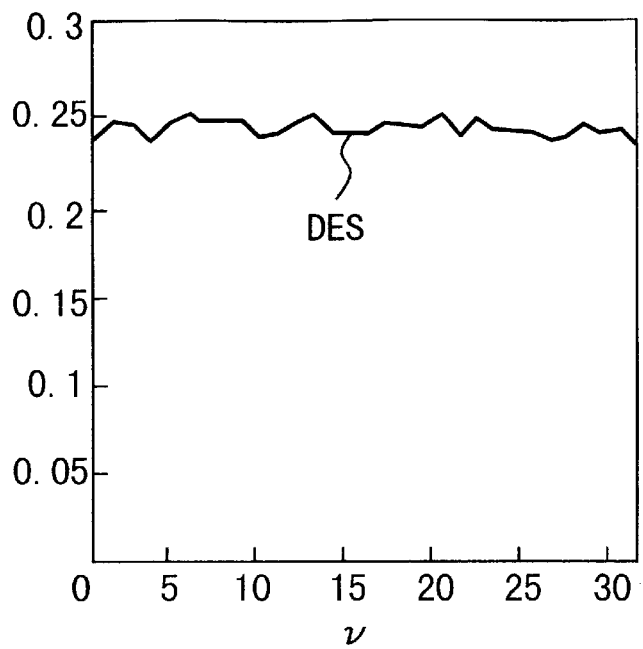
F I G. 20A
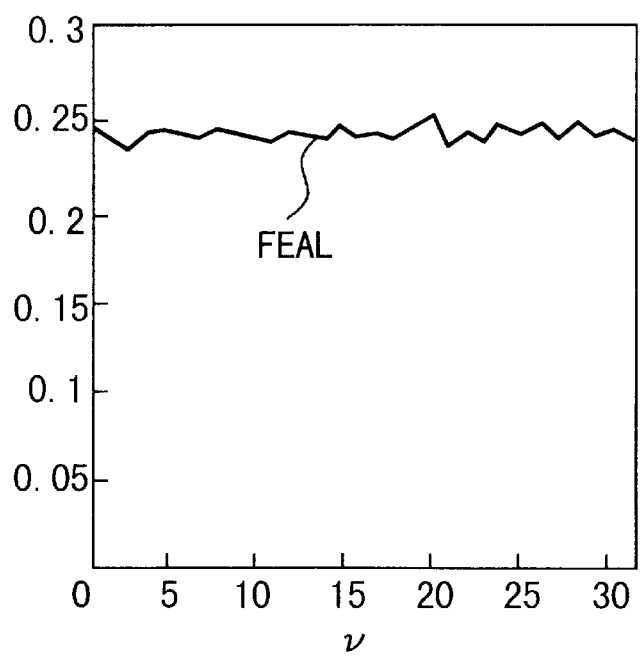
F I G. 20B

| N | CHEBYSHEV THRESHOLD SEQUENCE $\{\Theta_\alpha(\omega_n)\}$ | CHEBYSHEV SEQUENCE $\{A_i(\omega_n)\}$ | DES | FEAL |
|---|---|---|---|---|
| 1000 | 0.025 | 0.05 | 0.5 | 0.075 |
| 2000 | 0.05 | 0.1 | 0.3 | 0.15 |
| 4000 | 0.1 | 0.2 | 0.6 | 0.3 |
| 8000 | 0.19 | 0.34 | 1.0 | 0.6 |

FIG. 21

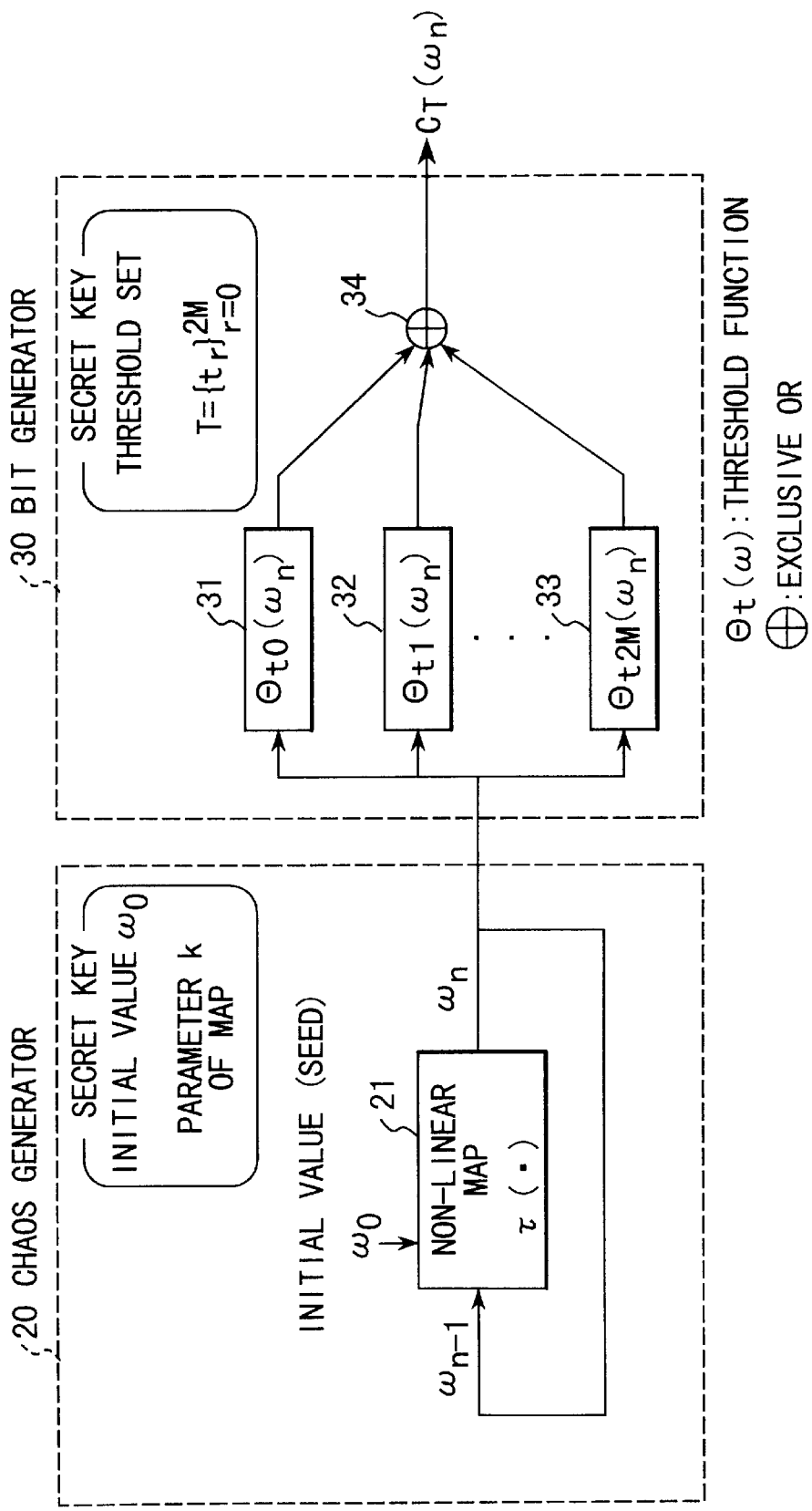
F I G. 22

$T_0 = \{\pm 0.5, \pm 0.2, 0\}$

| n | $\omega_n$ | $\Theta_{-0.5}(\omega_n)$ | $\Theta_{-0.2}(\omega_n)$ | $\Theta_0(\omega_n)$ | $\Theta_{0.2}(\omega_n)$ | $\Theta_{0.5}(\omega_n)$ | $\Theta_{T0}(\omega_n)$ |
|---|---|---|---|---|---|---|---|
| 0 | 0.300000 | 1 | 1 | 1 | 1 | 0 | 0 |
| 1 | -0.820000 | 0 | 0 | 0 | 0 | 0 | 0 |
| 2 | 0.344800 | 1 | 1 | 1 | 1 | 0 | 0 |
| 3 | -0.762226 | 0 | 0 | 0 | 0 | 0 | 0 |
| 4 | 0.161977 | 1 | 1 | 1 | 0 | 0 | 1 |
| 5 | -0.947527 | 0 | 0 | 0 | 0 | 0 | 0 |
| 6 | 0.795615 | 1 | 1 | 1 | 1 | 1 | 1 |
| 7 | 0.266007 | 1 | 1 | 1 | 1 | 0 | 0 |
| 8 | -0.858481 | 0 | 0 | 0 | 0 | 0 | 0 |
| 9 | 0.473978 | 1 | 1 | 1 | 1 | 0 | 0 |
| ... | ... | ... | ... | ... | ... | ... | ... |

| n | $\omega_n$ | $\Theta_{-0.8}(\omega_n)$ | $\Theta_{-0.7}(\omega_n)$ | $\Theta_{-0.1}(\omega_n)$ | $\Theta_{0}(\omega_n)$ | $\Theta_{0.1}(\omega_n)$ | $\Theta_{0.7}(\omega_n)$ | $\Theta_{0.8}(\omega_n)$ | $\Theta_{T1}(\omega_n)$ |
|---|---|---|---|---|---|---|---|---|---|
| 0 | 0.300000 | 1 | 1 | 1 | 1 | 1 | 0 | 0 | 1 |
| 1 | -0.820000 | 0 | 0 | 0 | 0 | 0 | 0 | 0 | 0 |
| 2 | 0.344800 | 1 | 1 | 1 | 1 | 1 | 0 | 0 | 1 |
| 3 | -0.762226 | 1 | 0 | 0 | 0 | 0 | 0 | 0 | 1 |
| 4 | 0.161977 | 1 | 1 | 1 | 1 | 1 | 0 | 0 | 1 |
| 5 | -0.947527 | 0 | 0 | 0 | 0 | 0 | 0 | 0 | 0 |
| 6 | 0.795615 | 1 | 1 | 1 | 1 | 1 | 1 | 0 | 0 |
| 7 | 0.266007 | 1 | 1 | 1 | 0 | 0 | 0 | 0 | 0 |
| 8 | -0.858481 | 0 | 0 | 0 | 0 | 0 | 0 | 0 | 1 |
| 9 | 0.473978 | 1 | 1 | 1 | 1 | 1 | 0 | 0 | 1 |
| ... | ... | ... | ... | ... | ... | ... | ... | ... | ... |

| n | $\omega_n$ | $\Theta_{-0.75}(\omega_n)$ | $\Theta_{-0.5}(\omega_n)$ | $\Theta_{-0.25}(\omega_n)$ | $\Theta_0(\omega_n) = B_1(\omega_n)$ | $\Theta_{0.25}(\omega_n)$ | $\Theta_{0.5}(\omega_n)$ | $\Theta_{0.75}(\omega_n)$ | $B_2(\omega_n)$ | $B_3(\omega_n)$ |
|---|---|---|---|---|---|---|---|---|---|---|
| 0 | 0.300000 | 1 | 1 | 1 | 1 | 1 | 0 | 0 | 0 | 1 |
| 1 | −0.820000 | 0 | 0 | 0 | 0 | 0 | 0 | 0 | 0 | 0 |
| 2 | 0.344800 | 1 | 1 | 1 | 1 | 1 | 0 | 0 | 0 | 1 |
| 3 | −0.762226 | 0 | 0 | 0 | 0 | 0 | 0 | 0 | 0 | 0 |
| 4 | 0.161977 | 1 | 1 | 1 | 1 | 0 | 0 | 0 | 0 | 0 |
| 5 | −0.947527 | 0 | 0 | 0 | 1 | 0 | 1 | 1 | 1 | 0 |
| 6 | 0.795615 | 1 | 1 | 1 | 1 | 1 | 0 | 0 | 0 | 1 |
| 7 | 0.266007 | 1 | 0 | 0 | 0 | 1 | 0 | 0 | 0 | 1 |
| 8 | −0.858481 | 0 | 0 | 0 | 0 | 0 | 0 | 0 | 0 | 0 |
| 9 | 0.473978 | 1 | 1 | 1 | 1 | 1 | 0 | 0 | 0 | 1 |
| ... | ... | ... | ... | ... | ... | ... | ... | ... | ... | ... |

F I G. 25

$k = 2, \omega_0 = 0.3$

| n | $\omega_n$ | 0. | $B_1(\omega_n)$ | $B_2(\omega_n)$ | $B_3(\omega_n)$ | $B_4(\omega_n)$ | $B_5(\omega_n)$ | ... |
|---|---|---|---|---|---|---|---|---|
| 0 | 0.300000 | 0. | 1 | 0 | 0 | 0 | 0 | |
| 1 | -0.820000 | 0. | 0 | 0 | 1 | 0 | 0 | |
| 2 | 0.344800 | 0. | 1 | 0 | 0 | 1 | 1 | |
| 3 | -0.762226 | 0. | 0 | 0 | 1 | 0 | 1 | |
| 4 | 0.161977 | 0. | 1 | 0 | 0 | 1 | 0 | |
| 5 | -0.947527 | 0. | 0 | 1 | 0 | 0 | 0 | |
| 6 | 0.795615 | 0. | 1 | 0 | 1 | 0 | 0 | |
| 7 | 0.266007 | 0. | 1 | 0 | 0 | 0 | 0 | |
| 8 | -0.858481 | 0. | 0 | 0 | 1 | 1 | 0 | |
| 9 | 0.473978 | 0. | 1 | 0 | 1 | 1 | 1 | |
| ... | ... | | | | | | | |

F I G. 26

$T = \{\pm 1, \pm 0.75, \pm 0.5, \pm 0.25\}$

| n | $\omega_n$ | $\Theta_{-1}(\omega_n)$ | $\Theta_{-0.75}(\omega_n)$ | $\Theta_{-0.5}(\omega_n)$ | $\Theta_{-0.25}(\omega_n)$ | $\Theta_{0.25}(\omega_n)$ | $\Theta_{0.5}(\omega_n)$ | $\Theta_{0.75}(\omega_n)$ | $\Theta_1(\omega_n)$ | $A_1(\omega_n)$ | $A_2(\omega_n)$ |
|---|---|---|---|---|---|---|---|---|---|---|---|
| 0 | 0.300000 | 1 | 1 | 1 | 1 | 1 | 0 | 0 | 0 | 0 | 1 |
| 1 | -0.820000 | 1 | 0 | 0 | 0 | 0 | 0 | 0 | 0 | 1 | 1 |
| 2 | 0.344800 | 1 | 1 | 1 | 1 | 1 | 0 | 0 | 0 | 0 | 1 |
| 3 | -0.762226 | 1 | 0 | 0 | 0 | 0 | 0 | 0 | 0 | 1 | 1 |
| 4 | 0.161977 | 1 | 0 | 1 | 1 | 0 | 0 | 0 | 0 | 0 | 0 |
| 5 | -0.947527 | 1 | 1 | 1 | 0 | 1 | 1 | 1 | 0 | 1 | 1 |
| 6 | 0.795615 | 1 | 0 | 0 | 1 | 1 | 0 | 0 | 0 | 1 | 1 |
| 7 | 0.266007 | 1 | 1 | 1 | 0 | 0 | 0 | 0 | 0 | 0 | 1 |
| 8 | -0.858481 | 1 | 0 | 0 | 0 | 0 | 0 | 0 | 0 | 1 | 1 |
| 9 | 0.473978 | 1 | 1 | 1 | 1 | 1 | 0 | 0 | 0 | 0 | 1 |
| ⋯ | ⋯ | ⋯ | ⋯ | ⋯ | ⋯ | ⋯ | ⋯ | ⋯ | ⋯ | ⋯ | ⋯ | ⋯ |

FIG. 27

$$m = 2, \vec{T} = \{T_0, T_1\}, \vec{d} = \{1\}$$

| n | $C_{T0}(\omega_n)$ | $C_{T1}(\omega_{n-1})$ | $D_{\vec{T},\vec{d}}(\omega_n)$ |
|---|---|---|---|
| 0 | 0 | – | – |
| 1 | 0 | 1 | 1 |
| 2 | 0 | 0 | 0 |
| 3 | 0 | 1 | 1 |
| 4 | 1 | 1 | 0 |
| 5 | 0 | 1 | 1 |
| 6 | 1 | 0 | 1 |
| 7 | 0 | 0 | 0 |
| 8 | 0 | 1 | 1 |
| 9 | 0 | 0 | 0 |
| ⋮ | ⋮ | ⋮ | ⋮ |

FIG. 29

□ : UNIT DELAY ELEMENT   ⊕ : EXCLUSIVE OR $k_1 = 2$, $\omega_{0,1} = 0.3$ $T_0^{(1)} = \{\pm 0.5, 0\}$ $T_1^{(1)} = \{\pm 0.8, \pm 0.7, \pm 0.1, 0\}$ $\vec{T}^{(1)} = \{T_0^{(1)}, T_1^{(1)}\}, \vec{d}^{(1)} = \{1\}$

| n | $C_{T_0^{(1)}}(\omega_{n,1})$ | $C_{T_1^{(1)}}(\omega_{n-1,1})$ | $D_{\vec{T}^{(1)}, \vec{d}^{(1)}}(\omega_{n,1})$ |
|---|---|---|---|
| 0 | 0 | – | – |
| 1 | 0 | 1 | 1 |
| 2 | 0 | 0 | 0 |
| 3 | 0 | 1 | 1 |
| 4 | 1 | 1 | 0 |
| 5 | 0 | 1 | 1 |
| 6 | 1 | 0 | 1 |
| 7 | 0 | 0 | 0 |
| 8 | 0 | 1 | 1 |
| 9 | 0 | 0 | 0 |
| 10 | 0 | 1 | 1 |
| 11 | 1 | 0 | 1 |
| 12 | 0 | 0 | 0 |
| 13 | 0 | 0 | 0 |
| ⋮ | ⋮ | ⋮ | ⋮ |

FIG. 31

$k_2 = 4$, $\omega_{0,2} = 0.4$ $T_0(2) = \{\pm 0.85, 0\}$ $T_1(2) = \{\pm 0.9, \pm 0.3, 0\}$ $T_2(2) = \{\pm 0.4, \pm 0.2, \pm 0.1, 0\}$ $\vec{T}(2) = \{T_0(2), T_1(2), T_2(2)\}$, $\vec{d}(2) = \{1, 2\}$

| n | $c_{T0}(2)$ $(\omega_{n,2})$ | $c_{T1}(2)$ $(\omega_{n-1,2})$ | $c_{T2}(2)$ $(\omega_{n-2,2})$ | $D_{\vec{T}}(2), \vec{d}(2)$ $(\omega_{n,2})$ |
|---|---|---|---|---|
| 0 | 0 | – | – | – |
| 1 | 1 | 0 | – | – |
| 2 | 1 | 0 | – | – |
| 3 | 0 | 1 | 1 | 0 |
| 4 | 0 | 0 | 1 | 1 |
| 5 | 1 | 1 | 1 | 1 |
| 6 | 1 | 1 | 0 | 0 |
| 7 | 1 | 0 | 1 | 0 |
| 8 | 1 | 1 | 1 | 1 |
| 9 | 0 | 0 | 0 | 0 |
| 10 | 0 | 0 | 1 | 1 |
| 11 | 1 | 1 | 0 | 0 |
| 12 | 0 | 1 | 1 | 0 |
| 13 | 1 | 1 | 0 | 0 |
| ⋮ | ⋮ | ⋮ | ⋮ | ⋮ |

FIG. 32

$k_3 = 6,\ \omega_{0,3} = 0.6$ $T_0(3) = \{\pm 0.75, 0\}$ $T_1(3) = \{\pm 0.6, \pm 0.5, 0\}$ $T_2(3) = \{\pm 0.45, \pm 0.35, \pm 0.15, 0\}$ $T_3(3) = \{\pm 0.95, \pm 0.65, \pm 0.55, \pm 0.25, 0\}$ $\vec{T}(3) = \{T_0(3), T_1(3), T_2(3), T_3(3)\},\ \vec{d}(3) = \{1, 2, 1\}$

| n | $C_{T0}(3)$ $(\omega_{n,3})$ | $C_{T1}(3)$ $(\omega_{n-1,3})$ | $C_{T2}(3)$ $(\omega_{n-2,3})$ | $C_{T3}(3)$ $(\omega_{n-2,3})$ | $D_{\vec{T}}(3), \vec{d}(3)$ $(\omega_{n,3})$ |
|---|---|---|---|---|---|
| 0 | 0 | – | – | – | – |
| 1 | 1 | 1 | – | – | – |
| 2 | 1 | 1 | – | – | – |
| 3 | 0 | 0 | 1 | – | – |
| 4 | 1 | 1 | 1 | 1 | 0 |
| 5 | 0 | 0 | 1 | 0 | 1 |
| 6 | 1 | 0 | 1 | 1 | 1 |
| 7 | 1 | 1 | 1 | 0 | 1 |
| 8 | 0 | 1 | 0 | 0 | 1 |
| 9 | 0 | 1 | 0 | 1 | 0 |
| 10 | 1 | 1 | 1 | 1 | 0 |
| 11 | 1 | 1 | 1 | 1 | 0 |
| 12 | 1 | 1 | 1 | 0 | 1 |
| 13 | 1 | 1 | 1 | 0 | 1 |
| ⋮ | ⋮ | ⋮ | ⋮ | ⋮ | ⋮ |

FIG. 33

$$L=3, \vec{k}=\{2,4,6\}, \vec{\omega}_0=\{0.3, 0.4, 0.6\}$$

| n | $D_{\vec{T}}(1), \vec{d}(1)$ $(\omega_{n,1})$ | $D_{\vec{T}}(2), \vec{d}(2)$ $(\omega_{n,2})$ | $D_{\vec{T}}(3), \vec{d}(3)$ $(\omega_{n,3})$ | $E_{\vec{k}}(\vec{\omega}_n)$ |
|---|---|---|---|---|
| 0 | – | – | – | – |
| 1 | 1 | – | – | – |
| 2 | 0 | – | – | – |
| 3 | 1 | 0 | – | – |
| 4 | 0 | 1 | 0 | 1 |
| 5 | 1 | 1 | 1 | 1 |
| 6 | 1 | 0 | 1 | 0 |
| 7 | 0 | 0 | 1 | 1 |
| 8 | 1 | 1 | 1 | 1 |
| 9 | 0 | 0 | 0 | 0 |
| 10 | 1 | 1 | 0 | 0 |
| 11 | 1 | 0 | 0 | 1 |
| 12 | 0 | 0 | 1 | 1 |
| 13 | 0 | 0 | 1 | 1 |
| ⋮ | ⋮ | ⋮ | ⋮ | ⋮ |

| N | Θ SEQUENCE | A SEQUENCE (5TH BIT) | B SEQUENCE (5TH BIT) | C SEQUENCE (M=3) | C SEQUENCE (M=15) |
|---|---|---|---|---|---|
| 1024 | 0.01 | 0.03 | 0.03 | 0.01 | 0.03 |
| 2048 | 0.02 | 0.07 | 0.07 | 0.03 | 0.06 |
| 4096 | 0.03 | 0.13 | 0.13 | 0.06 | 0.12 |
| 8192 | 0.06 | 0.28 | 0.26 | 0.11 | 0.23 |

FIG. 35B

| N | D SEQUENCE1 | D SEQUENCE2 | E SEQUENCE1 | E SEQUENCE2 |
|---|---|---|---|---|
| 1024 | 0.02 | 0.05 | 0.04 | 0.10 |
| 2048 | 0.04 | 0.11 | 0.08 | 0.20 |
| 4096 | 0.08 | 0.20 | 0.16 | 0.40 |
| 8192 | 0.15 | 0.39 | 0.30 | 0.80 |

FIG. 36A

| N | Θ SEQUENCE | A SEQUENCE (5TH BIT) | B SEQUENCE (5TH BIT) | C SEQUENCE (M=3) | C SEQUENCE (M=15) |
|---|---|---|---|---|---|
| 1024 | 0.01 | 0.03 | 0.03 | 0.02 | 0.03 |
| 2048 | 0.02 | 0.07 | 0.07 | 0.03 | 0.06 |
| 4096 | 0.03 | 0.13 | 0.13 | 0.06 | 0.12 |
| 8192 | 0.07 | 0.28 | 0.28 | 0.12 | 0.24 |

FIG. 36B

| N | D SEQUENCE1 | D SEQUENCE2 | E SEQUENCE1 | E SEQUENCE2 | DES | FEAL |
|---|---|---|---|---|---|---|
| 1024 | 0.03 | 0.05 | 0.04 | 0.10 | 0.11 | 0.11 |
| 2048 | 0.04 | 0.11 | 0.08 | 0.21 | 0.22 | 0.21 |
| 4096 | 0.08 | 0.20 | 0.16 | 0.41 | 0.43 | 0.41 |
| 8192 | 0.16 | 0.42 | 0.30 | 0.81 | 0.86 | 0.81 |

ENCIPHERING/DECIPHERING APPARATUS AND METHOD INCORPORATING RANDOM VARIABLE AND KEYSTREAM GENERATION

BACKGROUND OF THE INVENTION

1. Field of the Invention

The present invention relates to a stream cipher type enciphering apparatus, deciphering apparatus, keystream generating apparatus and methods for those apparatuses.

2. Description of the Related Art

Stream cipher cryptography, which obtains an exclusive OR of, for example, a binary sequence of a plaintext/ciphertext and a keystream sequence (binary sequence) generated by a common key to thereby generate a ciphertext/plaintext, is considered the most important cryptography at present (references 1 to 5; details on each reference is given later).

The critical problem of the stream cipher cryptography is the difficulty of generating long unpredictable sequences of binary signals (see references 6 to 12) from a short and random key. While linear feedback shift register (LFSR) sequences are often employed in generating binary sequences which are used as keystream sequences, the linear feedback shift register suffers cryptographic weakness (references 2 to 5).

Several nonlinear ergodic maps are known to be excellent choices for a pseudorandom generator (references 19 and 20), and many cryptosystems based on chaotic phenomena have been proposed (references 13 to 16) besides cryptosystems which use the linear feedback shift register. Since such cryptosystems are mostly based on a chaotic real-valued orbit itself and on electronic circuits which handle analog signals, however, their application to digital information communication systems is not easy. Further, since all of the cryptosystems have already been cracked, the use of the cryptosystems is not practical (references 17 and 18). Moreover, important statistical properties, such as correlation functions between the information-bearing signal and its enciphered signal, which should be evaluated in communication systems, have not been theoretically discussed or evaluated.

Further, an enormous amount of block ciphers and stream ciphers has been proposed in various conferences and workshops on cryptologic techniques (e.g., reference 1; details on each reference is given later). Stream cipher cryptography, which obtains an exclusive OR of, for example, a binary sequence of a plaintext/ciphertext and a keystream sequence (binary sequence) generated by a common key to generate a ciphertext/plaintext, is considered the most important cryptography at present (see references 2 to 6). A sequence of independent and identically distributed (i.i.d.) binary random variables which can mimic Bernoulli trials is the best choice for a keystream sequence for a stream cipher. It is well known in the fields of probability theory and ergodic theory that the Rademacher functions (see references 14 to 16) for the dyadic map (Bernoulli map) can produce sequences of i.i.d. binary random variables. The critical problem of the conventional stream cipher cryptography is the difficulty of efficiently generating long unpredictable sequences of binary signals (see references 7 to 13) from a short and random key so that it is not cryptographically secure.

There is the stream cipher which uses the dyadic map. In this system, the binary expansion of an arbitrarily chosen rational seed is the keystream binary sequence itself, which implies that the length of the keystream sequence is equal to the wordlength of the seed after binary expansion. The prior art system cannot therefore permit the dyadic map to generate a chaotic real-valued orbit of long period in a finite-precision computation system.

Since the conventional stream cipher cryptographic techniques are not cryptographically secure as mentioned above, there is a demand for a stream cipher which is based on a new principle and is cryptographically securer.

SUMMARY OF THE INVENTION

Accordingly, it is an objective of this invention to provide an enciphering apparatus and method, deciphering apparatus and method, keystream generating apparatus and method, and a storage medium, which can ensure a keystream-sequence oriented stream cipher excellent in cryptographic security.

It is another objective of this invention to provide a random variable generating apparatus and method and a storage medium, which can generate excellent random variables or ideal random variables.

An enciphering apparatus according to this invention comprises chaos generation means for generating a real-valued sequence along a chaotic orbit in accordance with a predetermined number of first common keys and a predetermined nonlinear map; bit generation means for performing predetermined binarization on each real value in the generated real-valued sequence based on a predetermined number of second common keys to generate a binary sequence; and logic operation means for executing a predetermined logic operation on a binary sequence of an input plaintext and the generated keystream sequence bit by bit to generate a binary sequence of a ciphertext.

According to this invention, the enciphering apparatus as in claim 1 is characterized in that the first common keys are an initial seed of the predetermined nonlinear map, or an initial seed of the predetermined nonlinear map and a value of a parameter of the nonlinear map; and the second common keys represent a predetermined number of different thresholds based on the predetermined binarization.

According to this invention, the enciphering apparatus as in claim 2 is characterized in that the initial seed of the predetermined nonlinear map and the value of the parameter of the nonlinear map are real values.

According to this invention, the enciphering apparatus as in claim 1 is characterized in that the predetermined nonlinear map is a Chebyshev map of degree k (k: being a real value equal to or greater than 2) given by a differential equation $\omega_{n+1} = \cos(k \cos^{-1}\omega_n)$; and the first common keys are an initial seed $\omega_0$ of the Chebyshev map where $-1 < \omega_0 < 1$, and a value of the parameter k.

According to this invention, the enciphering apparatus as in claim 1 is characterized in that the logic operation means performs an exclusive OR operation or an exclusive AND operation.

According to this invention, the enciphering apparatus as in claim 1 is characterized in that the bit generation means binarizes individual real values in the real-valued sequence using values indicated by the second common keys as thresholds.

According to this invention, the enciphering apparatus as in claim 1 is characterized in that the bit generation means acquires absolute values of individual real values in the real-valued sequence and binarizes the absolute values of the real values using values indicated by the second common keys as thresholds.

According to this invention, the enciphering apparatus as in claim 1 is characterized in that the second common keys are bit numbers indicating bit positions of real values in a binary representation; and the bit generation means selects values of individual real values in the real-valued sequence in a binary representation, at bit positions indicated by the second common keys, to binarize the real values.

According to this invention, the enciphering apparatus as in claim 1 is characterized in that the bit generation means normalizes individual real values in the real-valued sequence over a predetermined interval and binarizes the normalized real values using values indicated by the second common keys as thresholds.

According to this invention, the enciphering apparatus as in claim 1 is characterized in that the second common keys are bit numbers indicating bit positions of real values in a binary representation; and the bit generation means selects values of normalized values of the real values in the real-valued sequence in a binary representation, at bit positions indicated by the second common keys, to binarize the real values.

According to this invention, the enciphering apparatus as in claim 1 is characterized in that the bit generation means acquires plural pieces of binary data of individual real values in the real-valued sequence using values indicated by the plurality of second common keys as thresholds, and performs predetermined nonlinear coupling process on the plural pieces of binary data.

According to this invention, the enciphering apparatus according to claim 1, wherein the second common keys are bit numbers indicating bit positions of real values in a binary representation; and the bit generation means selects values of individual real values in the real-valued sequence or values obtained by performing a predetermined process on the real values, in a binary representation, at bit positions indicated by the second common keys, and performs predetermined nonlinear coupling on the selected values to binarize the real values.

According to this invention, the enciphering apparatus as in claim 11 or 12 is characterized in that the logic operation means performs an exclusive OR operation or an exclusive AND operation.

According to this invention, the enciphering apparatus as in claim 1 is characterized in that the chaos generation means executes a program described in a predetermined language by using a floating-point computing device to generate a sequence of values of the predetermined nonlinear map.

A deciphering apparatus according to this invention comprises chaos generation means for generating a real-valued sequence along a chaotic orbit in accordance with a predetermined number of first common keys and a predetermined nonlinear map; bit generation means for performing predetermined binarization on each real value in the generated real-valued sequence based on a predetermined number of second common keys to generate a binary sequence; and means for executing a predetermined logic operation on a binary sequence of an input ciphertext and the generated keystream sequence bit by bit to generate a binary sequence of an original plaintext.

According to this invention, a keystream generating apparatus for use in a stream enciphering apparatus or a stream deciphering apparatus for performing a logic operation on a binary sequence of a plaintext or a ciphertext and a keystream sequence generated based on a predetermined common key to generate a ciphertext or an original plaintext, comprises chaos generation means for generating a real-valued sequence along a chaotic orbit in accordance with a predetermined number of first common keys and a predetermined nonlinear map; and bit generation means for performing predetermined binarization on each real value in the generated real-valued sequence based on a predetermined number of second common keys to generate a binary sequence.

An enciphering method according to this invention comprises the steps of generating a real-valued sequence along a chaotic orbit in accordance with a predetermined number of first common keys and a predetermined nonlinear map; performing predetermined binarization on each real value in the generated real-valued sequence based on a predetermined number of second common keys to generate a binary sequence; and executing a predetermined logic operation on a binary sequence of an input plaintext and the generated keystream sequence bit by bit to generate a binary sequence of a ciphertext.

A deciphering method according to this invention comprises the steps of generating a real-valued sequence along a chaotic orbit in accordance with a predetermined number of first common keys and a predetermined nonlinear map; performing predetermined binarization on each real value in the generated real-valued sequence based on a predetermined number of second common keys to generate a binary sequence; and executing a predetermined logic operation on a binary sequence of an input ciphertext and the generated keystream sequence bit by bit to generate a binary sequence of an original plaintext.

According to this invention, a keystream generating method for a keystream generating apparatus for use in a stream for use in a stream enciphering apparatus or a stream deciphering apparatus for performing a logic operation on a binary sequence of a plaintext or a ciphertext and a keystream sequence generated based on a predetermined common key to generate a ciphertext or an original plaintext, comprises the steps of generating a real-valued sequence along a chaotic orbit in accordance with a predetermined number of first common keys and a predetermined nonlinear map; and performing predetermined binarization on each real value in the generated real-valued sequence based on a predetermined number of second common keys to generate a binary sequence.

A random variable generating method in a stream enciphering system based on a chaotic binary sequence according to this invention comprises the steps of: generating a real-valued sequence along a chaotic orbit in accordance with a predetermined number of first common keys and a predetermined nonlinear map; performing predetermined binarization on each real value in the generated real-valued sequence based on a predetermined number of second common keys to generate a binary sequence; and executing a predetermined logic operation on a binary sequence of an input plaintext and the generated keystream sequence bit by bit to generate a random variable.

According to this invention, the random variable generating method as in claim 20 is characterized in that the first common keys are an initial seed of the predetermined nonlinear map, or an initial seed of the predetermined nonlinear map and a value of a parameter of the nonlinear map; and the second common keys represent a predetermined number of different thresholds based on the predetermined binarization.

According to this invention, the random variable generating method as in claim 21 is characterized in that the initial seed of the predetermined nonlinear map and the value of the parameter of the nonlinear map are real values.

According to this invention, the random variable generating method as in claim 20 is characterized in that the predetermined nonlinear map is a Chebyshev map of degree k (k: being a real value equal to or greater than 2) given by a differential equation $\omega_{n+1}=\cos(k\cos^{-1}\omega_n)$; and the first common keys are an initial seed $\omega_0$ of the Chebyshev map where $-1<\omega_0<1$, and a value of the parameter k.

According to this invention, there is provided a computer readable storage medium storing a program for generating a random variable and for controlling a computer to generate a real-valued sequence along a chaotic orbit in accordance with a predetermined number of first common keys and a predetermined nonlinear map; to perform predetermined binarization on each real value in the generated real-valued sequence based on a predetermined number of second common keys to generate a binary sequence; and to execute a predetermined logic operation on a binary sequence of an input plaintext and the generated keystream sequence bit by bit to generate a binary sequence of a ciphertext.

A random variable generating method according to this invention comprises the steps of generating a real-valued sequence along a chaotic orbit in accordance with a predetermined nonlinear map with a given real value as an initial seed; performing binarization on each real value in the generated real-valued sequence with given 2M+1 (M being an integer equal to or greater than 1) values as thresholds to generate 2M+1 binary sequences; and executing a predetermined logic operation based on the generated 2M+1 binary sequences to generate random variables.

According to this invention, the random variable generating method as in claim 26 is characterized in that the logic operation is an exclusive OR.

According to this invention, the random variable generating method as in claim 26 or 27 is characterized in that the 2M+1 thresholds $t_r$ (r=0 to 2M) satisfy relationships $t_r+t_{2M-r}=d+e$ and $t_i \neq t_j$ (when $i \neq j$) where d and e are respectively a minimum value and a maximum value the nonlinear map can take.

According to this invention, the random variable generating method as in claim 26 or 27 is characterized in that the nonlinear map has an equidistributivity of the invariant measure, symmetric property of the invariant measure and symmetric property of the map.

According to this invention, the random variable generating method as in claim 26 or 27 is characterized in that ideal random variables are produced by using, as the nonlinear map, one having an equidistributivity of the invariant measure, symmetric property of the invariant measure and symmetric property of the map, and permitting the 2M+1 thresholds $t_r$ (r=0 to 2M) to satisfy relationships $t_r+t_{2M-r}=d+e$ and $t_i \neq t_j$ (when $i \neq j$) where d and e are respectively a minimum value and a maximum value the nonlinear map can take.

A random variable generating apparatus according to this invention comprises real-valued sequence generation means for generating a real-valued sequence along a chaotic orbit in accordance with a predetermined nonlinear map with a given real value as an initial seed; binarization means for performing binarization on each real value in the generated real-valued sequence with given 2M+1 (M being an integer equal to or greater than 1) values as thresholds to generate 2M+1 binary sequences; and logic operation means for executing a predetermined logic operation based on the generated 2M+1 binary sequences to generate random variables.

A storage medium according to this invention is readable by a computer and has stored a program for generating random variables and controlling the computer in such a manner as to generate a real-valued sequence along a chaotic orbit in accordance with a predetermined nonlinear map with a given real value as an initial seed; perform binarization on each real value in the generated real-valued sequence with given 2M+1 (M being an integer equal to or greater than 1) values as thresholds to generate 2M+1 binary sequences; and execute a predetermined logic operation based on the generated 2M+1 binary sequences to generate random variables.

A random variable generating method according to this invention comprises the steps of generating a real-valued sequence along a chaotic orbit in accordance with a predetermined nonlinear map with a given real value as an initial seed; sequentially delaying the generated real-valued sequence in accordance with given m types of delay amounts (m being an integer equal to or greater than 1); performing predetermined binarizations on the real-valued sequence undelayed and on each of the m real-valued sequences to produce m+1 binary sequences; and executing a predetermined logic operation based on the generated m+1 binary sequences to generate random variables.

According to this invention, the random variable generating method is characterized in that based on a plurality of random variables generated by the method according to claim 36, a predetermined logic operation is performed to generate random variables to be output.

An enciphering apparatus according to this invention comprises real-valued sequence generation means for generating a real-valued sequence along a chaotic orbit in accordance with a predetermined nonlinear map using a real value, indicated by a first common key, as an initial seed; binarization means for performing binarization on each real value in the generated real-valued sequence with 2M+1 (M being an integer equal to or greater than 1) values indicated by a second common key as thresholds to generate 2M+1 binary sequences; first logic operation means for executing a predetermined first logic operation based on the generated 2M+1 binary sequences to generate a keystream sequence; and second logic operation means for executing a predetermined second logic operation based on a binary sequence of a plaintext and the keystream sequence to generate a binary sequence of a ciphertext.

According to this invention, the enciphering apparatus as in claim 38 is characterized in that the first logic operation and the second logic operation are both exclusive ORs.

According to this invention, the enciphering apparatus as in claim 38 is characterized in that the 2M+1 thresholds $t_r$ (r=0 to 2M) satisfy relationships $t_r+t_{2M-r}=d+e$ and $t_i \neq t_j$ (when $i \neq j$) where d and e are respectively a minimum value and a maximum value the nonlinear map can take.

According to this invention, the enciphering apparatus as in claim 38 is characterized in that the nonlinear map has an equidistributivity of the invariant measure, symmetric property of the invariant measure and symmetric property of the map.

According to this invention, the enciphering apparatus as in claim 38 is characterized in that ideal random variables are produced by using, as the nonlinear map, one having an equidistributivity of the invariant measure, symmetric property of the invariant measure and symmetric property of the map, and permitting the 2M+1 thresholds $t_r$ (r=0 to 2M) to satisfy relationships $t_r+t_{2M-r}=d+e$ and $t_i \neq t_j$ (when i≠j) where d and e are respectively a minimum value and a maximum value the nonlinear map can take.

An enciphering apparatus according to this invention comprises real-valued sequence generation means for generating a real-valued sequence along a chaotic orbit in accordance with a predetermined nonlinear map having an equidistributivity of the invariant measure, symmetric property of the invariant measure and symmetric property of the map, using a real value, indicated by a first common key, as an initial seed; binarization means for performing binarization on each real value in the generated real-valued sequence with 2M+1 (M being an integer equal to or greater than 1) values indicated by a second common key as thresholds to generate 2M+1 binary sequences; first exclusive OR means for performing an exclusive OR of the generated 2M+1 binary sequences to generate a keystream sequence; and second exclusive OR means for performing an exclusive OR of a binary sequence of a plaintext and the keystream sequence to generate a binary sequence of a ciphertext, whereby a binary sequence of ideal random variables is generated by using, as the nonlinear map, one having an equidistributivity of the invariant measure, symmetric property of the invariant measure and symmetric property of the map, and permitting the 2M+1 thresholds $t_r$ (r=0 to 2M) to satisfy relationships $t_r+t_{2M-r}=d+e$ and $t_i \neq t_j$ (when i≠j) where d and e are respectively a minimum value and a maximum value the nonlinear map can take.

According to this invention, the enciphering apparatus as in one of claims 38 through 43 is characterized in that when the nonlinear map has a predetermined number of parameters, at least one of the parameters is used as a common key.

According to this invention, the enciphering apparatus as in one of claims 38 through 43 is characterized in that the nonlinear map is a Chebyshev map expressed by a differential equation $\omega_{n+1}=\cos(k \cos^{-1}\omega_n)$ where k is a real number equal to or greater than 2; and the first common key is information indicative of an initial seed $\omega_0$ of the Chebyshev map ($-1<\omega_0<1$) and the parameter k.

According to this invention, the enciphering apparatus as in claims 50–55 is characterized in that the parameter k takes an even-numbered value.

According to this invention, the enciphering apparatus as in one of claims 38 through 43 is characterized in that the real-valued sequence generation means executes a program described in a predetermined language by using a floating-point computing device to generate a sequence of values of the nonlinear map.

An enciphering apparatus according to this invention comprises real-valued sequence generation means for generating a real-valued sequence along a chaotic orbit in accordance with a predetermined nonlinear map using a real value, indicated by a first common key, as an initial seed; delay means for sequentially delaying the generated real-valued sequence in association with one or plural kinds of delay amounts indicated by a second common key; a plurality of binarization means, provided in association with the real-valued sequence output from the real-valued sequence generation means and one or a plurality of real-valued sequences delayed by a predetermined amount and output by the delay means, for performing predetermined binarizations on individual real values in the associated real-valued sequences based on associated third common keys; first logic operation means for executing a predetermined first logic operation based on a plurality of generated binary sequences to generate a keystream sequence; and second logic operation means for executing a predetermined second logic operation based on a binary sequence of a plaintext and the keystream sequence to generate a binary sequence of a ciphertext.

According to this invention, the enciphering apparatus as in claim 68 is characterized in that the real-valued sequence generation means, the delay means, the plurality of binarization means and the first logic operation means are provided for each of a plurality of systems; and wherein the apparatus further comprises fourth logic operation means for performing a predetermined fourth logic operation based on a binary sequence output from the first logic operation means in each system to generate a keystream sequence, whereby based on a binary sequence of a plaintext and the keystream sequence, the second logic operation means performs the second predetermined logic operation to generate a binary sequence of a ciphertext.

According to this invention, the enciphering apparatus as in claim 68 or 69 is characterized in that each of the plurality of binarization means includes binarization means for performing predetermined binarization on individual real values in the associated real-valued sequence using a plurality of values, indicated by that one of the third common keys which is associated with the binarization means, as thresholds to generate a plurality of binary sequences, and third logic operation means for performing predetermined third logic operation based on the plurality of generated binary sequences to generate the binary sequences to be given to the first logic operation means.

According to this invention, the enciphering apparatus as in claim 68 or 69 is characterized in that each of the plurality of binarization means binarizes individual real values in the associated real-valued sequence using a value, indicated by that one of the third common keys which is associated with the binarization means, as a threshold.

According to this invention, the enciphering apparatus as in claim 68 or 69 is characterized in that each of the plurality of binarization means binarizes individual real values in the associated real-valued sequence by selecting values at bit positions of values in binary representation, acquired by normalizing the real values in a predetermined range.

A deciphering apparatus according to this invention comprises real-valued sequence generation means for generating a real-valued sequence along a chaotic orbit in accordance with a predetermined nonlinear map using a real value, indicated by a first common key, as an initial seed; binary sequence generation means for performing binarization on each real value in the generated real-valued sequence with 2M+1 (M being an integer equal to or greater than 1) values indicated by a second common key as thresholds to generate 2M+1 binary sequences; first logic operation means for executing a predetermined first logic operation based on the generated 2M+1 binary sequences to generate a keystream sequence; and second logic operation means for executing a predetermined second logic operation based on a binary sequence of a ciphertext and the keystream sequence to generate a binary sequence of a plaintext.

According to this invention, a keystream generating apparatus for use in a stream enciphering apparatus or a stream deciphering apparatus for performing a logic operation on a binary sequence of a plaintext or a ciphertext and a keystream sequence generated based on a predetermined common key to generate a ciphertext or an original plaintext comprises real-valued sequence generation means for generating a real-valued sequence along a chaotic orbit in accordance with a predetermined nonlinear map using a real value, indicated by a first common key, as an initial seed; binary sequence generation means for performing binarization on each real value in the generated real-valued sequence with 2M+1 (M being an integer equal to or greater than 1) values indicated by a second common key as thresholds to generate 2M+1 binary sequences; and logic operation means for executing a predetermined logic operation based on the generated 2M+1 binary sequences to generate a keystream sequence.

An enciphering method according to this invention comprises the steps of generating a real-valued sequence along a chaotic orbit in accordance with a predetermined nonlinear map using a real value, indicated by a first common key, as an initial seed; performing binarization on each real value in the generated real-valued sequence with 2M+1 (M being an integer equal to or greater than 1) values indicated by a second common key as thresholds to generate 2M+1 binary sequences; executing a predetermined first logic operation based on the generated 2M+1 binary sequences to generate a keystream sequence; and executing a predetermined second logic operation based on a binary sequence of a plaintext and the keystream sequence to generate a binary sequence of a ciphertext.

An enciphering method according to this invention comprises the steps of generating a real-valued sequence along a chaotic orbit in accordance with a predetermined nonlinear map having an equidistributivity of the invariant measure, symmetric property of the invariant measure and symmetric property of the map, using a real value, indicated by a first common key, as an initial seed; performing binarization on each real value in the generated real-valued sequence with 2M+1 (M being an integer equal to or greater than 1) values indicated by a second common key as thresholds to generate 2M+1 binary sequences; performing an exclusive OR of the generated 2M+1 binary sequences to generate a keystream sequence; and performing an exclusive OR of a binary sequence of a plaintext and the keystream sequence to generate a binary sequence of a ciphertext, whereby a binary sequence of ideal random variables is generated by using, as the nonlinear map, one having an equidistributivity of the invariant measure, symmetric property of the invariant measure and symmetric property of the map, and permitting the 2M+1 thresholds $t_r$ (r=0 to 2M) to satisfy relationships $t_r+t_{2M-r}$=d+e and $t_i \neq t_j$ (when i≠j) where d and e are respectively a minimum value and a maximum value the nonlinear map can take.

A deciphering method according to this invention comprises the steps of generating a real-valued sequence along a chaotic orbit in accordance with a predetermined nonlinear map using a real value, indicated by a first common key, as an initial seed; performing binarization on each real value in the generated real-valued sequence with 2M+1 (M being an integer equal to or greater than 1) values indicated by a second common key as thresholds to generate 2M+1 binary sequences; executing a predetermined first logic operation based on the generated 2M+1 binary sequences to generate a keystream sequence; and executing a predetermined second logic operation based on a binary sequence of a ciphertext and the keystream sequence to generate a binary sequence of a plaintext.

According to this invention, a keystream generating method in a keystream generating apparatus for use in a stream enciphering apparatus or a stream deciphering apparatus for performing a logic operation on a binary sequence of a plaintext or a ciphertext and a keystream sequence generated based on a predetermined common key to generate a ciphertext or an original plaintext comprises the steps of generating a real-valued sequence along a chaotic orbit in accordance with a predetermined nonlinear map using a real value, indicated by a first common key, as an initial seed; performing binarization on each real value in the generated real-valued sequence with 2M+1 (M being an integer equal to or greater than 1) values indicated by a second common key as thresholds to generate 2M+1 binary sequences; and executing a predetermined logic operation based on the generated 2M+1 binary sequences to generate a keystream sequence.

The individual inventions as recited in claims 44 through 67 taken singly or in combination can be adapted to the inventions as recited in claims 26, and 34 to 37.

The individual inventions as recited in claims 39 through 67 taken singly or in combination can be adapted to the inventions as recited in claims 68 to 81.

The individual inventions as recited in claims 68 to 75 may be embodied as enciphering methods. They may be embodied as deciphering apparatuses and deciphering methods if a plaintext is replaced with a ciphertext.

The individual inventions, for example, the methods as recited in claims 27 to 33, 36, 37 and 78 to 81, and the inventions as recited in claims 39 to 67 taken singly or in combination may be embodied as storage media which are readable by a computer and have stored programs for controlling the computer to perform in the aforementioned operations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 8 is a diagram exemplifying the third structure of the chaotic bit sequence generator in this embodiment;

FIG. 9 is a diagram exemplifying the fourth structure of the chaotic bit sequence generator in this embodiment;

FIGS. 10A through 10C show diagrams illustrating the mean and variance of the empirical measures of the probability of 1's in each chaotic bit sequence;

FIG. 11 is a diagram showing values of Q with respect to several bit numbers i and j;

FIGS. 12A and 12B illustrate diagrams showing the linear complexity of a sequence of a period N;

FIGS. 14A and 14B illustrate diagrams showing the mean and variance of the empirical measures of the relative frequency;

FIGS. 15A and 15B illustrate diagrams showing the mean and variance of the empirical measures of the conditional probabilities;

FIGS. 17A and 17B illustrate diagrams for explaining deciphering transformation using a crosscorrelation function;

FIGS. 18A and 18B illustrate diagrams for explaining deciphering transformation using a crosscorrelation function;

FIGS. 19A and 19B illustrate diagrams showing averaged powerspectra of ciphertexts according to this embodiment;

FIGS. 20A and 20B show diagrams illustrating averaged powerspectra of ciphertexts according to the prior art;

FIG. 21 is a diagram showing computation times needed for the enciphering and deciphering transformation according to individual methods in comparison with one another;

FIG. 22 is a diagram exemplifying the structure of a chaotic bit sequence generator;

FIG. 23 is a diagram for explaining generation of a real-valued sequence and binarization;

FIG. 24 is a diagram for explaining generation of a real-valued sequence and binarization;

FIG. 25 is a diagram for explaining generation of a real-valued sequence and binarization;

FIG. 26 is a diagram for explaining generation of a real-valued sequence and a bit selecting process;

FIG. 27 is a diagram for explaining generation of a real-valued sequence and binarization;

FIG. 29 is a diagram for explaining how to generate a binary sequence by the chaotic bit sequence generator having the multilevel structure of level 1;

FIG. 31 is a diagram for explaining how to generate a binary sequence by the chaotic bit sequence generator having the multilevel structure of level 2;

FIG. 32 is a diagram for explaining how to generate a binary sequence by the chaotic bit sequence generator having the multilevel structure of level 2;

FIG. 33 is a diagram for explaining how to generate a binary sequence by the chaotic bit sequence generator having the multilevel structure of level 2;

FIG. 34 is a diagram for explaining how to generate a binary sequence by the chaotic bit sequence generator having the multilevel structure of level 2;

FIGS. 35A and 35B illustrate diagrams showing computation times needed to generate sequences according to individual methods in comparison with one another; and FIGS. 36A and 36B illustrate diagrams showing computation times needed for enciphering or deciphering operation according to individual methods in comparison with one another.

DETAILED DESCRIPTION OF THE PREFERRED EMBODIMENTS

Figure 1:
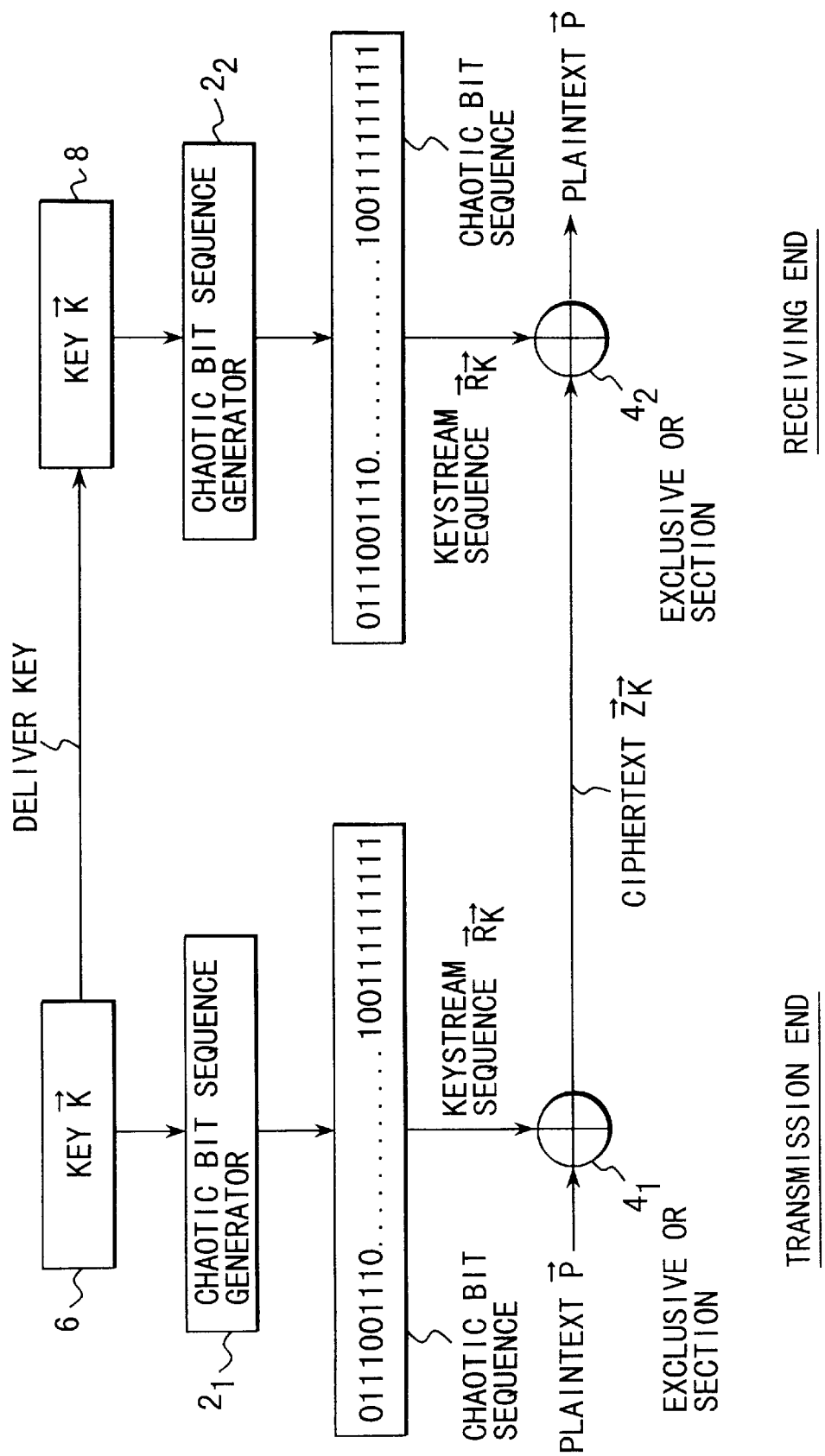
FIG. 1 is a diagram illustrating the basic structure of a cipher system according to one embodiment of this invention.

Embodiments of this invention will now be described with reference to the accompanying drawings.

In a stream cipher for performing a bit-by-bit predetermined logic operation (generally, an exclusive OR operation) on a keystream sequence (binary sequence) generated based on a binary sequence of a plaintext and a predetermined common key to generate a ciphertext, this invention generates a real-valued sequence along a chaotic orbit from a predetermined nonlinear map and performs predetermined binarization of this sequence to acquire chaotic bit sequences (two types of balanced binary sequences, namely, a chaotic threshold sequence and a chaotic bit sequence) that is used as a keystream sequence.

To begin with, the basic principle of this invention will be described.

Note that $\{x_n\}_{n=0}^m$ represents $\{x_0, x_1, x_2, \ldots, x_{m-1}, x_m\}$.

$\vec{P}$ represents a bit sequence of a plaintext.

$\vec{K}$ denotes a predetermined number of common keys used in enciphering/deciphering transformation.

$\vec{R}$ denotes a keystream sequence (bit sequence), and $\vec{R}_{\to K}$ denotes a keystream sequence (bit sequence) generated from common keys $\vec{K}$.

$\vec{Z}$ denotes a bit sequence of a ciphertext, and $\vec{Z}_{\to K}$ denotes a bit sequence of a ciphertext with common keys $\vec{K}$.

The simplest mathematical objects which can display chaotic behavior are a class of one-dimensional maps (references 23 and 24) as expressed by $$\omega_{n+1} = \tau(\omega_n), \omega_n \in I, n=0,1,2,\ldots \quad (1)$$

where $\omega_n = \tau^n(\omega_0)$.

The time average of any $L_1$ function $F(\omega)$, $F_N(\omega)$, along an orbit $\{(\omega_n)\}_{n=0}^{N-1}$ from an initial seed $\omega = \omega_0$ is defined by $$F_N(\omega) = \frac{1}{N}\sum_{n=0}^{N-1} F(\omega_n) \quad (2)$$

According to the Birchoff individual ergodic theorem (reference 24), $$\lim_{N\to\infty} F_N(\omega) = \langle F \rangle_\tau \text{ a.e.,} \quad (3)$$

under the assumption that $\tau(\omega)$ is ergodic on an interval I with respect to an absolutely continuous invariant (ACI) measure, denoted by $f^*(\omega)d\omega$, and where $\langle F \rangle_\tau$ is the ensemble average of $F(\omega)$ over I, defined by $$\langle F \rangle \tau = \int_I F(\omega) f^*(\omega) d\omega \quad (4)$$

While there are various nonlinear maps that can be used, let us consider the iterates of the Chebyshev map of degree $k \geq 2$ (references 29 and 30), given by $$\omega_{n+1} = \cos(k \cos^{-1}\omega_n), \omega_n \in I = [-1,1] \quad (5)$$

with its ACI measure $f^*(\omega)d\omega$ given by $$f^*(\omega)d\omega = \frac{d\omega}{\pi\sqrt{1-\omega^2}} \quad (6)$$

as one example of the mentioned nonlinear maps.

Note that $\omega_n$ is a polynomial in $\omega = \omega_0$ always of degree $k^n$ whose coefficients are integer, and hence that each point $\omega_n$ except $\pm 1$ has $k^n$ distinct preimages in I. Furthermore, the Chebyshev map has chaotic orbits for almost all seeds $\omega = \omega_0$ for which the autocorrelation function is the delta function (reference 31). Such situations motivated us to discuss statistical properties of chaotic orbits generated by the Chebyshev map (reference 21).

The following describes several ways of generating a binary sequence (i.e., a keystream sequence used in a stream cipher) from a chaotic real-valued sequence based on the ergodic maps $\tau(\cdot)$. As will be seen, those schemes are effective to simultaneously generate unpredictable binary sequences of independent and identically distributed (i.i.d.) random variables from an ergodic map.

Method 1: Using a threshold function defined by $$\Theta_\alpha(\omega) = \begin{cases} 0 & \text{for } \omega < \alpha \\ 1 & \text{for } \omega \geq \alpha \end{cases} \quad (7)$$

a binary sequence $\{\Theta_\alpha(\omega_n)\}_{n=0}^\infty$, which is referred to as a chaotic threshold sequence, is obtained for a threshold $\alpha$ given as a common key. This sequence is also referred to as a Chebyshev threshold sequence when $\tau(\cdot)$ is a Chebyshev map.

Method 2: This method is based on a binary expansion of the absolute value of $\omega$ when $|\omega| \leq 1$ as follows.

The absolute value of $\omega$ ($|\omega| \leq 1$) is expressed in a binary representation as follows:

$$|\omega| = 0.A_1(\omega)A_2(\omega)\ldots A_i(\omega)\ldots, A_i(\omega) \in \{0,1\}, |\omega| \leq 1 \quad (8)$$

The i-th bit $A_i(\omega)$ can be expressed as $$A_i(\omega) = \sum_{r=1}^{2^i-1} (-1)^{r-1} \tilde{\Theta}_{\frac{r}{2^i}}(\omega) \quad (9)$$

where $$\tilde{\Theta}_\alpha(\omega) = \begin{cases} 0 & \text{for } |\omega| < \alpha \\ 1 & \text{for } |\omega| \geq \alpha \end{cases}, (\alpha \geq 0) \quad (10)$$

Giving the bit number i indicating the bit position of $\omega$ in a binary representation as a common key yields a binary sequence $\{A_i(\omega_n)\}_{n=0}^\infty$ which is called a chaotic bit sequence. This sequence is also called a Chebyshev bit sequence when $\tau(\cdot)$ is a Chebyshev map. The Chebyshev threshold sequence and Chebyshev bit sequence are generally called Chebyshev binary sequences.

Since $^{18} \Theta_{60}$ can be regarded as a Boolean function whose variable, $\omega$, is not binary but real, $A_i(\omega)$ can be rewritten as $$A_i(\omega) = \tilde{\Theta}_{\frac{1}{2^i}}(\omega) \oplus \tilde{\Theta}_{\frac{2}{2^i}}(\omega) \oplus \cdots \oplus \tilde{\Theta}_{\frac{2^i-1}{2^i}}(\omega) \quad (11)$$

where $\oplus$ denotes modulo 2 addition (or exclusive OR operation).

Method 3: For any map $\tau(\cdot)$ defined on the interval $I=[d, e]$, however, a generalized version of the second method is given as Method 3, as follows. The value of $(\omega-d)/(e-d)$ in a binary representation is given by $$\omega-d/e-d = 0.B_1(\omega)B_2(\omega)\ldots B_i(\omega)\ldots, B_i(\omega)\in\{0,1\}, \omega\in[d,e] \quad (12)$$

The i-th bit $B_i(\omega)$ can be expressed as $$B_i(\omega) = \sum_{r=1}^{2^i-1} (-1)^{r-1} \Theta_{(e-d)\frac{r}{2^i}+d}(\omega) \quad (13)$$

Thus, giving the bit number i indicating the bit position of $\omega$ in a binary representation as a common key yields a binary sequence $\{B_i(\omega_n)\}_{n=0}^\infty$. Note that $B_i(\omega)$ can also be rewritten as the form of modulo 2 addition of threshold sequences. If the interval $I=\{0, 1\}$, then $A_i(\omega)=B_i(\omega)$. Thus each of $\{A_i(\omega_n)\}_{n=0}^\infty$ and $\{B_i(\omega_n)\}_{n=0}^\infty$ is referred to as a chaotic bit sequence.

Method 4: Binarization of each real value $\omega$ in a real-valued sequence generated from a map $\tau(\cdot)$ is performed as given by equation (14). Given that T denotes a threshold set $\{t_r\}_{r=1}^M$, then T becomes a common key. The number of thresholds, M, can be set arbitrarily.

$$C_T(\omega) = \Theta_{t_1}(\omega) \oplus \Theta_{t_2}(\omega) \oplus \ldots \oplus \Theta_{t_M}(\omega) \quad (14)$$

In this method, M pieces of binary data are acquired from the individual real values in a real-valued sequence from a threshold function, defined by equation (7), in accordance with thresholds $\{t_1, t_2, \ldots, t_M\}$ given as common keys, and exclusive OR of those binary data is then performed.

Each of $\Theta_\alpha(\omega)$, $A_i(\omega)$ and $B_i(\omega)$ in Methods 1 to 3 can be expressed in the form of modulo 2 addition of a threshold sequence given by equation (14). Therefore, Method 4 is a more generalized method.

Note that instead of an exclusive OR operation, another operation like an exclusive AND operation may be performed.

Furthermore, binarization with a threshold function may be replaced with binarization by Method 2 or Method 3 in which case common keys become a plurality of bit numbers.

A description will now be given of the binary additive stream ciphers in which the chaotic bit sequence (e.g., the Chebyshev threshold sequence or Chebyshev bit sequence) acquired in the above-described manner is used.

In this embodiment, a common key (secret key) $\vec{K}=(s_1, s_2, \ldots, s_M)$ is used only to control the keystream generator which generates a keystream sequence $\vec{R}=(R_1, R_2, \ldots)$.

Common keys are classified into a first common key and a second common key in this embodiment. The first common key is used to generate a real-valued sequence, while the second common key is used for the binarization of the generated real-valued sequence. Each of the first common key and second common key may be a single key or may have a plurality of keys.

When the Chebyshev map as defined by equation (5) is used, the first common keys are the initial seed $\omega_0$ and the parameter k.

The second common key is a threshold $\alpha$ for Method 1, a bit number i indicating the bit position of $\omega$ in a binary representation for Methods 2 and 3, and a threshold set $\{t_r\}_{r=1}^M$ for Method 4.

In this embodiment, common keys contain real values.

Given that $\vec{R}_\Theta = \{\Theta_\alpha(\omega_n)\}_{n=0}^\infty$ (or $\vec{R}_A = \{A_i(\omega_n)\}_{n=0}^\infty$ and $\vec{R}_B = \{B_i(\omega_n)\}_{n=0}^\infty$), define its common key as $\vec{K}(\Theta_\alpha) = (k, \Theta_0, \alpha)$ (or $\vec{K}(A_i) = (k, \omega_0, i)$ and $\vec{K}(B_i) = (k, \Theta_0, i)$.

As those binary sequences can generally be expressed by $C_T(\omega)$ in equation (14), the secret key $\vec{K}(C_T)$ is expressed as $\vec{K}(C_T) = (k, \omega_0, T)$.

The bits in ciphertexts defined by $\vec{Z}_\Theta = (z_1, z_2, \ldots)$ (or $\vec{Z}_A$ and $\vec{Z}_B$) are acquired as shown in equation (15 by a simple modulo 2 addition of bits of a plaintext of binary value, $\vec{P} = (p_1, p_2, \ldots)$ and the secret.

$$z_n = P_n \oplus r_n, n=1,2,\ldots \qquad (15)$$

Deciphering is executed by equation (16).

$$P_n = z_n \oplus r_n, n=1,2 \ldots \qquad (16)$$

Floating-point computation is needed to get each of those binary sequences. However, the floating-point environment, IEEE Standard 754, which nearly all computers implement makes it easier to write numerical programs for enciphering and deciphering transformation as follows. The IEEE Standard format exactly specifies the following single precision and double precision floating-point formats:

1) For IEEE single (or C float), exponent and significant bits are 8 bits and 24 bits, respectively, and hence the total bits are 32; and 2) For IEEE double (or C double), they are 11 bits and 53 bits, respectively, and hence the total bits are 64.

The Math Library of C also provides elementary functions such as $\cos \omega$ and $\cos^{-1} \omega$, each of which carries out double precision floating-point calculations for a double-precision argument $\omega$.

If, for a 64-bit precision orbit $\{\omega_n\}_{n=0}^\infty$ with a randomly chosen integer k satisfying $2 \leq k \leq 2^{20}$, a real-valued $\alpha$ ($\tilde{\ }0$) (or an integer i satisfying $8 \leq 50$), $\{\Theta_\alpha(\omega_n)\}_{n=0}^\infty$ (or $\{B_i(\omega_n)\}_{n=0}^\infty$) can be obtained from a 160 (=32+64+64)-bit $\vec{K}(\Theta_\alpha)$ (or a 128 (=32+64+32)-bit $\vec{K}(B_i)$). Such a balanced binary sequence therefore provides a good pseudo-random variable generator.

The structure of this embodiment will now be discussed specifically.

FIG. 1 shows the basic structure of a stream cipher system according to one embodiment of this invention.

An apparatus for enciphering a plaintext to prepare a ciphertext (hereinafter it is called a transmission-end apparatus) comprises a chaotic bit sequence generator $2_1$, which generates a keystream sequence (chaotic bit sequence) $\vec{R}_{\to K}$ using a common key $\vec{K}$ (6 in FIG. 1) necessary for enciphering and deciphering, and an exclusive OR section $4_1$, which performs an exclusive OR operation on the generated keystream sequence $\vec{R}_{\to K}$ and a binary sequence of an input plaintext $\vec{P}$ bit by bit to generate a binary sequence of a ciphertext $\vec{Z}_{\to K}$.

An apparatus for deciphering a ciphertext to generate the original plaintext (hereinafter it is called a receiving-end apparatus) comprises a chaotic bit sequence generator $2_2$, which generates a keystream sequence (chaotic bit sequence) $\vec{R}_{\to K}$ using a common key $\vec{K}$ (8 in FIG. 1) delivered from the transmission-end apparatus, and an exclusive OR section $4_2$, which performs an exclusive OR operation on the generated keystream sequence $\vec{R}_{\to K}$ and a binary sequence of the ciphertext $\vec{Z}_{\to K}$, delivered from the transmission-end apparatus, bit by bit to generate a binary sequence of the original ciphertext $\vec{P}$.

Each of the chaotic bit sequence generators $2_1$ and $2_2$ has a chaos generator for generating a real-valued sequence along a chaotic orbit according to the first common key and a predetermined nonlinear map, and a bit generator for performing predetermined binarization on the individual real values in the generated real-valued sequence to generate a keystream sequence.

The chaotic bit sequence generator $2_1$ of the transmission-end apparatus and the chaotic bit sequence generator $2_2$ of the receiving-end apparatus have the same logic structures. If the common keys $\vec{K}$ are the same, therefore, the keystream sequences $\vec{R}_{\to K}$ to be generated by both apparatuses are identical to each other.

The exclusive OR section $4_1$ of the transmission-end apparatus and the exclusive OR section $4_2$ of the receiving-end apparatus may both be replaced with exclusive AND functions. Other logic operations may be used as well. The following describes the case where exclusive OR is performed.

In the transmission-end apparatus, prior to cryptography of the plaintext $\vec{P}$, the common key $\vec{K}$ to be used is selected by a common key selector (not shown). There are various well known ways to select the common key $\vec{K}$, one of which can generally be used. For example, numbers may be given to previously prepared keys and the key having the number corresponding to a random variable when generated may be selected. When the key is a real value, the value of the random variable when generated or a value acquired by linear transform of that random variable may be used directly as the key. In this invention, while the number of keys can be changed specifically, the number of keys may be selected at random. Of course, keys or the number of keys can be selected freely not based on random variables but according to other information.

The transmission-end apparatus delivers a common key together with a ciphertext. The content of the common key may be delivered directly or information corresponding to the content of the common key may be delivered instead.

In delivering a common key, the common key or its corresponding information should be enciphered before transfer. In this example, the common key is to be enciphered by a well-known cryptosystem, such as the RSA cryptosystem.

The transmission-end apparatus outputs a common key necessary to decipher the generated ciphertext from its output section (not shown). Various ways are available to output the ciphertext and the common key to the receiving-end apparatus.

When the transmission-end apparatus and the receiving-end apparatus are connected by a network, the output section should have a function to send the ciphertext and common key to the network in accordance with a predetermined protocol. When the transmission-end apparatus transfers the ciphertext and common key via radio transmission, the output section should be capable of modulating and sending the ciphertext and common key. When the ciphertext and common key are stored on a portable storage medium through which they are given to the receiving-end apparatus, the output section should be able to write the ciphertext and common key on such a storage medium.

The receiving-end apparatus receives at the input section (not shown) the ciphertext $\vec{Z}_{\to K}$ and the common key $\vec{K}$ necessary for deciphering the ciphertext, both generated by the transmission-end apparatus.

When the receiving-end apparatus is connected to the transmission-end apparatus by a network, the input section should have a function to receive information transferred via the network and extract the ciphertext and common key. When the receiving-end apparatus receives the ciphertext and common key transferred from the transmission-end apparatus via radio transmission, the input section should be capable of receiving and demodulating the transferred signal to extract the ciphertext and common key. When the ciphertext and common key are stored on a portable storage medium through which the receiving-end apparatus them, the input section should be able to read the ciphertext and common key from such a storage medium.

If the common key is enciphered, a key deciphering section (not shown) deciphers the common key according to a predetermined method before deciphering the ciphertext. When what is obtained by the deciphering operation is information corresponding to the common key, the content of the actual common key is acquired from this information by, for example, referring to the proper table.

Figure 2:
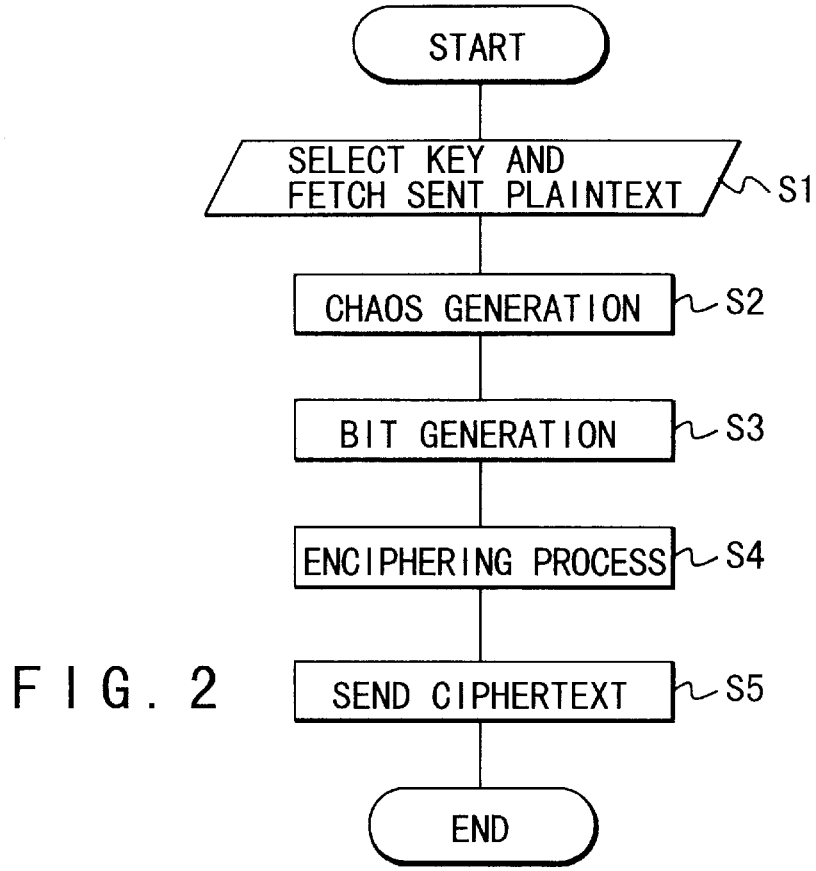
FIG. 2 is a flowchart exemplifying the sequence of processes executed by a transmission-end apparatus according to this embodiment.

FIG. 2 presents a flowchart exemplifying the sequence of processes the transmission-end apparatus executes in this embodiment.

(Step S1)

First, common keys (a predetermined number of first common keys and a predetermined number of second common keys) necessary for an enciphering/deciphering operation are selected. The selected common keys are enciphered by the RSA cryptosystem or the like, if necessary, and are transmitted to the receiving-end apparatus.

Then, a binary sequence of a plaintext to be enciphered is fetched.

(Step S2)

The chaos generator in the chaotic bit sequence generator $2_1$ generates a real-valued sequence according to the selected first common key(s) and a predetermined nonlinear map.

(Step S3)

The bit generator in the chaotic bit sequence generator $2_1$ performs predetermined binarization on the individual real values in the generated real-valued sequence based on the selected second common key(s) to generate a keystream sequence (binary sequence).

(Step S4)

The exclusive OR section $4_1$ performs exclusive OR of the input binary sequence of the plaintext and the generated keystream sequence to generate a ciphertext.

(Step S5)

The generated ciphertext is sent to the receiving-end apparatus.

Figure 3:
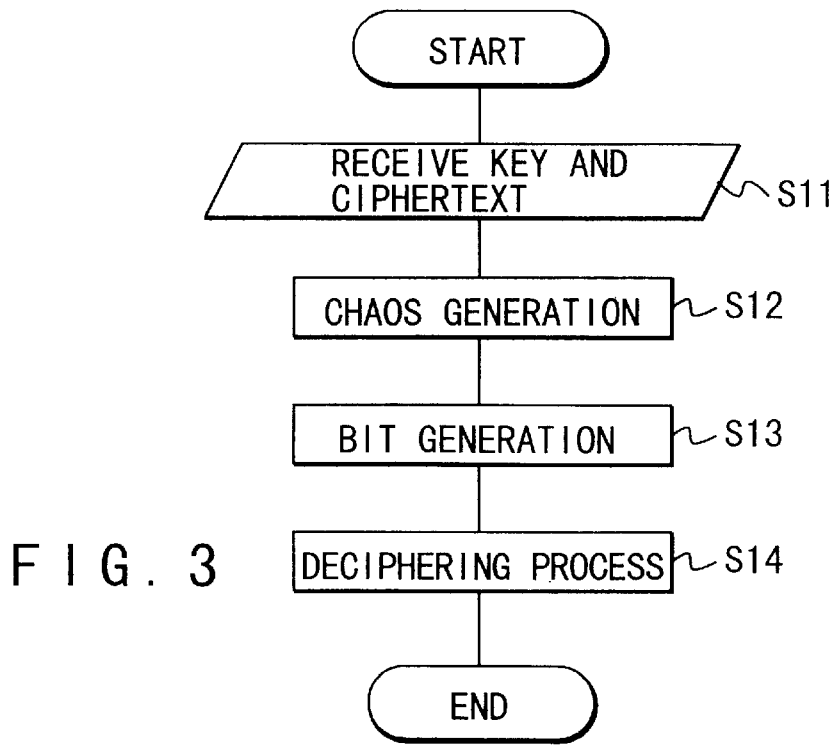
FIG. 3 is a flowchart exemplifying the sequence of processes executed by a receiving-end apparatus according to this embodiment.

FIG. 3 presents a flowchart exemplifying the sequence of processes the receiving-end apparatus executes in this embodiment.

(Step S11)

First, the ciphertext and common keys (a predetermined number of first common keys and a predetermined number of second common keys) necessary for an enciphering/ deciphering operation, both transmitted from the transmission end by a predetermined transfer format, are received.

The input common keys, if enciphered, should be deciphered by the RSA cryptosystem or the like.

(Step S12)

The chaos generator in the chaotic bit sequence generator $2_2$ generates a real-valued sequence according to the acquired first common key(s) and a predetermined nonlinear map.

(Step S13)

The bit generator in the chaotic bit sequence generator $2_2$ performs predetermined binarization on the individual real values in the generated real-valued sequence based on the acquired second common key(s) to generate a keystream sequence (binary sequence).

(Step S14)

The exclusive OR section $4_2$ performs exclusive OR of the input binary sequence of the plaintext and the generated keystream sequence to generate the original plaintext.

The generation of a real-valued sequence, the binarization and the exclusive OR operation may be pipelined to improve their processing speeds.

Now, the chaotic bit sequence generators $2_1$ and $2_2$ which generate a keystream sequence (chaotic bit sequence) $\vec{R}_{\to K}$ using the common keys $\vec{K}$ will be described.

FIGS. 4, 6, 8 and 9 exemplify the structures of the chaotic bit sequence generators $2_1$ and $2_2$. Chaos generators 21, 23, 25 and 27 in those structures are fundamentally the same.

Figures 4, 5:
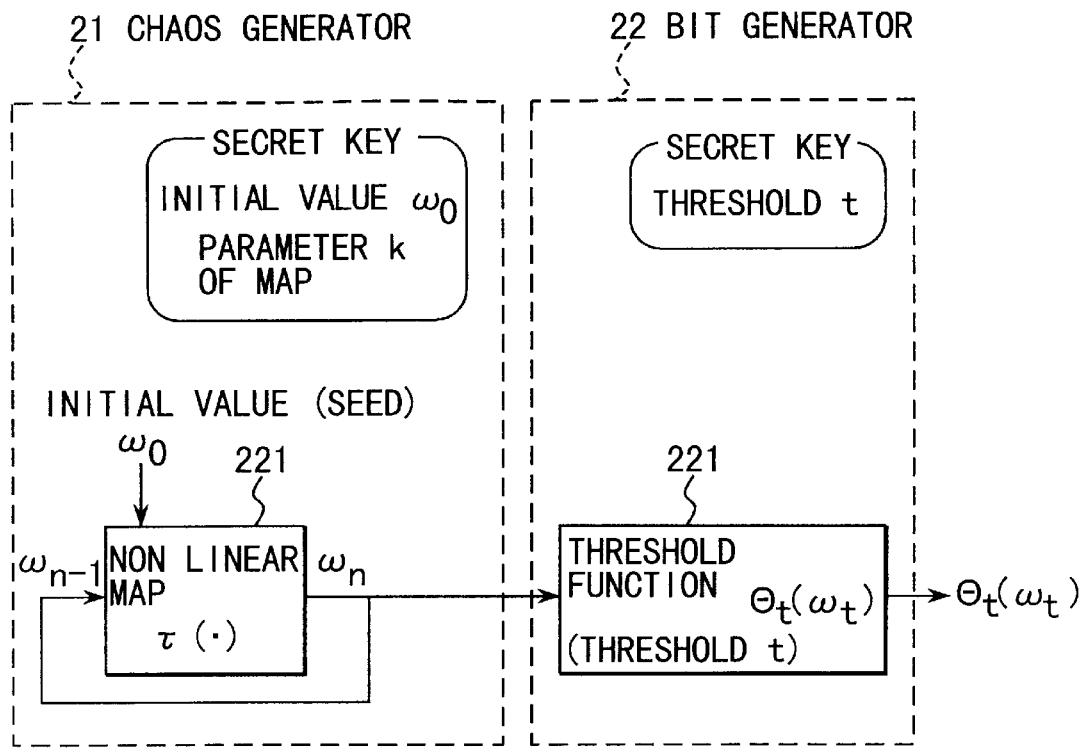
FIG. 4 is a diagram exemplifying the first structure of a chaotic bit sequence generator in this embodiment.
FIG. 5 is a diagram for explaining generation of a real-valued sequence and binarization.

FIG. 4 exemplifies the first structure of the chaotic bit sequence generators $2_1$ and $2_2$. FIG. 5 is a diagram for explaining the generation and binarization of a real-valued sequence $\omega_n$. The first structure is designed to perform the above-described Method 1.

Each of the chaotic bit sequence generators $2_1$ and $2_2$ has a chaos generator 21 and a bit generator 22.

The chaos generator 21 generates a real-valued sequence from the given first common key and a predetermined nonlinear map (211).

When a Chebyshev map as defined by the differential equation (5) is used as the predetermined nonlinear map, for example, the first common keys are an initial seed $\omega_0$ and a parameter k. When $\omega_0=0.3$ and k=2, the real-valued sequence $\omega_n$ becomes as shown in FIG. 5.

The number of parameters k may be 0 or equal to or greater than 2 depending on the nonlinear map used.

The bit generator 31 causes a threshold processor 221 to perform binarization on the individual real values in the generated real-valued sequence using a threshold function defined by equation (7) with a value indicated by the given second common key used as a threshold t.

When the real-valued sequence generated by the chaos generator 21 is as shown in FIG. 5, for example, with the threshold t=0 given by the second common key, binary data $\Theta_0(\omega_0)=1$ is obtained from a real value $\omega_0=0.300000$, and binary data $\Theta_0(\omega_4)=1$ is obtained from a real value $\omega_4=0.161977$, so that $\Theta_{0.3}(\omega_n)=(1, 0, 1, 0, 1, 0, 1, 1, 0, 1, \ldots)$ is generated as a keystream sequence $\vec{R}_{\to K}$. If the threshold t=0.3 is given by the second common key, for example, binary data $\Theta_{0.3}(\omega_0)=1$ is obtained from a real value $\omega_0=0.300000$, and binary data $\Theta_{0.3}(\omega_4)=1$ is obtained from a real value $\omega_4=0.161977$, so that $\Theta_{0.3}(\omega_n)=(1, 0, 1, 0, 0, 0, 1, 0, 0, 1, \ldots)$ is generated as a keystream sequence $\vec{R}_{\to K}$.

It is to be noted that a predetermined process, such as a process of acquiring the absolute values of the individual real values in the generated real-valued sequence or a normalizing process, may be performed prior to binarization, as needed.

As mentioned earlier, the chaos generator 21 can be accomplished by running a program written in a predetermined language using a floating-point computing apparatus.

Figures 6, 7:
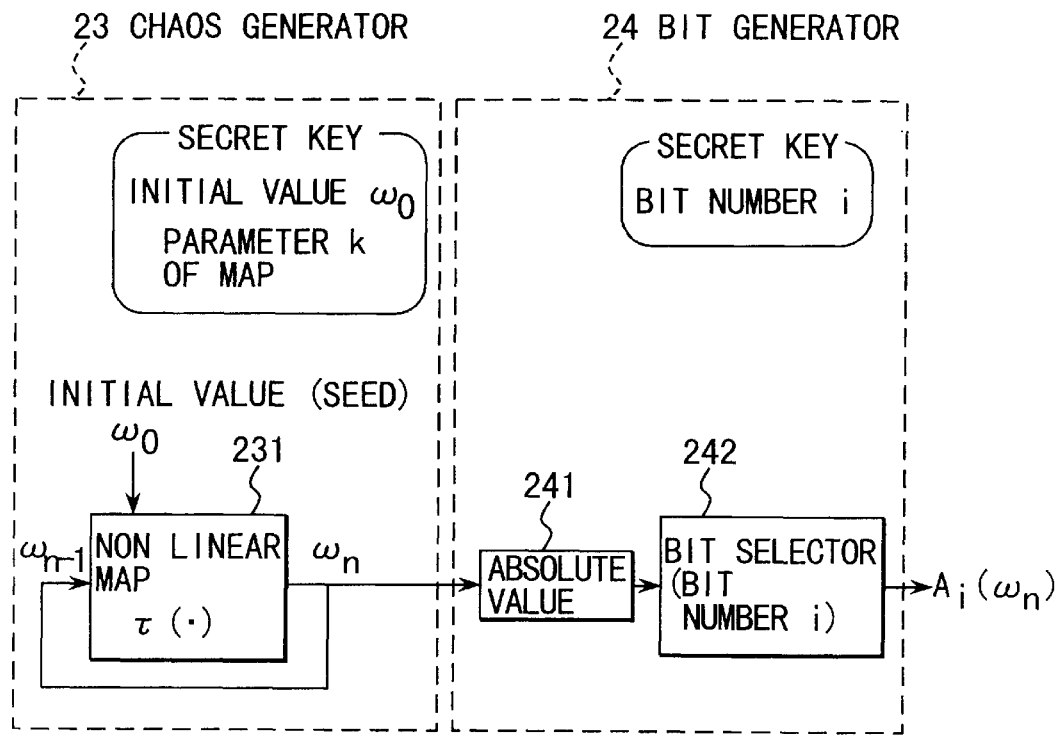
FIG. 6 is a diagram exemplifying the second structure of the chaotic bit sequence generator in this embodiment.
FIG. 7 is a diagram for explaining generation of a real-valued sequence and a bit selecting process.

FIG. 6 exemplifies the second structure of the chaotic bit sequence generator. FIG. 7 is a diagram for explaining the generation of a real-valued sequence $\omega_n$ and bit selection. This structure is designed to perform the above-described Method 2.

The chaotic bit sequence generator has a chaos generator 23 and a bit generator 24.

The bit generator 24 has an absolute value processing section 241 and a bit selector 242.

The chaos generator 23 has the same structure as the previously discussed chaos generator 21, except that the chaos generator 23 generates real-valued sequence of −1 to 1. When the differential equation of a Chebyshev map defined by equation (5) is used as a predetermined nonlinear map and the seed $\omega_0=0.3$ and parameter k=2, a real-valued sequence $\omega_n$ becomes as shown in FIG. 7.

The second common key is a bit number indicating the bit position of a real value in a binary representation.

The bit generator 24 first causes the absolute value processing section 241 to obtain the absolute values of the individual real values in the real-valued sequence.

Next, the bit selector 242 selects a value at the bit position, indicated by the second common key i, of the absolute value of each real value in a binary representation.

When the real-valued sequence generated by the chaos generator 23 is as shown in FIG. 7, with a bit number i given by the second common key, a real value $|\omega_0|=0.300000$ is expressed as 0.01001 . . . in a binary representation and binary data (first decimal position) of 0 is obtained, and a real value $|\omega_1|=0.8200000$ is expressed as 0.11010 . . . in a binary representation and binary data (first decimal position) of 0 is obtained. As a result, $A_1(\omega_n)=(0, 1, 0, 1, 0, 1, 1, 0, 1, 0,$ Likewise, if the bit number=5 is given, $A_5(\omega_n)=(1, 0, 1, 0, 1, 0, 1, 0, 1, 1, \ldots)$ is generated as a keystream sequence $\vec{R}_{\to K}$.

FIG. 8 exemplifies the third structure of the chaotic bit sequence generator, which is designed to perform the aforementioned Method 3.

The chaotic bit sequence generator includes a chaos generator 25 and a bit generator 26.

The bit generator 26 has a normalizing section 261 and a bit selector 262 which is the same as the bit selector 242 in FIG. 6.

The chaos generator 25 has the same structure as the previously discussed chaos generator.

The second common key is a bit number indicating the bit position of a real value in a binary representation.

The bit generator 26 first causes the normalizing section 261 to normalize the individual real values in the real-valued sequence over a predetermined interval.

For an arbitrary map $\tau(\cdot)$ defined over the interval I=[d, e], for example, when normalization with $\omega'=(\omega-d)/(e-d)$ is performed, $\omega'$ takes a value in the interval I'=[0, 1].

Next, the bit selector 262 selects a value at the bit position, indicated by the second common key i, of the absolute value of each real value as done by the second structure.

In this manner, $B_i(\omega_n)$ is generated as a keystream sequence $\vec{R}_{\to K}$.

The second structure generates a real-valued sequence of −1 to 1, acquires the absolute values of the individual real values in the real-valued sequence and then performs binarization, while the third structure generates a real-valued sequence over an arbitrary interval, normalizes the individual real values and then performs binarization. Various other ways are also available for binarization.

FIG. 9 exemplifies the fourth structure of the chaotic bit sequence generator, which executes the aforementioned Method 4. As discussed earlier, binarization of each real value $\omega$ in a real-valued sequence generated from a map $\tau(\cdot)$ is performed by equation (14). Given that T denotes a threshold set $\{t_r\}_{r=1}^M$, then T becomes a common key. The number of thresholds, M, can be set arbitrarily.

The chaotic bit sequence generator includes a chaos generator 27 and a bit generator 27.

The chaos generator 27 has the same structure as the previously discussed chaos generator 21. When the differential equation of a Chebyshev map defined by equation (5) is used as a predetermined nonlinear map and $\omega_0=0.3$ and k=2, a real-valued sequence $\omega_n$ becomes as shown in FIG. 5.

The bit generator 28 has threshold processors 281, 282 and 283 using threshold functions $\Theta_{t1}(\omega_n), \Theta_{t2}(\omega_n), \ldots, \Theta_{tM}(\omega_n)$, and a nonlinear coupling section 284 for nonlinearly coupling plural pieces of bit data output from the individual threshold processors 281–283. The nonlinear coupling is a process of performing an exclusive OR operation of all input data.

For each real value in the generated real-valued sequence, each threshold processor in the bit generator 28 acquires plural pieces of binary data using the values indicated by a plurality of second keys as thresholds. The nonlinear coupling section 284 performs a predetermined nonlinear coupling process, e.g., an exclusive OR operation, on those pieces of binary data.

If the real-valued sequence generated by the chaos generator 27 is as shown in FIG. 5 and thresholds t=0 and t=0.3 are given by two second common keys, as mentioned above, the threshold processors 281 and 282 of the bit generator 28 generate $\Theta_0(\omega_n)=(1, 0, 1, 0, 1, 0, 1, 1, 0, 1, \ldots)$ as the first chaotic bit sequence and $\Theta_{0.3}(\omega_n)=(1, 0, 1, 0, 0, 0, 0, 1, 0, 0, 1, \ldots)$ as the second chaotic bit sequence.

Next, the nonlinear coupling section 284 of the bit generator 28 performs, for example, an exclusive OR operation on $\Theta_0(\omega_n)=(1, 0, 1, 0, 1, 0, 1, 1, 0, 1, \ldots)$ and $\Theta_{0.3}(\omega_n)=(1, 0, 1, 0, 0, 0, 0, 1, 0, 0, 1, \ldots)$, yielding a keystream sequence $\vec{R}_{\to K}=(0, 0, 0, 0, 1, 0, 0, 1, 0, 0, \ldots)$.

The number of the necessary threshold processors can change according to the number of the given second common keys (i.e., the number of thresholds M). If the present structure is accomplished by running a written program on a CPU (Central Processing Unit), a change in the number of threshold processors can easily be coped with.

Before the threshold process, the absolute values of real values may be acquired, or the real values may be normalized, or another predetermined process may be carried out.

Although the ordinary stream cipher process is executed bit by bit, the nonlinear coupling section 284 may perform serial-parallel conversion when the ciphering process is performed block by block for faster parallel processing.

It is to be noted that a bit selector (as in the second or third structure) which uses a plurality of second keys may be used instead of the threshold processors, and nonlinear coupling, e.g., exclusive OR, of the acquired plural pieces of binary data may be performed.

For instance, each threshold processor is replaced with the absolute value processing section 241 and the bit selector 242 in the second structure, and the nonlinear coupling section 284 performs an exclusive OR operation. When a real-valued sequence generated by the chaos generator is as shown in FIG. 7, with bit numbers 1 to 5 given by the second common keys, $A_1(\omega_n)=(0, 1, 0, 1, 0, 1, 1, 0, 1, 0, \ldots)$ is generated as a first chaotic bit sequence, $A_2(\omega_n)=(1, 1, 1, 1, 0, 1, 1, 1, 1, 1, \ldots)$ is generated as a first chaotic bit sequence, $A_3(\omega_n)=(0,0,0,0,1,1,0,0,0,1,\ldots)$ is generated as a first chaotic bit sequence, $A_4(\omega_n)=(0,1,1,0,0,1,0,0,1,1,\ldots)$ is generated as a first chaotic bit sequence, and $A_5(\omega_n)=(1,0,1,0,1,0,1,0,1,1,\ldots)$ is generated as a first chaotic bit sequence.

The nonlinear coupling section 284 then performs an exclusive OR operation on $A_1(\omega_n)$, $A_2(\omega_n)$, $A_3(\omega_n)$, $A_4(\omega_n)$ and $A_5(\omega_n)$, yielding a keystream sequence $\vec{R}_{\to K}=(0,1,1,0,0,0,1,1,0,0,\ldots)$.

The properties of keystream sequences in this invention will be examined to show their effectiveness.

To begin with, a covariance function of a chaotic bit sequence (Chebyshev threshold sequence/Chebyshev sequence) will be examined.

The empirical measures of the probability of 1's in sequences $\{\Theta_\alpha(\omega_n)\}_{n=0}^\infty$, $\{A_i(\omega_n)\}_{n=0}^\infty$ and $\{B_i(\omega_n)\}_{n=0}^\infty$ is approximated by the normal density function with means $\hat{0}\mu(F_N)$ and variance $\hat{0}\rho^2(F_N)$, given by $$\phi(\omega;\hat{\mu}(F_N),\hat{\sigma}^2(F_N)) = \frac{1}{\sqrt{2\pi}\,\hat{\sigma}(F_N)}\exp\left[-\frac{(\omega-\hat{\mu}(F_N))^2}{2\hat{\sigma}^2(F_N)}\right]$$

where $$\hat{\mu}(F_N) = \frac{1}{L}\sum_{m=1}^{L} F_N(\omega_{0m}), \tag{18}$$

$$\hat{\sigma}^2(F_N) = \frac{1}{L}\sum_{m=1}^{L}(F_N(\omega_{0m}) - \hat{\mu}(F_N))^2 \tag{19}$$

FIG. 10 shows the means and variance where (a) $F(\omega)=\Theta_\alpha(\omega)$, (b) $F(\omega)=A_i(\omega)$, and (c) $F(\omega)=B_i(\omega)$. In FIG. 10, $p_\tau(\alpha)=<\Theta_\alpha>_\tau$.

Let $G(\omega)$ and $H(\omega)$ be two $L_1$ functions of bounded variation. Consider two sequences $\{G(\omega_n)\}_{n=0}^\infty$ and $\{H(\omega_n)\}_{n=0}^\infty$, where $\omega_n=\tau^n(\omega)$.

Let $$\rho(l,\omega;G,H)=(G(\omega)-<G>_\tau)(H(\tau^l(\omega))-<H>_\tau) \tag{20}$$

Then, $\rho_N(l,\omega;G,H)$ and $<\rho(l;G,H)>_\tau$ denote the crosscovariance functions between these two sequences from a seed $\omega$ in a form of the time average and of the ensemble average, respectively. Note that when G=H, they denote their autocovariance functions.

The above crosscovariance function $\rho_N(l,\omega;G,H)$ is of major importance to the investigation of statistical properties of sequences $\{G(\omega_n)\}_{n=0}^\infty$ and $\{H(\omega_n)\}_{n=0}^\infty$. Some careful calculations lead us to get the following two important propositions (reference 22):

Proposition 1: The crosscovariance function between the Chebyshev threshold sequences $\{\Theta_\alpha(\omega_n)\}_{n=0}^\infty$ and $\{\Theta_\beta(\omega_n)\}_{n=0}^\infty$ is given by $$<\rho(l;\Theta_\alpha,\Theta_\beta)>_\tau = 1/K^l s((\tau^l)'(\alpha)) <\rho(0;\Theta_{\tau^l(\alpha)},\Theta_\beta)>_\tau \tag{21}$$

where $$s(\omega) = \begin{cases} -1 & (\omega < \alpha) \\ 1 & (\omega \geq \alpha), \end{cases} \tag{22}$$

$$<\rho(0;\Theta_\alpha,\Theta_\beta)>_\tau = p_\tau(\max[\alpha,\beta])-p_\tau(\alpha)p_\tau(\beta) \tag{23}$$

$$p_\tau(\alpha)=<\Theta_\alpha>_\tau = 1/\pi\cos^{-1}\alpha \tag{24}$$

Proposition 2: The crosscovariance function of the Chebyshev bit sequences $\{A_i(\omega_n)\}_{n=0}^\infty$ and $\{A_j(\omega_n)\}_{n=0}^\infty$ is given by $$\langle\rho(l;A_i,A_j)\rangle_\tau = \tag{25}$$

$$\frac{1}{k^l}\sum_{r=1}^{2^{i-1}}\sum_{s=1}^{2^{j-1}}(-1)^{r+s}\cdot\left\{s\bigl((\tau^l)'\bigl(\frac{r}{2^i}\bigr)\bigr)\left(\left\langle\rho\bigl(0;\Theta_{\tau^l\frac{r}{2^i}},\Theta_{\frac{s}{2^j}}\bigr)\right\rangle_\tau - \right.\right.$$
$$\left\langle\rho\bigl(0;\Theta_{\tau^l\bigl(\frac{r}{2^i}\bigr)},\Theta_{-\frac{s}{2^j}}\bigr)\right\rangle_\tau\biggr) - $$
$$s\bigl((\tau^l)'\bigl(-\frac{r}{2^i}\bigr)\bigr)\left(\left\langle\rho\bigl(0;\Theta_{\tau^l(-\frac{r}{2^i})},\Theta_{\frac{s}{2^j}}\bigr)\right\rangle_\tau - \right.$$
$$\left.\left.\left\langle\rho\bigl(0;\Theta_{\tau^l(-\frac{r}{2^i})},\Theta_{\frac{s}{2^j}}\bigr)\right\rangle_\tau\right)\right\}$$

The ensemble averages of $\{A_i(\omega_n)\}_{n=0}^\infty$ is given by $$\langle A_i\rangle_\tau = \frac{2}{\pi}\sum_{m=1}^{2^{i-1}}(-1)^{m+1}\cos^{-1}\frac{m}{2^i} \tag{26}$$

Furthermore, the following interesting result can be obtained using the symmetry property of a Chebyshev map.

Proposition 3: The crosscovariance function of the Chebyshev bit sequences $\{B_i(\omega_n)\}_{n=0}^\infty$ and $\{B_j(\omega_n)\}_{n=0}^\infty$ generated by the Chebyshev map with even degree k is given by $$\langle\rho(l;B_i,B_j)\rangle_\tau = \begin{cases} Q_{ij}-\langle B_i\rangle_\tau\langle B_j\rangle_\tau & \text{for } l=0 \\ 0 & \text{for } l\geq 1 \end{cases} \tag{27}$$

where $$Q_{ii}=\langle B_i\rangle_\tau = \frac{1}{2} \tag{28}$$

$$Q_{ij}=\int_I B_i(\omega)B_j(\omega)f^*(\omega)d\omega = \int_{I_{ij}}d\omega \tag{29}$$

$I_{ij}$ and $I_r(r)$ are given as follows:

$$I_{ij}=\left(\bigcup_{r=1}^{2^{i-1}}I_i(r)\right)\cap\left(\bigcup_{s=1}^{2^{j-1}}I_j(s)\right) \tag{30}$$

$$I_r(r)=\left[p_\tau\bigl(\frac{2r}{2^{i-1}}-1\bigr),p_\tau\bigl(\frac{2r-1}{2^{i-1}}-1\bigr)\right] \tag{31}$$

The above propositions imply that for sufficiently large k, sequences $\{\Theta_\alpha(\omega_n)\}_{n=0}^\infty$, $\{A_i(\omega_n)\}_{n=0}^\infty$ and $\{B_i(\omega_n)\}_{n=0}^\infty$ have good auto(cross)covariance properties.

Note that the function $<\rho(0;\Theta_\alpha,\Theta_y)>_\tau$ can be used in a cryptanalysis of $\{\Theta_\alpha(\omega_n)\}_{n=0}^\infty$ because its value is not small even if the parameters $\alpha$ and $\beta$, as parts of a secret key, are adequately chosen. This implies that the common key α in the aforementioned Method 1 is not cryptographically secure.

Similarly, the function $<\rho(0, B_i, B_j)>_\tau$ can be used in a cryptanalysis of $\{B_i(\omega_n)\}_{n=0}^\infty$ unless $Q_{ij}=\frac{1}{4}$. However, it is possible to get $Q_{ij} \to \frac{1}{4}$, close to the best value, when both of i and j are large as shown in FIG. 1.

Nevertheless, the bit number i, the first secret key in the aforementioned Method 2 or 3, is also not cryptographically secure because the number of different i's is relatively few.

However, we have other cryptographically secure keys such as the degree of the map, k, and the initial seed $\omega_0$.

Variables α and i are parameters which allow many different and independent balanced pseudorandom binary sequences to be easily acquired from the single real-valued orbit.

The present inventors have recently given the crosscovariance functions of chaotic threshold and bit sequences generated by other maps (reference 32). But the Chebyshev map of degree k has better correlation properties than those of other maps. Further, the degree k itself can be a part of a secret key in stream cipher systems, which is cryptographically secure.

Let us now consider the next bit prediction of chaotic bit sequences.

Let $\vec{U}_m = U_0 U_1 \ldots U_{m-1}$ be an arbitrary string of m binary digits where $U_n$ ($0 \leq n \leq m-1$) are random variables of $\{0, 1\}$. Then, there are $2^m$ possible strings. Let $\vec{u}_m^{(r)} = u_0^{(r)} u_1^{(r)} \ldots u_{m-1}^{(r)}$ be the r-th string with binary elements $u_n^{(r)}$. Furthermore, for any $L_1$ binary function $G(\omega)$, define the following two binary random variables expressed by equation (32):

$$\Gamma_n^{(r)}(G(\omega)) = \begin{cases} G(\omega) \text{ for } u_n^{(r)} = 1 \\ 1 - G(\omega) \text{ for } u_n^{(r)} = 0 \end{cases} \quad (32)$$

Then, the probability of the event $\vec{u}_m^{(r)}$ is an infinite binary sequence $\{G(\tau^n(\omega))\}_{n=0}^\infty$ is given by $$Pr(\vec{u}_m^{(r)}; G) = \int_I \left\{ \prod_{n=0}^{m-1} \Gamma_n^{(r)}(G(\tau^n(\omega))) \right\} f^*(\omega) d\omega \quad (33)$$

Now let us consider the conditional probabilities of 1 and of 0 after observing an event $\vec{u}_m^{(r1)}$ in the sequence $\{G(\tau^n(\omega))\}_{n=0}^\infty$, given respectively by $$Pr(1 | \vec{u}_m^{(r)}; G) = \frac{Pr(\vec{u}_{m+1}^{(r1)}; G)}{Pr(\vec{u}_m^{(r)}; G)}, \quad (34)$$

$$Pr(0 | \vec{u}_m^{(r)}; G) = \frac{Pr(\vec{u}_{m+1}^{(r0)}; G)}{Pr(\vec{u}_m^{(r)}; G)}, \quad (35)$$

where $\vec{u}_{m+1}^{(r1)}$ and $\vec{u}_{m+1}^{(r2)}$ respectively denote the events $\vec{u}_{m+1}^{(r)} 1$ and $\vec{u}_{m+1}^{(r)} 0$ of period m+1, and where $Pr(\vec{u}_{m+1}^{(r)}; G)$ is given by equation (36):

$$Pr(1 | \vec{u}_m^{(r)}; G) = Pr(\vec{u}_{m+1}^{(r1)}; G) + Pr(\vec{u}_{m+1}^{(r0)}; G) \quad (36)$$

Thus, in general, these conditional probabilities must be evaluated. If the sequence $G\{\tau^n(\omega))\}_{n=0}^\infty$ is i.i.d. binary random variables, such as $\{\Theta_\alpha(\tau^n(\omega))\}_{n=0}^\infty$ when α is close to 0 or $\{B_i(\tau^n(\omega))\}_{n=0}^\infty$ when the degree of the map is even, the computation of the conditional probabilities is unnecessary, and $$Pr(1 | \vec{u}_m^{(r)}; G) = Pr(0 | \vec{u}_m^{(r)}; G) = <G>_\tau \quad (37)$$

This implies that the Chebyshev bit sequence $\{B_i(\omega_n)\}_{n=0}^\infty$ is unpredictable. The discussion of the conditions for the Chebyshev threshold sequence $\{\Theta_\alpha(\tau^n(\omega))\}_{n=0}^\infty$ and the Chebyshev bit sequence $\{B_i(\tau^n(\omega))\}_{n=0}^\infty$ become i.i.d. binary sequences and their mathematical proof will not be given here (reference 33).

Numerical experiments will now be discussed.

Let us first examine the linear complexity of keystream sequences in this embodiment to test the cryptographical security of the present cipher system.

As shown in FIGS. 12A and 12B, the linear complexities of both a threshold sequence $\{\Theta_\alpha(\omega_n)\}_{n=0}^{N-1}$ and a bit sequence $\{A_i(\omega_n)\} n = 0^{N-1}$ are nearly equal to N/2.

Next, let us consider the next bit prediction of chaotic bit sequences.

It is possible to calculate the conditional probabilities of 1 or 0 after observing each event $\vec{u}_m^{(r)}$ (r=1, ..., $2^m$) in a sequence $\{G(\tau^n(\omega))\} n=0^{N-1}$. For large m, however, there are too many kinds of events to calculate the probabilities. In order to reduce the number of such events, therefore, we classify the events $\vec{u}_m^{(r)}$ (r=1, ..., $2^m$) into several groups as follows. Let $S_m^{(p)}$ be a set of events $\vec{u}_m^{(r)}$ which consist of p 1's and (m-p) 0's (p=0, 1, ..., m). If the sequence $\{G(\tau^n(\omega))\}_{n=0}^{N-1}$ is i.i.d., the probability of the event expressed by equation (38) is given by equation (39):

$$\vec{u}_m^{(r)} \in S_m^{(p)} \quad (38)$$

$$Pr(\vec{u}_m^{(r)} \in S_m^{(p)}; G) = \binom{m}{p} \langle G \rangle_\tau^p (1 - \langle G \rangle_\tau)^{m-p}, \, p = 0, 1, \cdots, m \quad (39)$$

Observing $\vec{u}_8^{(r)}$ and $\vec{u}_8^{(r)} 1$ in a sequence $\{B_i(\omega_n)\}_{n=0}^{N-1}$ for 4,000 different seeds $\omega_{0i}$ with N=10,000, it is possible to calculate the empirical measures of observed relative frequencies of the events shown in equation (40) and those of conditional probabilities of 1 after observing the events shown in equation (40) in these sequences.

$$\vec{u}_8^{(r)} \in S_8^{(p)} \quad (40)$$

Figure 13A:
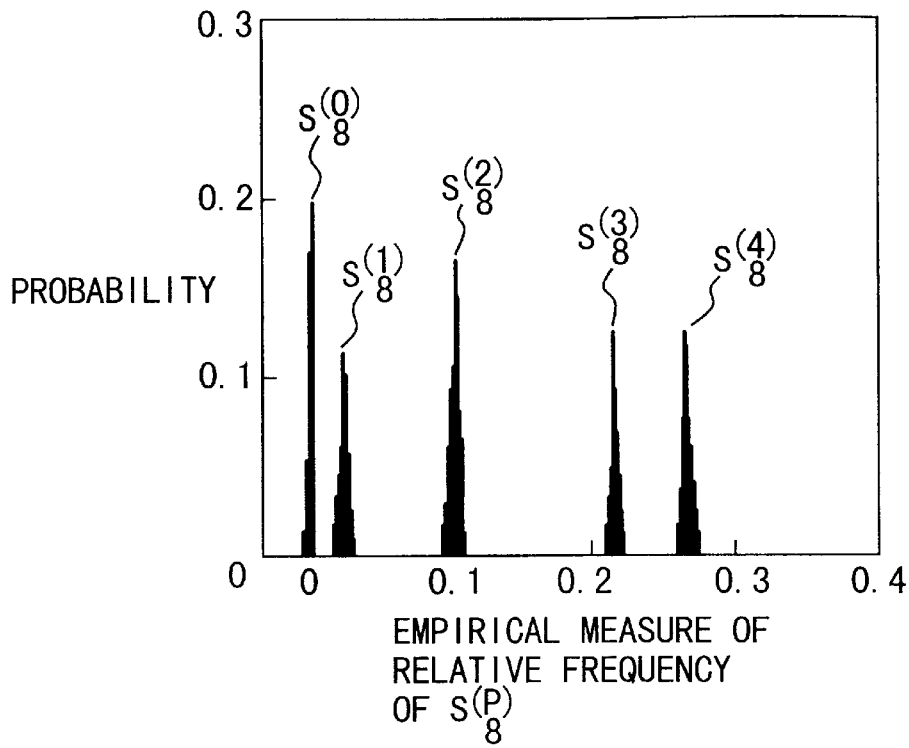
FIGS. 13A and 13B illustrate diagrams depicting the empirical measures of the relative frequency.
Figure 13B:
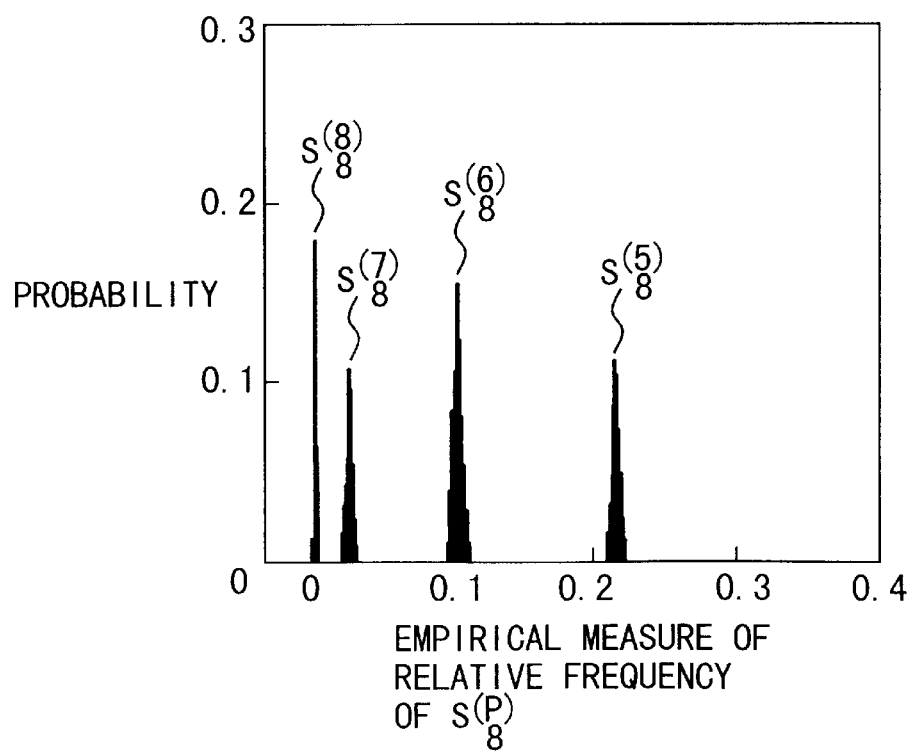

It is apparent from FIGS. 13A and 13B that all of these empirical measures are nearly equal to the Gaussian distribution as. FIG. 13 shows the empirical measures of the probabilities of the events shown in equation (40). Thus, it is important to calculate means and variances of these empirical measures as shown in FIGS. 14 and 15. FIG. 14A shows the mean of the empirical measures of the relative frequencies, FIG. 14B shows the variance of the empirical measures of the relative frequencies, FIG. 15A shows the mean of the empirical measures of the conditional probabilities and FIG. 15B shows the variance of the empirical measures of the conditional probabilities. It is understood from these figures that $\{B_i(\omega_n)\}_{n=0}^{N-1}$ is a sequence of i.i.d. binary random variables and is thus unpredictable.

Now, define the crosscorrelation function between a sequence $\{G(\omega_n)\}_{n=0}^\infty$ with an initial seed $\omega_0$ and a sequence $\{H(\omega_n')\}_{n=0}^\infty$ with an initial seed $\omega_0'$, as $$\rho_N(l, \omega_0, \omega'_0; G, H) = \frac{1}{N} \sum_{n=0}^{N-1} G(\omega_n) H(\omega'_{n+l}) \quad (41)$$

Figure 16A:
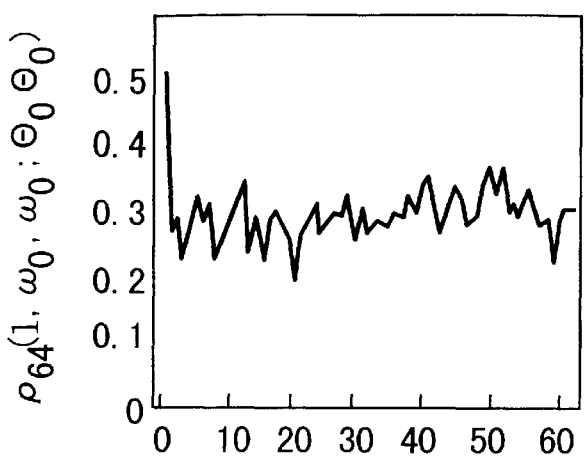
FIGS. 16A through 16C illustrate diagrams showing an autocorrelation function.
Figure 16B:
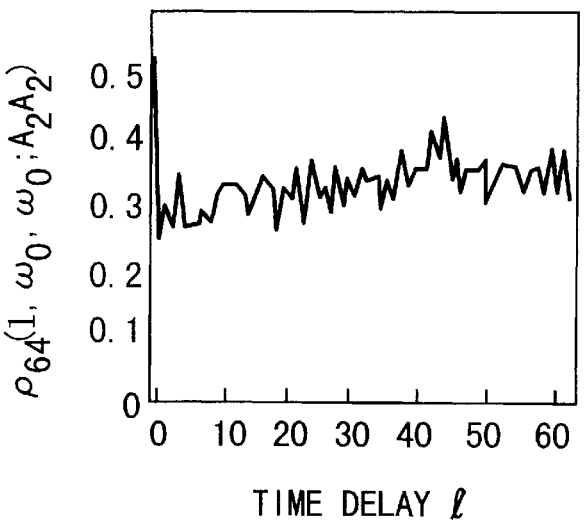
Figure 16C:
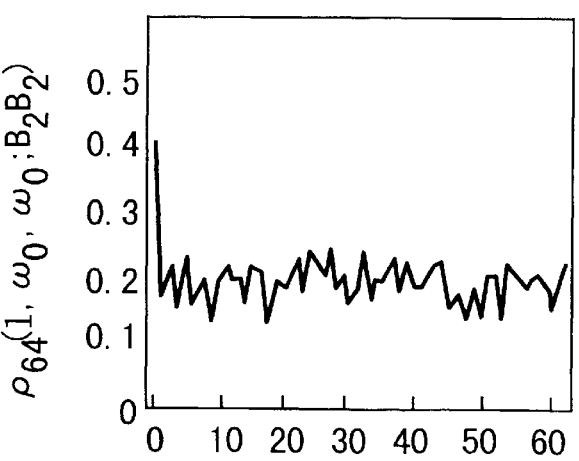

FIGS. 16A, 16B and 16C respectively show the autocorrelation functions $\rho_{64}(l, \omega_0, \omega_0; \Theta_0, \Theta_0)$, $\rho_{64}(l, \omega_0, \omega_0; A_2, A_2)$, $\rho_{64}(l, \omega_0, \omega_0; B_2, B_2)$ where k=16. It is apparent that those autocorrelation functions have a peak only at l=0.

FIGS. 17A, 17B, 18A and 18B illustrate cryptanalysis using the statistic $\rho_{64}(l, \omega_0, \omega_0'; \Theta_\alpha, \Theta_\beta)$ to search for a 10-digit seed $\omega_0 = (0.0110100101)_2 = 0.4113281\ldots$, a partial secret key of a threshold sequence $\{\Theta_\alpha(\omega_n)\}_{n=0}^\infty$ with a key $\vec{K}(\Theta_\alpha) = (16, \omega_0, 0.0)$ while changing $\omega_0'$ of a key $\vec{K}(\Theta_\beta) = (16, \omega_0', 0.01)$. In FIG. 17A, all possible $\omega_0'$ are scanned in (a) 7-bit precision, (b) 8-bit precision, (c) 9-bit precision, and (d) 10-bit precision.

These figures show the necessity of a vast amount of computation to search for the initial seed $\omega_0$ even if the degree k is previously know. This implies that this strategy is computationally infeasible because of the large key space of $\omega_0$. Further, $\rho_T(l, \omega_0, \omega_0'; \Theta_\alpha, \Theta_\beta)$, $\rho_T(l, \omega_0, \omega_0'; A_i, A_j)$ and $\rho_T(l, \omega_0, \omega_0'; B_i, B_j)$ for $1 \leq 1$ and for sufficiently large k have quite small values. Therefore, such statistics cannot be used for cryptanalysis like the above-described one even if all other parameters are known.

Next, let us compare a 64-bit chaotic keystream sequence $\vec{R}_\Theta$ (or $\vec{R}_A$ and $\vec{R}_B$) and its corresponding 64-bit ciphertext $\vec{Z}_\Theta$ (or $\vec{Z}_A$ and $\vec{Z}_B$) with the properties of block ciphers such as the DES and FEAL. For simplicity, let us assume that $\vec{R}_{\to K}$ (or $\vec{Z}_{\to K}$ means either $\vec{R}_\Theta$ (or $\vec{Z}_\Theta$), $\vec{R}_A$ (or $\vec{Z}_A$), or $\vec{R}_B$ (or $\vec{Z}_B$). Let $\vec{R}_{\to K} = \{\vec{R}_1, \vec{R}_2, \ldots, \vec{R}_L\}$ be a collection of L 64-bit keystream sequences whose key is given either by $\vec{K}(\theta_{\alpha, m}) = (k, \omega_{0m}, \alpha)$, $\vec{K}(A_{i, m}) = (k, \omega_{0m}, i)$ or $\vec{K}(B_{i, m}) = (k, \omega_{0m}, i)$ where $\omega_{0,m+1} = \tau^{64}(\omega_{0,m})$ for $1 \leq m \leq L-1$. That is, this collection consists of a successive keystream sequence generated by a real-valued chaotic orbit $\{\omega_n\}_{n=0}^{64 \times L}$ with $\omega_0 = \omega_{01}$. L=8,000 for the stream cipher in this embodiment, and L=4,000 for the conventional block cipher. Thus, $\vec{Z}_{\to K} = \{\vec{Z}_1, \vec{Z}_2, \ldots, \vec{Z}_L\}$ means the corresponding collection of L 64-bit ciphertexts.

We investigated four empirical measures for autocovariance functions $C_{64}(16; \vec{Z}_{\to K}, \vec{Z}_{\to K})$ L ciphertexts for a random plaintext $\vec{P}$ of length 64×L, where (a) $\vec{Z}_{\to K} = \vec{Z}_\alpha$ with $\vec{K}(\Theta_\alpha) = (12, 0.332, -0.95)$, (b), $\vec{Z}_{\to K} = \vec{Z}_\Theta$ with $\vec{K}(\Theta_\alpha) = (12, 0.332, 0.0)$, (c) $\vec{Z}_{\to K} = \vec{Z}_{DES}$ with a 64-bit secret key of the DES $\vec{K}_{DES} = (0123456789\text{ABCDEF})$ and (d) $\vec{Z}_{\to K} = \vec{Z}_{FEAL}$ with a 64-bit secret key of the FEAL $\vec{K}_{FEAL} = (0123456789\text{ABCDEF})$ where $\vec{Z}_{DES}$ (or $\vec{Z}_{FEAL}$) implies L 64-bit ciphertexts of the DES (or FEAL).

It is seen from the numerical experiments that both the mean and variance of these density functions is nearly equal to each other. Therefore, the chaotic and standard methods do not differ much in regard to their empirical behavior.

Let us introduce averaged power(cross)spectra of binary sequences as follows. Let $\{\rho_N(l, \omega_{0m}, w'_{0m}; G, H)\}_{m=1}^L$ be a collection of L crosscovariance functions of time delay 1 between sequences $\{G(\omega_n)\}_{n=0}^\infty$ and $\{H(\omega_n)\}_{n=0}^\infty$ with sets of seeds given by $\{\omega_{0m}\}_{m=1}^L$ and $\{\omega'_{0m}\}_{m=1}^L$.

Define $$S_{N,L}(v; G, H) = \frac{1}{L} \sum_{m=1}^{L} \sum_{l=0}^{N-1} \rho_N(l, \omega_{0m}, \omega'_{0m}; G, H) e^{-j\frac{2 \times lv}{T}} \quad (42)$$

Then $|S_{N,L}(v; G, H)|$ denotes the averaged power(or cross) spectral in a form of the time average over L different seeds.

FIGS. 19A and 19B show the averaged powerspectra of ciphertexts, $|S_{64,L}(v; \vec{Z}_\Theta, \vec{Z}_\Theta)|$, generated by stream cipher using a Chebyshev threshold sequence and a Chebyshev bit sequence, respectively. FIGS. 20A and 20B show the averaged powerspectra of ciphertexts, $|S_{64,L}(v; \vec{Z}_\Theta, \vec{Z}_\Theta)|$, generated by the conventional DES and FEAL, respectively.

The parameters are identical to those in empirical measures of $\rho_{64}(16; \vec{Z}_{\to K}, \vec{Z}_{\to K})$.

These figures show that the powerspectra in FIGS. 19B, 19C and 19D are independent of frequency v or white spectra, which implies that these ciphertexts are random. Note that with bad parameters chosen as those in the case in FIG. 19A with $\alpha = -0.95$, its power spectrum becomes somewhat nonwhite, but not so strongly.

Finally, FIG. 21 illustrates the computation time required for the enciphering and deciphering transformation using a Sun Workstation SS5 on which programs written by ANSI C are run.

Some of characteristics and features of this cipher system will be described.

Chaotic bit sequences are promising as a good binary pseudorandom generator in the following points.

1) There are a plurality of parameters which can be expressed with fewer bits.

2) It is easy to get a number of different unpredictable balanced sequences of i.i.d. binary random variables simultaneously.

3) The periods of these unpredictable sequences are sufficiently long for almost every seed.

The numerical experiments have shown that the Chebyshev threshold sequences/Chebyshev bit sequences have the following statistical properties.

a) The linear complexity of a keystream sequence of a period N is nearly N/2.

b) The next bit prediction of Chebyshev bit sequences is hardly possible due to the i.i.d. property.

c) The correlation properties of a ciphertext are at least identical to those of the DES and FEAL of the standard block cipher.

The cryptographic security of the present stream cipher system is considered to be superior to the conventional block cipher system.

As shown in FIG. 21, cryptography by this stream cipher system is executed faster than that by the block cipher system, so that this stream cipher system can easily be implemented by a floating-point microprocessor.

Further, this cipher system can easily be realized by using a general-purpose programming language ANSI C or the like which can perform floating-point computations, and can easily guarantee the reproducibility of a real-valued orbit if the same floating-point environment, e.g., the IEEE standard 754, is used on both the transmission end and the receiving end of the communication system.

As discussed above, chaotic bit sequences have excellent characteristics and features as keystream sequences in a stream cipher system.

Furthermore, several cryptographic techniques for updating secret keys for such a stream cipher system and delivering the keys to the receiving end can easily be utilized.

There are various nonlinear maps that can be used to generate a real-valued sequence from which a binary sequence (keystream sequence) is acquired. Four typical ergodic maps $\tau(\omega)$ among such nonlinear maps and their ACI measures f* are listed below.

1. R-adic Map (Reference 24) $\tau(\omega)=R\omega$ mod 1, $$R=2,3,4,\ldots, \omega \in [0,1], f^*(\omega)d\omega=d\omega \tag{43}$$

When the R-adic map is used as a nonlinear map in this embodiment, it is preferable that an odd-numbered value be used as the parameter R to acquire a binary sequence having a better property.

2. Tent Map (Reference 24)

$$\tau(\omega) = \begin{cases} 2\omega, & \omega \in \left[0, \frac{1}{2}\right] \\ 2(1-\omega) & \omega \in \left[\frac{1}{2}, 1\right] \end{cases} \quad \omega \in [0,1],\, f^*(\omega)d\omega = d\omega \tag{44}$$

3. Logistic Map (Reference 19)

$$\tau(\omega) = 4\omega(1-\omega),\, \omega \in [0,1],\, f^*(\omega)d\omega = \frac{d\omega}{\pi\sqrt{\omega(1-\omega)}} \tag{45}$$

4. Chebyshev Map of Degree k (References 29 and 30)

$$\tau(\omega) = \cos(k\cos^{-1}\omega), k=2,3,4,\ldots,$$

$$\omega \in [-1,1],\, f^*(\omega)d\omega = \frac{d\omega}{\pi\sqrt{1-\omega^2}} \tag{46}$$

When the Chebyshev map is used as a nonlinear map in this embodiment, it is preferable that an even-numbered value be used as the parameter k to acquire a binary sequence having a better property.

It is better that a nonlinear map in use should have the equidistributivity of the invariant measure, the symmetric property of the invariant measure and the symmetric property of the map, which will specifically be discussed later. Note that the aforementioned four maps all have those three properties.

The following describes several ways of generating a binary sequence (i.e., a keystream sequence used in a stream cipher) from a chaotic real-valued sequence based on the ergodic maps $\tau(\cdot)$. Those schemes are effective to simultaneously generate unpredictable binary sequences of i.i.d. random variables from an ergodic map.

(1) C Sequence (see FIG. 22)

To begin with, a C sequence will now be described.

A method to generate binary sequences from a chaotic real-valued orbit $\{\omega_n\}_{n=0}^{\infty}$ is generated as follows.

Define a threshold function given by equation (47)

$$\Theta_t(\omega) = \begin{cases} 0 \text{ (when } \omega < t) \\ 0 \text{ (when } \omega \geq t) \end{cases} \tag{47}$$

for $\omega<t$
for $\omega^*>t$.

Then, define a binary function expressed as the form of modulo 2 addition of threshold functions as given by equations (48) and (49)

$$C_T(\omega) = \Theta_{t0}(\omega) \oplus \Theta_{t2}(\omega) \oplus \cdots \oplus \Theta_{t2M}(\omega) \tag{48}$$

$$= \sum_{r=0}^{2M} (-1)^{r-1} \Theta_{tr}(\omega)$$

$$T = \{t_r\}_{r=0}^{2M} \tag{49}$$

In equation (48), $\oplus$ denotes modulo 2 addition (i.e., exclusive OR).

For the C sequence, 2M+1 pieces of binary data are acquired from individual real values in a real-valued sequence using a threshold function which is defined by equation (47) in accordance with the individual values in a set of thresholds $T=\{t_0, t_1, \ldots, t_{2M-1}, t_{2M}\}$ given by common keys. Then, an exclusive OR of those obtained binary data is performed, yielding a chaotic bit sequence $\{C_T(\omega_n)\}_{n=0}^{\infty}$.

For the C sequence, the initial seed $\omega_0$ of the map, the threshold set T and parameters of the map $\tau(\cdot)$ can be secret keys.

The number of elements in the threshold set, 2M+1, or the number of common keys can be set arbitrarily.

The reason why the threshold set T contains an odd number of elements is because a binary sequence having a better property can be generated this way. When the interval for the possible values of the map, I, is set to I=[d, e], it is preferable that $t_r+t_{2M-r}=d+e$ for the elements $t_r$ in T (r=0 to 2M). For $i \neq j$, $t_i \neq t_j$.

Particularly, when a nonlinear map in use has the equidistributivity of the invariant measure, the symmetric property of the invariant measure and the symmetric property of the map and $t_r+t_{2M-r}=d+e$, a binary sequence of ideal random variables can be acquired.

It is to be noted that the number of elements in T may be set to an even number by not using only $t_M$ in the elements in T. This is the case for an A sequence which does not have t=0 in the threshold set and which will be discussed shortly.

Instead of the exclusive OR in equation (48), another logic operation such as an exclusive AND may be performed.

(2) $\Theta$ Sequence (see FIG. 4)

Now, a $\Theta$ sequence (which is generated from a single threshold function) will be discussed.

When M=0 in equations (48) and (49) expressing a C sequence, $$C_T(\omega) = \Theta_{t0}(\omega) \tag{50}$$

This binary sequence $\{\Theta_{t0}(\omega_n)\}_{n=0}^{\infty}$ is referred to as a chaotic threshold sequence. When $\tau(\cdot)$ is the Chebyshev map, for example, the binary sequence is referred to as the Chebyshev threshold sequence.

In this case, the initial seed $\omega_0$ of the map, one element in the threshold set, $t_0$, and parameters of the map $\tau(\cdot)$ can be secret keys.

When the interval for the possible values of the nonlinear map, I, is set to I=[d, e], it is preferable that $t_0=(d+e)/2$.

(3) B Sequence (see FIG. 8)

Next, a B sequence (which is a special case of a C sequence and is generated by normalizing a real-valued sequence of the interval [d, e] over the interval [0, 1] and then extracting the i-th bit) will be discussed.

For $\omega$ of the map $\tau(\cdot)$ defined over the interval I=[d, e] as given in equation (51), we write the value of (w−d)/(e−d), normalized over I=[0, 1] as given in equation (52), in a binary representation as expressed by equation (53):

$$\omega \in [d, e] \quad (51)$$

$$\frac{\omega - d}{e - d} \in [0, 1] \quad (52)$$

$$\frac{\omega - d}{e - d} = 0.B_1(\omega)B_2(\omega)\cdots B_i(\omega)\cdots, \quad (53)$$

$$\omega \in [d, e], B_i(\omega) \in \{0, 1\}$$

When $M=2^{i-1}$ and $t_r=(e-d)r/2^i+d$ in equations (48) and (49) which express the C sequence, $$C_T(\omega)=B_i(\omega) \quad (54)$$

This binary sequence $\{B_i(\omega_n)\}_{n=0}^{\infty}$ is referred to as a chaotic bit sequence. When $\tau(\cdot)$ is the Chebyshev map, for example, the binary sequence is referred to as "a Chebyshev threshold sequence." In particular, $B_i$ is referred to as the Rademacher functions when $\tau(\omega)$ is the dyadic map, i.e., the R-adic map with R=2 (references 35 to 37).

Note that in a computer, $B_i(\omega)$ can be implemented more easily than $C_T(\omega)$ because $B_i(\omega)$ can provide binary sequences $\{B_i(\omega_n)\}_{n=0}^{\infty}$ by giving the bit number i indicating the bit position of $\omega$ in a binary representation as a common key.

(4) A Sequence (see FIG. 6)

A description will now be given of the A sequence which is generated by performing the binary expansion of the absolute value of a real-valued sequence and then extracting the i-th bit.

The A sequence is based on the binary expansion of the absolute value of $\omega$ which is $|\omega|\leq 1$ as shown below.

As shown by equation (55), we write the absolute value of $\omega(|\omega|\leq 1)$ in a binary representation.

$$|\omega|=0.A_1(\omega)A_2(\omega)\ldots A_i(\omega)\ldots, A_i(\omega)\in\{0,1\}, |\omega|\leq 1 \quad (55)$$

The i-th bit, $A_i(\omega)$, is expressed by equation (56).

$$A_i(\omega_n) = \bigoplus_{r=1}^{2^i}\left\{\Theta - \frac{r}{2^i}(\omega_n)\oplus\Theta\frac{r}{2^i}(\omega_n)\right\} \quad (56)$$

Thus, the binary sequence $\{A_i(\omega_n)\}_{n=0}^{\infty}$ can be acquired by giving the bit number i indicating the bit position of $\omega$ in a binary representation as a common key.

This A sequence is equivalent to the C sequence in the case where $t_M(=0)$ in the threshold set is not used.

When the interval of the map is I=[0, 1], $A_i(\omega)=B_i(\omega)$, so that we refer $\{A_i(\omega_n)\}_{n=0}^{\infty}$ as a chaotic bit sequence too.

A description will now be given of the binary additive stream ciphers in which the chaotic bit sequence (e.g., the Chebyshev threshold sequence or Chebyshev bit sequence) acquired in the above-described manner is used.

In this embodiment, a common key (secret key) $\vec{K}=(s_1, s_2, \ldots, s_M)$ is used only to control the chaotic bit sequence generator which generates a keystream sequence $\vec{R}_{\rightarrow K}$.

Common keys are classified into a first common key and a second common key in this embodiment. The first common key is used to generate a real-valued sequence, while the second common key is used for the binarization of the generated real-valued sequence. Each of the first common key and second common key may be a single key or may has a plurality of keys.

When the Chebyshev map as defined by equation (46) is used, for example, the first common keys are the initial seed $\omega_0$ and the parameter k. When the logistic map as expressed by equation (45) is used, the first common key is the initial seed $\omega_0$.

The second common key is a threshold set T for the C sequence, a threshold $t_0$ in the $\Theta$ sequence, and a bit number i indicating the bit position of normalized $\omega$ in a binary representation for the B sequence and A sequence.

In this embodiment, common keys contain real values.

Secret keys for chaotic bit sequences $\{\Theta_t(\omega_n)\}_{n=0}^{\infty}$, $\{B_i(\omega_n)\}_{n=0}^{\infty}$ and $\{C_T(\omega_n)\}_{n=0}^{\infty}$ are respectively defined as $\vec{K}(\Theta_t)=(k, \omega_0, t)$, $\vec{K}(B_i)=(k, \omega_0, i)$ and $\vec{K}(C_T)=(k, \omega_0, T)$ where $T=\{t_r\}_{r=0}^{2M}$.

As those binary sequences can generally be expressed by $C_T(\omega)$ in equations (48) and (49), the secret key is expressed as $\vec{K}(C_T)=(k, \omega_0, T)$.

Ciphertexts generated by a stream cipher cryptographic technique using the aforementioned keystream sequences are respectively defined by $\vec{Z}_{\Theta}=(z_1, z_2, \ldots)$, $\vec{Z}_B$ and $\vec{Z}_C T$. The bits in those ciphertexts are acquired as shown in equation (19) by a simple modulo 2 addition of bits of a plaintext of binary value, $\vec{p}=(p_1, p_2, \ldots)$ and the secret key bit by bit.

$$Z_n=P_n\oplus r_n, n=1,2,\ldots \quad (57)$$

$$P_n=Z_n\oplus r_n, n=1,2,\ldots \quad (58)$$

Floating-point computation is needed to get each of chaotic bit sequences. However, the floating-point environment, IEEE Standard 754, which nearly all computers implement makes it easier to write numerical programs for enciphering and deciphering transformation as follows.

The IEEE Standard format exactly specifies the following single precision and double precision floating-point formats:

1) For IEEE single (or C float), exponent and significant bits are 8 bits and 24 bits, respectively, and hence the total bits are 32; and 2) For IEEE double (or C double), they are 11 bits and 53 bits, respectively, and hence the total bits are 64.

The Math Library of C also provides elementary functions such as $\cos\omega$ and $\cos^{-1}\omega$, each of which carries out double precision floating-point calculations for a double-precision argument $\omega$.

If, for a 64-bit precision orbit $\{\omega_n\}_{n=0}^{\infty}$ with a randomly chosen integer k satisfying $2\leq k\leq 2^{20}$, a real-valued t ($\vec{0}$) (or an integer i satisfying $i\leq 50$), we can get $\{\Theta_t(\omega_n)\}_{n=0}^{\infty}$ (or $\{B_i(\omega_n)\}_{n=0}^{\infty}$) from a 160 (=32+64+64)-bit $\vec{K}(\Theta_t)$ (or a 128 (=32+64+32)-bit $\vec{K}(B_i)$). Such a balanced binary sequence provides a good pseudo-random variable generator.

The structure of this embodiment will now be discussed specifically.

FIG. 1 shows the basic structure of a stream cipher system according to one embodiment of this invention.

An apparatus for enciphering a plaintext to prepare a ciphertext (hereinafter it is called a transmission-end apparatus) comprises a chaotic bit sequence generator $2_1$, which generates a keystream sequence (chaotic bit sequence) $\vec{R}_{\rightarrow K}$ using a common key $\vec{K}$ (6 in FIG. 1) necessary for enciphering and deciphering, and an exclusive OR section $4_1$, which performs exclusive OR of the generated keystream sequence $\vec{R}_{\rightarrow K}$ and a binary sequence of an input plaintext $\vec{P}$ bit by bit to generate a binary sequence of a ciphertext $\vec{Z}_{\rightarrow K}$.

An apparatus for deciphering a ciphertext to generate the original plaintext (hereinafter it is called a receiving-end apparatus) comprises a chaotic bit sequence generator $2_2$, which generates a keystream sequence (chaotic bit sequence) $\vec{R}_{\to K}$ using a common key $\vec{K}$ (8 in FIG. 1) delivered from the transmission-end apparatus, and an exclusive OR section $4_2$, which performs exclusive OR of the generated keystream sequence $\vec{R}_{\to K}$ and a binary sequence of the ciphertext $\vec{Z}_{\to K}$, delivered from the transmission-end apparatus, bit by bit to generate a binary sequence of the original ciphertext $\vec{P}$.

Each of the chaotic bit sequence generators $2_1$ and $2_2$ has a chaos generator for generating a real-valued sequence along a chaotic orbit according to the first common key and a predetermined nonlinear map, and a bit generator for performing predetermined binarization on the individual real values in the generated real-valued sequence to generate a keystream sequence.

The chaotic bit sequence generator $2_1$ of the transmission-end apparatus and the chaotic bit sequence generator $2_2$ of the receiving-end apparatus have the same logic structures. If the common keys $\vec{K}$ are the same, therefore, the keystream sequences $\vec{R}_{\to K}$ to be generated by both apparatuses are identical to each other.

The exclusive OR section $4_1$ of the transmission-end apparatus and the exclusive OR section $4_2$ of the receiving-end apparatus may both be replaced with exclusive AND functions. Other logic operations may be used as well. The following describes the case where exclusive OR is performed.

In the transmission-end apparatus, prior to cryptography of the plaintext $\vec{P}$, the common key $\vec{K}$ to be used is selected by a common key selector (not shown). There are various well known ways to select the common key $\vec{K}$, one of which can generally be used. For example, numbers may be given to previously prepared keys and the key having the number corresponding to a random variable when generated is selected. When the key is a real value, the value of the random variable when generated or a value acquired by linear transform of that random variable may be used directly as the key. In this invention, while the number of keys can be changed specifically, the number of keys may be selected at random. Of course, keys or the number of keys can be selected freely not based on random variables but according to other information.

The transmission-end apparatus delivers a common key together with a ciphertext. The content of the common key may be delivered directly or information corresponding to the content of the common key may be delivered instead.

In delivering a common key, the common key or its corresponding information should be enciphered before transfer. In this example, the common key is to be enciphered by a well-known cryptosystem, such as the RSA cryptosystem or elliptic cryptosystem.

The transmission-end apparatus outputs a common key necessary to decipher the generated ciphertext from its output section (not shown). Various ways are available to output the ciphertext and the common key to the receiving-end apparatus.

When the transmission-end apparatus and the receiving-end apparatus are connected by a network, the output section should have a function to send the ciphertext and common key to the network in accordance with a predetermined protocol. When the transmission-end apparatus transfers the ciphertext and common key via radio transmission, the output section should be capable of modulating and sending the ciphertext and common key. When the ciphertext and common key are stored on a portable storage medium through which they are given to the receiving-end apparatus, the output section should be able to write the ciphertext and common key on such a storage medium.

The receiving-end apparatus receives at the input section (not shown) the ciphertext $\vec{Z}_{\to K}$ and the common key $\vec{K}$ necessary for deciphering the ciphertext, both generated by the transmission-end apparatus.

When the receiving-end apparatus is connected to the transmission-end apparatus by a network, the input section should have a function to receive information transferred via the network and extract the ciphertext and common key. When the receiving-end apparatus receives the ciphertext and common key transferred from the transmission-end apparatus via radio transmission, the input section should be capable of receiving and demodulating the transferred signal to extract the ciphertext and common key. When the ciphertext and common key are stored on a portable storage medium through which the receiving-end apparatus them, the input section should be able to read the ciphertext and common key from such a storage medium.

If the common key is enciphered, a key deciphering section (not shown) deciphers the common key according to a predetermined method before deciphering the ciphertext. When what is obtained by the deciphering is information corresponding to the common key, the content of the actual common key is acquired from this information by, for example, referring to the proper table.

FIG. 2 presents a flowchart exemplifying the sequence of processes the transmission-end apparatus executes in this embodiment.

(Step S1)

First, common keys (a predetermined number of first common keys and a predetermined number of second common keys) necessary for enciphering/deciphering are selected. The selected common keys are enciphered by the RSA cryptosystem or the like, if necessary, and are transmitted to the receiving-end apparatus.

Then, a binary sequence of a plaintext to be enciphered is fetched.

(Step S2)

The chaos generator in the chaotic bit sequence generator $2_1$ generates a real-valued sequence according to the selected first common key(s) and a predetermined nonlinear map.

(Step S3)

The bit generator in the chaotic bit sequence generator $2_1$ performs predetermined binarization on the individual real values in the generated real-valued sequence based on the selected second common key(s) to generate a keystream sequence (binary sequence).

(Step S4)

The exclusive OR section $4_1$ performs exclusive OR of the input binary sequence of the plaintext and the generated keystream sequence to generate a ciphertext.

(Step S5)

The generated ciphertext is sent to the receiving-end apparatus.

FIG. 3 presents a flowchart exemplifying the sequence of processes the receiving-end apparatus executes in this embodiment.

(Step S11)

First, the ciphertext and common keys (a predetermined number of first common keys and a predetermined number of second common keys) necessary for enciphering/deciphering, both transmitted from the transmission end by a predetermined transfer format, are received. The input common keys, if enciphered, should be deciphered by the RSA cryptosystem or the like.

(Step S12)

The chaos generator in the chaotic bit sequence generator $2_2$ generates a real-valued sequence according to the acquired first common key(s) and a predetermined nonlinear map.

(Step S13)

The bit generator in the chaotic bit sequence generator $2_2$ performs predetermined binarization on the individual real values in the generated real-valued sequence based on the acquired second common key(s) to generate a keystream sequence (binary sequence).

(Step S14)

The exclusive OR section $4_2$ performs exclusive OR of the input binary sequence of the plaintext and the generated keystream sequence to generate the original plaintext.

The generation of a real-valued sequence, the binarization and the exclusive OR operation may be pipelined to improve their processing speeds.

Although the transmission end selects and delivers the common keys $\vec{K}$ to the receiving end in the foregoing description, the receiving end may select and deliver the common keys $\vec{K}$ to the transmission end instead.

Now, the chaotic bit sequence generators $2_1$ and $2_2$ which generate a keystream sequence (chaotic bit sequence) $\vec{R}_{\vec{K}}$ using the common keys $\vec{K}$.

FIGS. 4, 7, 9 and 12 exemplify the structures of the chaotic bit sequence generators $2_1$ and $2_2$. Chaos generators 20, 120, 220 and 320 in those structures are fundamentally the same.

(1) C Sequence

FIG. 22 exemplifies the structure of the chaotic bit sequence generator for a C sequence. For the C sequence, as discussed earlier, binarization is performed on individual real values ω in the real-valued sequence generated from a map τ(·) based on equations (48) and (49). Given that T is a set of thresholds $\{t_r\}_{r=0}^{2M}$, T becomes the second common key. The number of thresholds, M, can be arbitrarily set.

The chaotic bit sequence generator has a chaos generator 30 and a bit generator 40.

The chaos generator 30 generates a real-valued sequence from the given first common key and a predetermined nonlinear map (31).

When a Chebyshev map as defined by the differential equation (46) is used as the predetermined nonlinear map, for example, the first common keys are an initial seed $\omega_0$ and a parameter k. Note that the parameter k may be fixed and not be used as a key. When $\omega_0=0.3$ and k=2, the real-valued sequence $\omega_n$ becomes as shown in FIG. 23 or FIG. 24.

The number of parameters k may be 0 or equal to or greater than 2 depending on the nonlinear map used.

The chaos generator 30 can be accomplished by running a program written in a predetermined language using a floating-point computing apparatus.

The bit generator 40 has threshold processors 41, 42 and 43 using threshold functions $\Theta_{t_0}(\omega_n)$, $\Theta_{t_1}(\omega_n)$, ..., $\Theta_{t_{2M+1}}(\omega_n)$, and a nonlinear coupling section 44 for nonlinearly coupling plural pieces of bit data output from the individual threshold processors 41–43.

For each real value in the generated real-valued sequence, each threshold processor in the bit generator 30 acquires binary data $\Theta_t(\omega_n)$ using the value indicated by the second common key as a threshold $\{t_0, t_1, \ldots, t_{2M}\}$.

The nonlinear coupling section 44 receives all the binary data and performs a predetermined nonlinear coupling process, e.g., an exclusive OR operation.

The generation of a binary sequence will now be discussed specifically.

Suppose that a Chebyshev map expressed by equation (46) is used as a nonlinear map, and that the initial seed $\omega_0=0.3$ and parameter K=2 are given by the first common key and the thresholds $t_0=-0.5$, $t_1=-0.2$, $t_2=0$, $t_3=0.2$ and $t_4=0.5$ are given by the second common key T.

In this case, from $\omega_0=0.3$ and k=2, the chaos generator 30 sequentially outputs 0.300000, −0.820000, 0.344800, −0.762226, 0.161977, −0.947527, 0.795615, 0.266007, −0.858481, 0.473978, so forth as the real-valued sequence $\omega_n$ as shown in FIG. 23. In this example, $\omega_n$ is expressed to the sixth decimal point.

Based on this real-valued sequence $\omega_n$, each threshold processor executes binarization using the thresholds $t_0=-0.5$, $t_1=-0.2$, $t_2=0$, $t_3=0.2$ and $t_4=0.5$ as thresholds. With regard to $\omega_0=0.300000$, for example, $\Theta_{-0.5}(\omega_0)=1$, $\Theta_{-0.2}(\omega_0)=1$, $\Theta_0(\omega_0)=1$, $\Theta_{0.2}(\omega_0)=1$ and $\Theta_{0.5}(\omega_0)=0$ are acquired.

As shown in FIG. 23, the threshold processor to which the threshold $t_0=-0.5$ is given generates the binary sequence $\Theta_{-0.5}(\omega_n)=(1, 0, 1, 0, 1, 0, 1, 1, 0, 1, \ldots)$ and the other threshold processors to which the thresholds $t_1=-0.2$, $t_2=0$, $t_3=0.2$ and $t_4=0.5$ are given generate the binary sequences $\Theta_{-0.2}(\omega_n)=(1, 0, 1, 0, 1, 0, 1, 1, 0, 1, \ldots)$, $\Theta_0(\omega_n)=(1,0, 1, 0, 1, 0, 1, 1, 0, 1, \ldots)$, $\Theta_{0.2}(\omega_n)=(0, 0, 0, 0, 0, 0, 1, 0, 0, 0, \ldots)$, and $\Theta_{0.5}(\omega_n)=(0, 0, 0, 0, 0, 0, 1, 0, 0, 0, \ldots)$, respectively.

The nonlinear coupling section 44 in the bit generator 40 performs exclusive OR of the five binary sequences $\Theta_{-0.5}(\omega_n)$, $\Theta_{-0.2}(\omega_0)$, $\Theta_0(\omega_0)$, $\Theta_{0.2}(\omega_0)$ and $\Theta_{0.5}(\omega_0)$. With regard to $\omega_0=0.300000$, for example, $C_T(\omega_0)=0$ is acquired from the five binary data 1, 1, 1, 1 and 0.

The chaotic bit sequence $C_T(\omega_n)$=keystream sequence $\vec{R}_{\vec{K}}=(0, 0, 0, 0, 1, 0, 1, 0, 0, 0, \ldots)$ is obtained in this manner.

FIG. 24 shows another specific example in which a Chebyshev map expressed by equation (46) is used as a nonlinear map, the initial seed $\omega_0=0.3$ and parameter K=2 are given by the first common key and the thresholds $t_0=-0.8$, $t_1=-0.7$, $t_2=-0.1$, $t_3=0$, $t_4=0.1$, $t_5=-0.7$ and $t_6=-0.8$ are given by the second common key T, and the keystream sequence $\vec{R}_{\vec{K}}=(1, 0, 1, 1, 1, 0, 0, 1, 0, 1, \ldots)$ is acquired.

The generation of a real-valued sequence, the threshold process and the nonlinear coupling process may be pipelined to improve their processing speeds. Although the ordinary stream cipher process is executed bit by bit, the nonlinear coupling section 44 may perform serial-parallel conversion when the ciphering process is performed block by block for faster parallel processing.

The number of the necessary threshold processors can change according to the number of the given second common keys (i.e., the number of thresholds). If the present structure is accomplished by installing a program on a computer and running it by a CPU (Central Processing Unit), a change in the number of threshold processors can easily be coped with.

(2) Θ Sequence

FIG. 4 exemplifies the structure of the chaotic bit sequence generator for a Θ sequence. That is, this structure is the same as the one in FIG. 22, which however uses only one threshold function.

The chaotic bit sequence generator has a chaos generator 20 and a bit generator 30.

The chaos generator 20, which has the same structure as the chaos generator 30 in FIG. 22, generates a real-valued sequence from the given first common key and a predetermined nonlinear map (21).

The bit generator 30 has a threshold processor 31 which uses a threshold function $\Theta_t(\omega_n)$, and does not require nonlinear coupling. For each real value in the generated real-valued sequence, the threshold processor 31 in the bit generator 30 acquires binary data $\Theta_t(\omega_n)$ using the value indicated by the second key as a threshold t.

Suppose, as already mentioned in the description of the C sequence, that a Chebyshev map expressed by equation (46) is used as a nonlinear map, and that the initial seed $\omega_0=0.3$ and parameter K=2 are given by the first common key and the threshold t=0 is given by the second common key T. In this case, $\Theta_0(\omega_n)=(1, 0, 1, 0, 1, 0, 1, 1, 0, 1, \ldots)$ is generated (see FIG. 23).

(3) B Sequence

A B sequence can be expressed by $M=2^{i-1}$ and $t_r=(e-d)$ $r/2^i+d$ in equations (48) and (49) which express a C sequence. Thus, the B sequence can be obtained by using the structure in FIG. 22 for a C sequence.

Suppose, as in the previously discussed case for the C sequence, that a Chebyshev map expressed by equation (46) is used as a nonlinear map, and that the initial seed $\omega_0=0.3$ and parameter K=2 are given by the first common key. Also assume that the bit position i=3 (3rd bit) is given by the second common key i.

Since d=−1, e=1 and i=3, this case is equivalent to the case where a threshold set T={−0.75, −0.5, −0.25, 0, 0.25, 0.5, 0.75} in equations (48) and (49).

The use of those thresholds in the structure in FIG. 22 can yield $B_3(\omega_n)=(1, 0, 1, 0, 0, 0, 1, 1, 0, 1, \ldots)$ as shown in FIG. 46.

When i=1 and i=2, which are respectively equivalent to the cases where the threshold set T={0} and T={−0.5, 0, 0.5}, $B_1(\omega_n)=(1, 0, 1, 0, 1, 0, 1, 1, 0, 1, \ldots)$ and $B_2(\omega_n)=(0, 0, 0, 0, 0, 1, 0, 0, 0, \ldots)$ are acquired.

Since a B sequence is what is generated by extracting the i-th bit from the real values in a real-valued sequence of [d, e] when this real-valued sequence is normalized over the interval [0, 1] and the binary expansion of the normalized real-valued sequence is performed, the structure can be simplified by using a bit selector which outputs a value at the designated bit position.

FIG. 8 shows an example of the structure which uses a bit selector.

The chaotic bit sequence generator includes a chaos generator 25 and a bit generator 26. The chaos generator 25 has the same structure as the chaos generator 30 in FIG. 22. The bit generator 26 has a normalizing section 261 and a bit selecting section 262.

The bit generator 26 first causes the normalizing section 261 to normalize the individual real values in the real-valued sequence over a predetermined interval. For an arbitrary map $\tau(\cdot)$ defined over the interval I=[d, e], for example, when normalization with $\omega'=(\omega-d)/(e-d)$ is performed, $\omega'$ takes a value in the interval I'=[0, 1]. With I=[−1, 1], normalization with $(\omega+1)/2$ is executed.

Next, the bit selector 262 selects a value at the bit position, indicated by the second common key i, of a real value given from the normalizing section 261 in a binary representation.

In this manner, $B_i(\omega_n)$ is generated as a keystream sequence $\vec{R}_{\rightarrow K}$.

Suppose, as in the above-discussed specific example, that a Chebyshev map expressed by equation (46) is used as a nonlinear map and that the initial seed $\omega_0=0.3$ and parameter K=2 are given by the first common key. Chaotic bit sequences $B_1(\omega_n)$, $B_2(\omega_n)$, $B_3(\omega_n)$, $B_4(\omega_n)$ and $B_5(\omega_n)$ generated respectively when the bit position i given by the second common key i takes values 1 to 5 are illustrated in FIG. 23.

If the bit number 1 is given by the second common key, the binary representation of a value 0.650000 resulting from the normalization of the real value $\omega_0=0.300000$ is 0.10100 . . . and 1 (at the first decimal point) is acquired as binary data, and the binary representation of a value 0.090000 resulting from the normalization of the real value $\omega_1=-0.8200000$ is 0.00010 . . . and 0 (at the first decimal point) is acquired as binary data. As a result, $B_1(\omega_n)=(1, 0, 1, 0, 1, 0, 1, 1, 0, 1, \ldots)$ is generated as the keystream sequence $\vec{R}_{\rightarrow K}$. Likewise, if the bit number 5 is given by the second common key, $B_5(\omega_n)=(0, 0, 1, 1, 0, 0, 0, 0, 0, 1, \ldots)$ is generated as the keystream sequence $\vec{R}_{\rightarrow K}$.

(4) A Sequence

An A sequence can be expressed by equations (50) and (51) as mentioned earlier, which are derived from modifying equations (48) and (49) representing a C sequence in such a way that the number of elements in the threshold set T is even. Thus, the A sequence can be obtained by providing an even number of threshold processors in the structure in FIG. 22 for a C sequence.

Suppose, as in the previously discussed case for the C sequence, that a Chebyshev map expressed by equation (46) is used as a nonlinear map, and that the initial seed $\omega_0=0.3$ and parameter K=2 are given by the first common key. Also assume that the bit position i=2 (2nd bit) is given by the second common key i.

From equation (51), this case is equivalent to the case where the threshold set T={−1, −0.75, −0.5, −0.25, 0.25, 0.5, 0.75, 1}.

The use of those thresholds in the structure in FIG. 22 can therefore yield $A_2(\omega_n)=(1, 1, 1, 1, 0, 1, 1, 1, 1, 1, \ldots)$ as shown in FIG. 11.

When i=1, which is equivalent to the case where the threshold set T={−1, −0.5, 0.5, 1}, $A_1(\omega_n)=(0, 1, 0, 1, 0, 1, 1, 0, 1, 0, \ldots)$ is acquired.

Since an A sequence is what is generated by extracting the i-th bit from the absolute values of the individual real values in a real-valued sequence of [1, 1] when the binary expansion of this real-valued sequence is performed, the structure can be simplified by using a bit selector which outputs a value at the designated bit position.

FIG. 6 shows an example of the structure which uses a bit selector.

The chaotic bit sequence generator includes a chaos generator 23 and a bit generator 24. The chaos generator 23 has the same structure as the chaos generator 30 in FIG. 22. The bit generator 24 has an absolute value processing section 241 and a bit selecting section 242.

The bit generator 24 first causes the absolute value processing section 241 to obtain the absolute values of the individual real values in the real-valued sequence.

Next, the bit selector 242 selects a value at the bit position, indicated by the second common key i, of a real value given from the absolute value processing section 241 in a binary representation.

In this manner, $A_i(\omega_n)$ is generated as the keystream sequence $\vec{R}_{\rightarrow K}$.

Suppose, as in the above-discussed specific example, that a Chebyshev map expressed by equation (46) is used as a nonlinear map with I=[−1, 1] and that the initial seed $\omega_0=0.3$ and parameter K=2 are given by the first common key. Chaotic bit sequences $A_1(\omega_n)$, $A_2(\omega_n)$, $A_3(\omega_n)$, $A_4(\omega_n)$ and $A_5(\omega_n)$ generated respectively when the bit position i given by the second common key i takes values 1 to 5 are illustrated in FIG. 7.

If the bit number 1 is given by the second common key, the binary representation of a real value $|\omega_0|=0.300000$ is 0.01001 . . . and 0 (at the first decimal point) is acquired as binary data, and the binary representation of a real value $|\omega_1|=0.8200000$ is 0.11010 . . . and 1 (at the first decimal point) is acquired as binary data. As a result, $A_1(\omega_n)=(0, 1, 0, 1, 0, 1, 1, 0, 1, 0, \ldots)$ is generated as the keystream sequence $\vec{R}_{43\,K}$. Likewise, if the bit number 5 is given by the second common key, $A_5(\omega_n)=(1, 0, 1, 0, 1, 0, 1, 0, 1, 1, \ldots)$ is generated as the keystream sequence $\vec{R}_{\rightarrow K}$.

The statistical properties of chaotic bit sequences will be described below. Functions and the like used in evaluating the statistical properties will be discussed first (reference 33), followed by the discussion of the balanced property of a chaotic bit sequence, the i.i.d. property and then the next bit unpredictability.

First, let $G(\omega)$ and $H(\omega)$ be any two $L_1$ functions of bounded variation. Consider two sequences $\{G(\omega_n)\}_{n=0}^{\infty}$ and $\{H(\omega_n)\}_{n=0}^{\infty}$. The ensemble average of the 2nd-order crosscorrelation function between the two sequences from a seed $\omega=\omega_n$ is defined by equation (59):

$$<\rho(l;\ G,\ H)>_\tau = \int_I G(\omega)H(\tau^l(\omega))f^*(\omega)d\omega, \tag{59}$$

where $1=0, 1, 2, \ldots$ The ensemble average of the crosscovariance function is also defined by equations (60) and (61):

$$<\rho(l;\ G,\ H)>_\tau = \int_I (G(\omega)-<G>_\tau)(H(\tau^l(\omega))-<H>_\tau)f^*(\omega)d\omega \tag{60}$$

$$=<\rho(l;\ G,\ H)>_{96}-<G>_\tau<H>_\tau \tag{61}$$

Note that when G=H, these denote the ensemble averages of the autocorrelation function and autocovariance function, respectively.

Now let us introduce the Perron-Frobenius (P-F) operator $P_\tau$ for the map $\tau$ with I=[d, e] defined by equation (62) (see reference 24):

$$P_\tau H(\omega) = d/d\omega \int_{\tau^{-1}([d,\,\omega])} H(y)dy \tag{62}$$

This operator is very useful in evaluating the correlation or covariance functions because it has the following important property expressed by equation (63):

$$\int_I G(\omega)P_\tau\{H(\omega)\}d\omega = \int_I G(\tau(\omega))H(\omega)d\omega. \tag{63}$$

It is know that the ensemble averaging is effective in evaluating the statistical amounts, such as the average value of a chaotic sequence and correlation functions. If this ensemble averaging is applied to several ergodic maps, chaotic bit sequences have good statistical properties as shown below (reference 22).

Consider a piecewise monotonic mapping $\tau: [d, e] \rightarrow [d, e]$ that satisfies the following three properties:

(i) There is a partition $d=d_0<d_1<\ldots<d_{n\tau}=e$ of [d, e] such that for each integer $i-1, \ldots, N_\tau$ ($N_\tau \geq 2$) the restriction of $\tau$ to the interval $[d_{i-1}, d_i]$, denoted by $\tau_i$ ($1 \leq i \leq N_\tau$), is a $C^2$ function;

(ii) $\tau((d_{i-1}, d_i))=(d, e)$, that is, $\tau_i$ is onto; and (iii) $\tau$ has a unique ACI measure denoted by $f^*(\omega)d\omega$.

For the above map, we have the following equation (64) (reference 24).

$$P_\tau H(\omega) = \sum_{i=1}^{N_\tau} |g_i'(\omega)| H(g_i(\omega)) \tag{64}$$

where $g_i(\omega)=\tau_i^{-1}(\omega)$.

Next consider $H(\omega)=\Theta_t(\omega)f^*(\omega)$. For equation (65), we have $$t\in(d_{m-1},\ d_m) \tag{65}$$

$$\Theta_t(g_i(\omega)) = \begin{cases} 0 & (\text{when } i < m) \\ 1 & (\text{when } i > m) \end{cases} \tag{66}$$

0 for i<m 1 for i>m.

Hence it suffices to consider only the case where i=m. The following equation (67) can easily obtained:

$$\Theta_t(g_m(\omega)) = \begin{cases} \Theta_{\tau(t)}(\omega) & (\text{when } \tau'(t) > 0) \\ \overline{\Theta}_{\tau(t)}(\omega) & (\text{when } \tau'(t) < 0) \end{cases} \tag{67}$$

for $\tau'$ (t)>0 for $\tau'$ (t)<0.

where $/\overline{\Theta}_{\tau(t)}(\omega)=1-\Theta_{\tau(t)}(\omega)$.

Thus, for the condition given by equation (65), we can obtain $$P_\tau\{\Theta_t(\omega)f^*(\omega)\} = \tag{68}$$

$$\begin{cases} |g_m'(\omega)|\Theta_{\tau(t)}(\omega)f^*(g_m(\omega)) + \sum_{i=m+1}^{N_\tau}|g_i'(\omega)|f^*(g_i(\omega)) \\ \quad (\text{when } \tau'(t) > 0) \\ |g_m'(\omega)|\overline{\Theta}_{\tau(t)}(\omega)f^*(g_m(\omega)) + \sum_{i=m+1}^{N_\tau}|g_i'(\omega)|f^*(g_i(\omega)) \\ \quad (\text{when } \tau'(t) < 0) \end{cases}$$

for $\tau'$ (t)>0 for $\tau'$ (t)<0.

We now consider a class of the above piecewise monotonic maps satisfying $$|g'i\ (\omega)|f^*gi(\omega)) = 1/N_\tau f^*(\omega),\ \omega \in (d_{i-1},\ d_i),\ 1 \leq i \leq N_\tau \tag{69}$$

which is referred to as an equidistributivity property. Note that this class contains well known maps, such as the R-adic map, the tent map, the logistic map and the Chebyshev map of degree k, where $N_\tau$=R, 2, 2, k. Thus we give the following interesting lemma which is very useful in evaluating correlation functions of chaotic threshold and bit sequences.

Lemma 1: For a chaotic threshold sequence $\{\Theta_t(\omega_n)\}_{n=0}^{\infty}$ generated by a piecewise monotonic map satisfying equation (69), we can get $$P_\tau\{(\Theta_t(\omega)-p_\tau(t))f^*(\omega)\}$$

$$=1/N_\tau s(\tau'(t))(\Theta_{\tau(t)}(\omega)-p_\tau(\tau(t)))f^*(\omega) \tag{70}$$

where s ($\omega$) is the signum function defined by $$s(\omega) = \begin{cases} -1 & (\text{when } \omega < 0) \\ 1 & (\text{when } \omega \geq 0) \end{cases} \tag{71}$$

for $\omega<0$ for $\omega\geq 0$

Proof: Substituting equation (69) into equation (68) yields $$P_\tau\{\Theta_t(\omega)f^*(\omega)\} = \begin{cases} \dfrac{1}{N_\tau}(\Theta_{\tau(t)}(\omega) + N_\tau - m)f^*(\omega) \\ \quad \text{(when } \tau'(t) > 0) \\ \dfrac{1}{N_\tau}(\overline{\Theta}_{\tau(t)}(\omega) + N_\tau - m)f^*(\omega) \\ \quad \text{(when } \tau'(t) < 0) \end{cases} \quad (72)$$

for $\tau'(t) > 0$
for $\tau'(t) < 0$
for equation (65)

The definition of $P_\tau$, equation (62), gives $$\int I^\Theta t(\omega) f^*(\omega) d\omega = \int_t P_\tau\{\Theta t(\omega) f^*(\omega)\} d\omega \quad (73)$$

Integrating each side of equation (72) and using equation (73) yields $$P_\tau(t) = \begin{cases} \dfrac{1}{N_\tau}(p_\tau(\tau(t)) + N_\tau - m) & \text{(when } \tau'(t) > 0) \\ \dfrac{1}{N_\tau}(1 - p_\tau(\tau(t)) + N_\tau - m) & \text{(when } \tau'(t) < 0) \end{cases} \quad (74)$$

for $\tau'(t) > 0$
for $\tau'(t) < 0$
which, in conjunction with equation (72), gives equation (70). Let $\tau'(\omega)$ be the right derivative of $\tau(\omega)$. It follows from property (ii) that $$\Theta\tau(d_i)(\omega) - p_\tau(\tau(d_i)) = 0, \quad (75)$$

$$P_\tau\{\Theta_{d_i}(\omega)f^*(\omega)\} = p_\tau(d_i)f^*(\omega). \quad (76)$$

Therefore, equation (70) holds for any $t$ satisfying equation (77).

$$t \in [d, e] \quad (77)$$

This completes the proof.
Lemma 1 gives the following corollary.
Corollary 1: The ensemble average of the crosscovariance function between two chaotic threshold sequences $\{\Theta_t(\omega)\}_{n=0}^\infty$ and $\{\Theta_{t'}(\omega_n)\}_{n=0}^\infty$ generated by a piecewise monotonic map satisfying equation (69) is evaluated as $$\langle \tilde{p}(l; \Theta_t, \Theta_{\tau'}) \rangle_\tau = \dfrac{1}{N_\tau^l} s((\tau^l)'(t)) \langle \tilde{p}(0; \Theta_{t^{l(L)}}, \Theta_{\tau'}) \rangle_\tau, \quad (78)$$

where $$\langle \tilde{p}(0; \Theta_t, \Theta_{\theta_6}) \rangle_\tau = p_\tau(\max[t, t']) - p_\tau(t) p_\tau(t'), \quad (79)$$

$$(\tau^l)'(\omega) = \begin{cases} 1 & \text{(when } l = 0) \\ \prod_{r=1}^{l} \tau'(\tau^{r-1}(\omega)) & \text{(when } l \geq 1) \end{cases} \quad (80)$$

for $l = 0$
for $l \geq 1$

Proof: It follows from Lemma 1 that $$P_\tau^l\{(\Theta_t(\omega) - p_\tau(t))f^*(\omega)\} = \dfrac{1}{N_\tau^l} s((\tau^l)'(t))(\Theta_{\tau^l(t)}(\omega) - p_t(\tau^l(t)))f^*(\omega) \quad (81)$$

which yields equation (78).
The balanced property will now be discussed.
The ensemble average of the frequencies of 1's in a chaotic bit sequence $\{C_T(\omega_n)\}_{n=0}^\infty$, denoted by $\langle C_T \rangle_\tau$, is easily obtained from following equations (82) and (83):

$$\langle C_T \rangle_\tau = \sum_{r=0}^{2M} (-1)^{r-1} p_\tau(t_r), \quad (82)$$

$$p_\tau(t) = \langle \Theta_t \rangle_\tau. \quad (83)$$

Define a partition $d = t_0 < t_1 < \ldots < t_{2M} = e$ of $[d, e]$ such that $$t_r + t_{2M-r} = d + e, \quad r = 0, 1, \ldots, 2M \quad (84)$$

Such a set of thresholds $T$ is called a symmetric threshold set. Furthermore, a chaotic bit sequence $\{C_T(\omega_n)\}_{n=0}^\infty$ with such a symmetric threshold set is referred to as a chaotic symmetric binary sequence. Note that each of $\Theta_{r0}(\omega)$ with $t_0 = (d + e)/2$ in Example 1 and $B_t(\omega)$ in Example 2 is an example of such chaotic symmetric binary sequences.
Next let us restrict out attention to the map satisfying $$f'(d + e - \omega) = f'(\omega), \quad \omega \in [d, e], \quad (85)$$

which is referred to as a symmetric property of the invariant measure. Note that such a class of maps contains well known maps, such as the R-adic map, the tent map, the logistic map and the Chebyshev map.
For a symmetric binary sequence $\{C_T(\omega_n)\}_{n=0}^\infty$ generated by a map with the symmetric property of the invariant measure given by equation (85), the ensemble average of the frequencies of 1's in this sequence is given by $$\langle C_T \rangle_\tau = \tfrac{1}{2} \quad (86)$$

Proof: The symmetric property of the invariant measure of equation (85) gives $$P_\tau(t_r) + P_\tau(t_{2M-r}) = 1, \quad 0 \leq r \leq 2M \quad (87)$$

and hence, $$P_\tau(t_M) = \tfrac{1}{2} \quad (88)$$

Thus we get $$\langle C_T \rangle_\tau = (-1)^{M-1} p_\tau(t_M) + \sum_{r=1}^{M-1} (-1)^{r-1}(p_\tau(t_r) + p_\tau(t_{2M-r})) \quad (89)$$

$$= \dfrac{1}{2}$$

which completes the proof.
Next, the i.i.d. property will be discussed.
Let $\vec{U}_m = U_0 U_1 \ldots U_{m-1}$ be an arbitrary string of $m$ binary digits where $U_n$ ($0 \leq n \leq m-1$) are random variables of $\{0, 1\}$. Then, there are $2^m$ possible strings. Let $\vec{u}_m^{(r)} = u_0^{(r)} u_1^{(r)} \ldots u_{m-1}^{(r)}$ be the $r$-th string with binary elements $u_n^{(r)}$. Furthermore, for any binary function $G(\omega)$ satisfying equation (90), define the following two binary random variables expressed by equations (91) and (92):

$$G(\omega) \in L_1 \quad (90)$$

$$\Gamma^{(r)}(G(\omega)) = \begin{cases} G(\omega) & \text{(when } u_n^{(r)} = 0\text{)} \\ 1 - G(\omega) & \text{(when } u_n^{(r)} = 0\text{)} \end{cases} \quad (91)$$

for $u_n^{(r)}=1$
for $u_n^{(r)}$ $$\Gamma(\omega; m, r, G) = \prod_{l=0}^{m-1} \Gamma^{(r)}(G(\tau^l(\omega))). \quad (92)$$

Then, the probability of the event $\vec{u}_m^{(r)}$ is an infinite binary sequence $\{G(\omega_n)\}_{n=0}^{\infty}$ is given by $$Pr(\vec{u}_m^{(r)}; G) = \langle \Gamma(m, r, G) \rangle_\tau. \quad (93)$$

Let us now consider a class of piecewise monotonic maps which satisfy equation (69) and also the symmetric property of the map expressed by equation (94):

$$\tau(d+e-\omega) = \tau(\omega), \ \omega \in [d, e] \quad (94)$$

Such a class includes the tent map, the logistic map and the Chebyshev map of even degree k. The fact that $\tau$ is monotonic and onto gives $$\tau((d+e)/2) = d \text{ or } e \quad (95)$$

d or e

Lemma 2: For a symmetric binary sequence $\{C_T(\omega_n)\}_{n=0}^{\infty}$ generated by a piecewise monotonic map satisfying both equations (69) and (94), we can get $$P_\tau\{C_T(\omega)f^*(\omega)\} = \langle C_T \rangle_\tau f^*(\omega) \quad (96)$$

Proof: From equation (94), it is clear that $$\tau(t_r) = \tau(t_{2m-r}) \quad (97)$$

Thus we have $$P_\tau\{(C_T(\omega) - \langle C_T \rangle_\tau)f^*(\omega)\} = \quad (98)$$

$$\sum_{r=1}^{2M-1}(-1)^{r-1} P_\tau\{(\Theta_{tr}(\omega) - p_\tau(t_r))f^*(\omega)\} =$$

$$\frac{1}{N_\tau}f^*(\omega)\left\{\sum_{r=1}^{M-1}(-1)^{r-1}s(\tau'(t_r))\left(\Theta_{\tau(t_r)}(p_r(\tau(t_r))) + \right.\right.$$

$$\sum_{r=1}^{2M-1}(-1)^{r-1}s(\tau'(t_r))(\Theta_{\tau(t_r)}(\omega) - p_r(\tau(t_r)))\bigg\} =$$

$$\frac{1}{N_\tau}f^*(\omega)\left\{\sum_{r=1}^{M-1}(-1)^{r-1}s(\tau'(t_r))(\Theta_{\tau(t_r)}(\omega) - p_r(\tau(t_r))) + \right.$$

$$\sum_{r=1}^{M}(-1)^{r-1}s(\tau'(t_{2M-r}))(\Theta_{\tau(t_{2M-r})}(\omega) - p_r(\tau(t_{2M-r})))\bigg\} =$$

$$\frac{1}{N_\tau}f^*(\omega)(-1)^{M-1}s\left(\tau'\left(\frac{d+e}{2}\right)\right)\left(\Theta_{\tau\left(\frac{d+e}{2}\right)}(\omega) - p_\tau\left(\tau\left(\frac{d+e}{2}\right)\right)\right)$$

This completes the proof.

Thus we can get $$P_\tau\{\Gamma^{(r)}(C_T(\omega))f^*(\omega)\} = \begin{cases} \langle C_T \rangle_\tau f^*(\omega) & \text{(when } u_n^{(r)} = 1\text{)} \\ (1 - \langle C_T \rangle_\tau)f^*(\omega) & \text{(when } u_n^{(r)} = 0\text{),} \end{cases} \quad (99)$$

for $u_n^{(r)}=1$
for $u_n^{(r)}=0$

From equations (63) and (96), therefore, equation (99) in Theorem can be derived.

Theorem: For a chaotic symmetric binary sequence $\{C_T(\omega_n)\}_{n=0}^{\infty}$ generated by an ergodic map with three kinds of symmetric properties, namely, the equidistributivity of the invariant measure (equation (69)), the symmetric property of the invariant measure (equation (85)) and the symmetric property of the map (equation (94)), we have $$Pr(\vec{u}_m^{(r)}; C_T) = (\langle C_T \rangle_\tau)^s (1 - \langle C_T \rangle_\tau)^{m-s} \quad (100)$$

where s is the number of 1's in $\vec{u}_m^{(r)}$.

The above theorem implies that for a class of ergodic maps, such as the logistic map and the Chebyshev map of even degree k, $\{C_T(\omega_n)\}_{n=0}^{\infty}$ is a sequence of i.i.d. binary random variables in the sense that it can realize a Bernoulli sequence with probability $\langle C_T \rangle_\tau$. Note that a fair Bernoulli sequence can be obtained when $\langle C_T \rangle_\tau = \frac{1}{2}$, that is, an m-distributed binary random sequence which satisfies $$Pr(\vec{u}_m^{(r)}; C_T) = \frac{1}{2}^m \text{ (with respect to arbitrary r)} \quad (101)$$

Hence, it is reasonable that $C_T \omega$ is a generalized version of the Rademacher functions for the dyadic map.

Corollary 2: Consider the piecewise monotonic maps with both equations (69) and (91). Denote two different sets of symmetric thresholds by $T = \{t_r\}_{r=0}^{2M}$ and $T' = \{t'_r\}_{r=0}^{2M'}$, where $$d = t_0 < t_1 < \ldots < t_{2m} = e \quad (102)$$

$$d = t'_0 < t'_1 < \ldots < t'_{2M'} = e \quad (103)$$

$$t_r + t_{2M-r} = d+e, \ r=0, 1, \ldots, 2M \quad (104)$$

$$t'_r + t'_{2M'-r} = d+e, \ r=0, 1, \ldots, 2M' \quad (105)$$

Then, we can obtain the ensemble average of the cross-covariance function given by equation (68):

$$\langle \tilde{p}(l; C_T, C_{T'}) \rangle_\tau = \begin{cases} Q_{TT'}^C - \langle C_T \rangle_\tau \langle C_{T'} \rangle_\tau & \text{(when } l = 0\text{)} \\ 0 & \text{(when } l \geq 1\text{)} \end{cases} \quad (106)$$

for $l=0$
for $l \geq 1$
where $$Q_{TT}^C = \langle C_T \rangle_\tau = \frac{1}{2}, \quad (107)$$

$$Q_{TT'}^C = \int_I C_T(\omega) C_{T'}(\omega) f^*(\omega) d\omega = \int I_{TT'}^C d\omega, \quad (108)$$

$$I_{TT'}^C = \left(\bigcup_{r=1}^{2^{i-1}} I_T^C(r)\right) \cap \left(\bigcup_{s=1}^{2^{j-1}} I_{T'}^C(s)\right), \quad (109)$$

$$I_T^C(r) = [p_\tau(t_{2r}), p_\tau(t_{2r-1})]. \quad (110)$$

The next bit unpredictability will now be discussed. Let $\vec{u}_{m+1}^{(r1)}$ and $\vec{u}_{m+1}^{(r0)}$ denote the events $\vec{u}_m^{(r)}$ 1 and $\vec{u}_m^{(r)}$ 0 of period m+1, respectively. Now let us consider the conditional probabilities of 1 and of 0 after observing an event $\vec{u}_m^{(r1)}$ in the sequence $\{G(\omega_n)\}_{n=0}^{\infty}$, given respectively by $$Pr\left(1 \mid \vec{u}_m^{(r)}; G\right) = \frac{\langle \Gamma(m+1, r_1, G) \rangle_{\tau}}{\langle \Gamma(m, r, G) \rangle_{\tau}} \quad (111)$$

$$P_r\left(0 \mid \vec{u}_m^{(r)}; G\right) = \frac{\langle \Gamma(m+1, r_0, G) \rangle_{\tau}}{\langle \Gamma(m, r, G) \rangle_{\tau}} \quad (112)$$

Thus, in general, these joint probabilities must be evaluated. If the sequence $\{G(\omega_n)\}_{n=0}^{\infty}$ is i.i.d., such as a symmetric binary sequence $\{C_T(\omega_n)\}_{n=0}^{\infty}$ in the above theorem, the evaluation is unnecessary, and $$Pr(1 \mid \vec{u}_m^{(r)}; G) = \langle G \rangle_{\tau} \text{ for all } r \quad (113)$$

for all r.

$$Pr(0 \mid \vec{u}_m^{(r)}; G) = 1 - \langle G \rangle_{\tau} \text{ (with respect to arbitrary r)} \quad (114)$$

for all r.
Moreover, if such a sequence $\{C_T(\omega_n)\}_{n=0}^{\infty}$ is balanced, i.e., $\langle C_T \rangle = \frac{1}{2}$, then $$Pr(1 \mid \vec{u}_m^{(r)}; G) = Pr(0 \mid \vec{u}_m^{(r)}; G) = \frac{1}{2} \text{ (with respect to arbitrary (r))} \quad (115)$$

for all r.
This implies th at the balanced symmetric binary sequence $\{C_T(\omega_n)\}_{n=0}^{\infty}$ is unpredictable.

Note that $\{\Theta_t(\omega_n)\}_{n=0}^{\infty}$ has good auto/cross correlation properties as shown in Corollary 1. In order to discuss cryptographic security of these secret keys, define the function between sequences $\{G(\omega_n)\}_{n=0}^{\infty}$ with an initial seed $\omega_0$ and $\{H(\omega'_n)\}_{n=0}^{\infty}$ with an initial seed $\omega'_0$ as $$\rho(1, \omega_0, \omega_0'; G, H) = G(\omega_n)H(\omega_{n+1}'),$$

$$1 = 0, 1, 2, \quad (116)$$

The time average of the crosscorrelation function $\rho_N(1, \omega_0, \omega_0; \Theta_t, \Theta_t,)$ with t~t' has a peak only at 1=0, even when N=64, for example, because of the delta-function-like property of the ensemble average of the autocorrelation function $\langle \rho \rangle 1; \Theta_t, \Theta_t \rangle_{\tau}$. Note that in this time average, the subscripts are taken mod N. Furthermore, it is clear that $\rho_N(0, \omega_0, \omega_0; \Theta_t, \Theta_t,)$ with t~t' does not vanish and each of the derivatives of the function $\rho_N(0, \omega_0, \omega_0; \Theta_t, \Theta_t,)$ with respect to t and t' is not so large, hence such situations force us to employ this function $\rho_N(0, \omega_0, \omega_0; \Theta_t, \Theta_t,)$ in a cryptanalysis of $\{\Theta_t(\omega_n)\}_{n=0}^{\infty}$. This implies that the key t is not cryptographically secure and should not be used alone. Similarly, the bit number i in a bit sequence $\{B_i(\omega_n)\}_{n=0}^{\infty}$ is not cryptographically secure because the number of different bit numbers is not so large. However, we still have other secret key parameters such as $\omega_0$ and k.

In order to search $\omega_0$, consider a cryptanalysis using the time average $\rho_N(0, \omega_0, \omega'_0; \Theta_t, \Theta_t,)$. In this search all possible $\omega'_0$ should be scanned because of the SDIC (Sensitive Dependence on Initial Conditions) property of a chaotic real-valued orbit $\{\omega_n\}_{n=0}^{\infty}$. This implies that exhaustive search of $\omega_0$ is necessary even if the degree k is previously known and t~t'. Thus, this strategy is computationally infeasible because of the large key space of $\omega_0$.

Next, let us consider a cryptanalysis of $\{C_T(\omega_n)\}_{n=0}^{\infty}$. The time average of the crosscorrelation function $\rho_N(0, \omega_0, \omega_0; \Theta_t, \Theta_t,)$ with T~T' has a peak only at 1=0 because of the delta-function-like property of the ensemble average of the crosscorrelation function $\langle \rho(1; C_T, C_{T'}) \rangle_{\tau}$, where T' is a symmetric threshold set (Corollary 2). Furthermore, it is clear that $\rho_N(0, \omega_0, \omega_0; \Theta_t, \Theta_t,)$ with T~T' does not vanish and each of the derivatives of the function $\rho_N(0, \omega_0, \omega_0; \Theta_t, \Theta_t,)$ with respect to $\{t_\tau\}$ and $\{t'_\tau\}$ is not so large. Thus, the function $\rho_N(0, \omega_0, \omega_0; \Theta_t, \Theta_t,)$ can be used as a statistic quantity in a cryptanalysis of $\{C_T(\omega_n)\}_{n=0}^{\infty}$. Similarly, in searching $\omega_0$, the time average $\rho_N(0, \omega_0, \omega'_0; \Theta_t, \Theta_t,)$ can be used. However, all possible $\omega'_0$ should be scanned because of the SDIC property. This implies that exhaustive search of $\omega_0$ is needed even if the degree k is previously known and T~T'. Note that to get the situation where T~T', we need beforehand an enormous amount of computations because T has M different symmetric thresholds.

In order to make such keys stronger and to increase the number of different secret keys, it is possible to use the modulo 2 addition of chaotic symmetric binary sequences $\{C_{Tj}(\omega_n)\}_{n=0}^{\infty}$ with symmetric threshold set $$Tj = \{t_i(j)\}_{i=0}^{2M(j)}, 0 \leq j \leq m-1 \quad (117)$$

For example, for a positive integer $d_i(1 \leq i \leq m-1)$, we get $$D\vec{T}, \vec{d}(\omega_n) = C_{T0}(\omega_n) \oplus (C_{T1}(\omega_{n-d_1}) \oplus \ldots$$
$$\oplus C_{T_{m-1}}(\omega_{n-d_1-\ldots-d_{m-1}}), \quad (118)$$

$$\vec{T} = \{T_0, T_1, \ldots, T_{m-1}\}, \vec{d} = \{d_1, d_2, \ldots, d_{m-1}\} \quad (119)$$

Note that $\{D_{\vec{T}, \vec{d}}(\omega_n)\}_{n=0}^{\infty}$, which is obtained from a chaotic real-valued trajectory $\{\omega_n\}_{n=0}^{\infty}$ (D sequence), is also a sequence of i.i.d. binary random variables.

For such a D sequence, it is possible to use not only $\vec{T}$ but also $\vec{d}$ as secret keys, so that it is much harder to do a cryptanalysis of $\{D_{\vec{T},\vec{d}}(\omega_n)\}_{n=0}^{\infty}$ than that of $\{C_T(\omega_n)\}_{n=0}^{\infty}$.

Let us define equations (120) and (121) for statistically and independently chosen L initial seeds $\{\omega_{0,s}\}_{s=1}^{L}$ and parameters $\{K_s\}_{s=1}^{L}$ of L maps. Then, we can obtain an i.i.d. binary sequence (E sequence)

$$\{E_{\vec{k}}(\vec{\omega}_n)\}_{n=0}^{\infty}$$

$$E_{\vec{k}}(\vec{\omega}_n) = D_{\vec{T}}(1), \vec{d}(1)(\omega_{n,1}) \oplus D_{\vec{T}}(2)(\omega_{n,2}) \oplus \ldots \oplus D_{\vec{T}(L)},$$
$$\vec{d}(L)(\omega_{n,L}) \quad (120)$$

$$\vec{k} = \{k_1, k_2, \ldots, k_L\},$$

$$\vec{\omega}_n = \{\omega_{n,1}, \omega_{n,2}, \cdots, \omega_{n,L}\}, \omega_{n,s} = \tau_{k_s}^n(\omega_{0,s}) \quad (121)$$

With respect to $\{E_{\vec{k}}(\vec{\omega}_n)\}_{n=0}^{\infty}$, the number of parameters to be secret keys is increased so that it becomes much harder to do a cryptanalysis of this sequence than that of $\{D_{\vec{T},\vec{d}}(\omega_n)\}_{n=0}^{\infty}$. While the orbit $\{\omega_{n,s}\}_{n=0}^{\infty}$ for each initial seed inevitably falls in the period in a finite-precision computation environment, the period of $\{E_{\vec{k}}(\vec{\omega}_n)\}_{n=0}^{\infty}$ can be longer than that period.

As apparent from the above, the sequence $\{C_T(\omega_n)\}_{n=0}^{\infty}$ permits a flexible keystream generator to be designed.

The following describes an embodiment which has structures in FIG. 22 in multilevel in order to make stronger the keys in a stream cipher, which has been explained with reference to FIG. 22, etc., and to increase the number of different secret keys.

(1) Multilevel Structure of Level 1 (D Sequence;
A Combination Of A Plurality of C sequences
Generated From One Initial Seed)

Figure 28A:
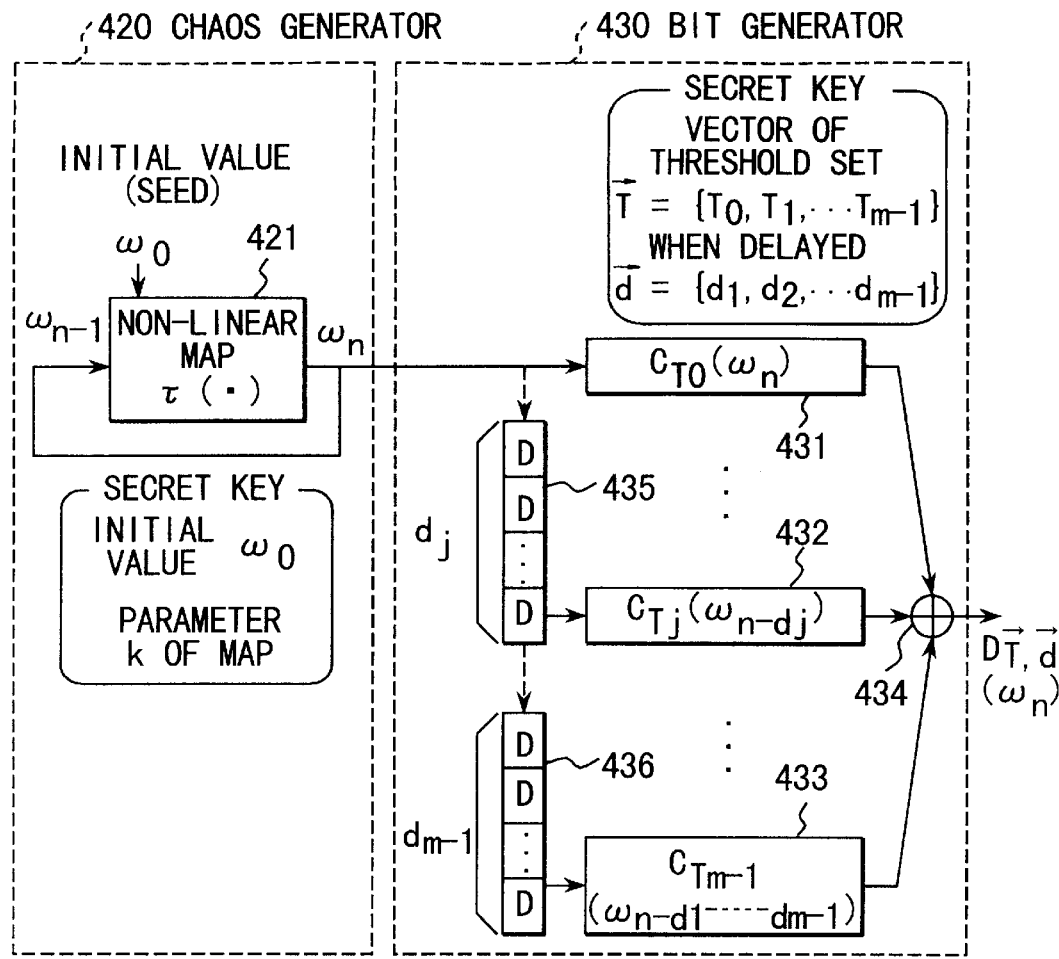
FIGS. 28A and 28B illustrate diagrams exemplifying the structure of a chaotic bit sequence generator having a multilevel structure of level 1.
Figure 28B:
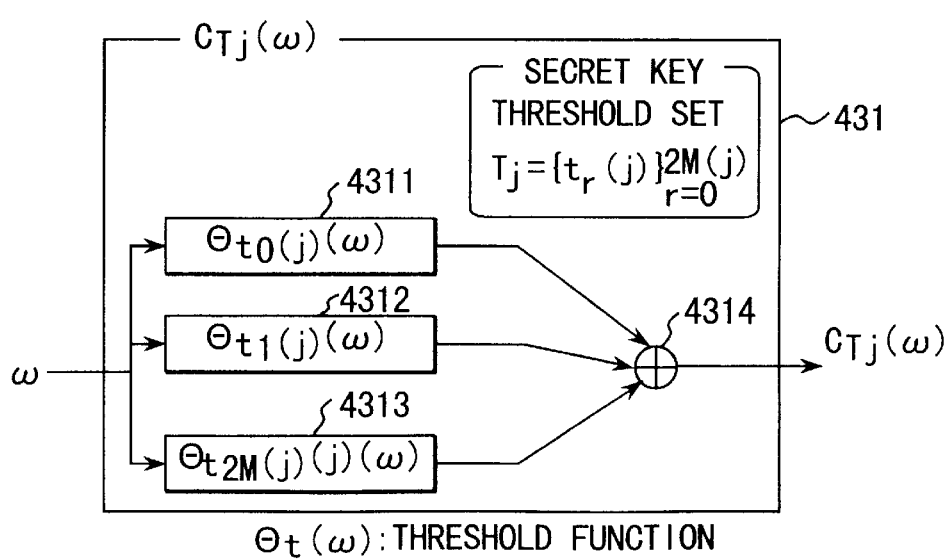

FIGS. 28A and 28B exemplify the structure of a chaotic bit sequence generator by a D sequence. As shown in FIG. 28A, the chaotic bit sequence generator includes a chaos generator 420 and a bit generator 430.

The chaos generator 420 has the same structure as the chaos generator 30 in FIG. 22, and generates a real-valued sequence from given first common keys and a predetermined nonlinear map (421). When a Chebyshev map expressed by differential equation (46) is used as a predetermined nonlinear map, for example, the first common keys are the initial seed $\omega_0$ and parameter k. When $\omega_0=0.3$ and k=2, the real-valued sequence $\omega_n$ becomes as illustrated in FIGS. 5 and 6.

As shown in FIG. 28B, the bit generator 430 includes C sequence generators 431, 432 and 433 having the same structures as the bit generator 40 in FIG. 22, delay sections 435 and 436, and a nonlinear coupling section 434 for nonlinearly coupling plural pieces of bit data output from the C sequence generators 431, 432 and 433. The nonlinear coupling is, for example, a process for obtaining an exclusive OR of all input data.

Each C sequence generator, like the one in FIG. 22, generates binary data $C_{Tj}(\omega_n)$ based on a threshold $T_j\{t_0, t_1, \ldots, t_{2M(j)}\}$ indicated by the second key T.

Since the delay sections are inserted at the previous stage of the C sequence generators in the structure in FIG. 28B, and each delay section delays a real value by a delay amount $d_j$ given as a key $\vec{d}$ and outputs the delayed real value to the next stage, binary data to be given to the nonlinear coupling section 434 from each C sequence generator can be changed to be associated with different $\omega_n$.

The nonlinear coupling section 434 performs a predetermined nonlinear coupling process, e.g., an exclusive OR, to yield $\{D_{\rightarrow T, \rightarrow d}(\omega_n)\}$.

The generation of a binary sequence will now be discussed specifically.

Suppose that m=2 and a Chebyshev map expressed by equation (46) is used as a nonlinear map, the initial seed $\omega_0=0.3$ and parameter k=2 are given by the first common keys, thresholds $t_0=-0.5, t_1=-0.2, t_2=0, t_3=0.2$ and $t_4=0.5$ are given to the first C sequence generator based on the second common key, thresholds $t_0=-0.8, t_1=-0.7, t_2=-0.1, t_3=0, t_4=0.1, t_5=-0.7$ and $t_6=-0.8$ are given to the second C sequence generator based on the second common key, and a delay amount d=1 is given by the second common key to the delay section at the preceding stage of the second C sequence generator.

In this case, as shown in FIG. 29, $C_{T0}(\omega_n)=(0, 0, 0, 0, 1, 0, 1, 0, 0, 0, \ldots)$ is acquired from the first C sequence generator (see FIG. 23, and $C_{T1}(\omega_{n-1})=(-, 1, 0, 1, 0, 1, 1, 0, 1, 0, \ldots)$ is acquired from the second C sequence generator (see FIG. 24) where "–" indicates that there is no data for the delay; the same is true in the following description.

As $C_{T1}(\omega_n)$ is output with one unit delay with respect to $C_{T0}(\omega_n)$, the exclusive OR of $C_{T0}(\omega_n)$ and $C_{T1}(\omega_{n-1})$ yields $\{D_{\rightarrow T, \rightarrow d}(\omega_n)\}_{n=0}^{\infty}=(-, 1, 0, 1, 0, 1, 1, 0, 1, 0, \ldots)$.

The binary data which have been output from the other C sequence generators than the one ($C_{Tm-1}$) having the largest delay until this C sequence generator $C_{Tm-1}$ outputs the first binary data are not used, and (1, 0, 1, 0, 1, 1, 0, 1, 0, ...) can be used as a keystream sequence.

The C sequence generators in FIG. 28A may be replaced with the bit generator 22 in FIG. 4 or the bit generator 26 in FIG. 8. Alternatively, the bit generator 24 in FIG. 6 may be used as well.

(2) Multilevel Structure of Level 2 (E Sequence; A Combination Of A Plurality of D sequences Generated From A Plurality of Initial Seeds)

Figure 30A:
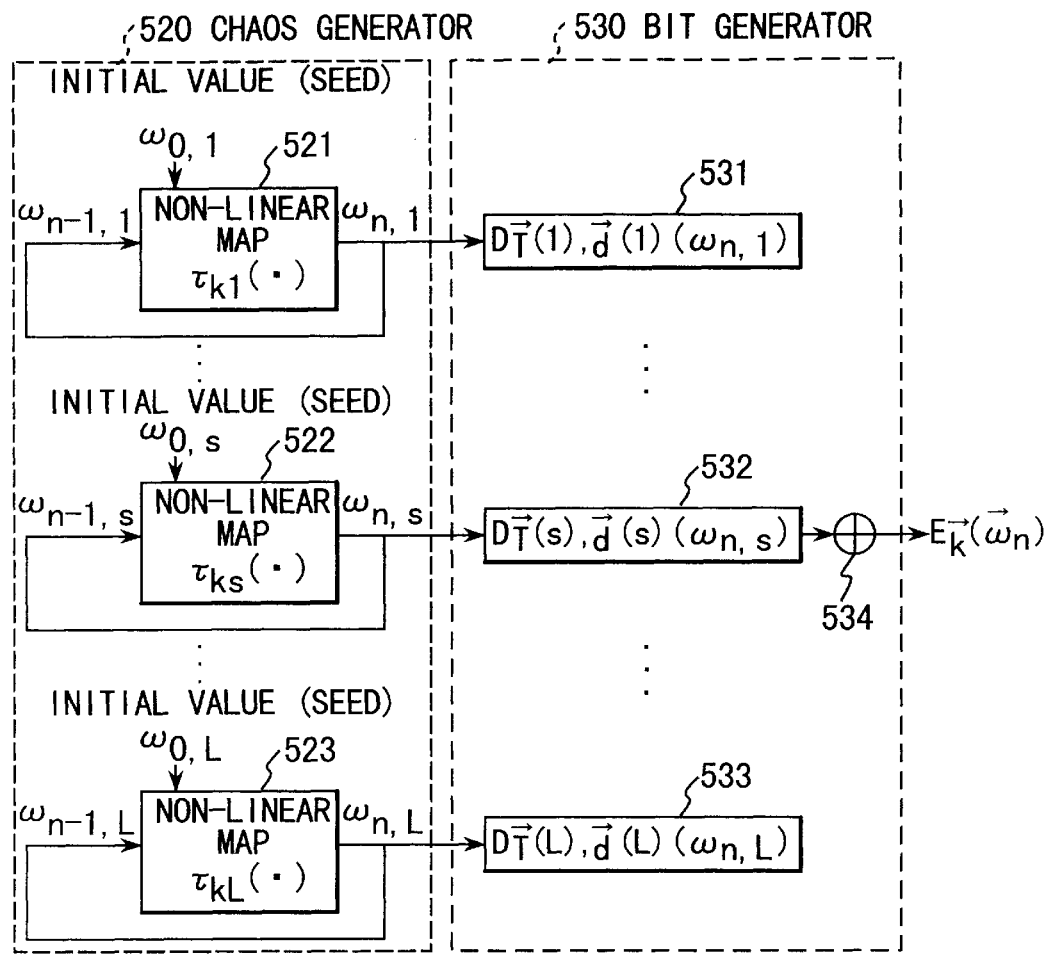
FIGS. 30A and 30B illustrate diagrams exemplifying the structure of a chaotic bit sequence generator having a multilevel structure of level 2.
Figure 30B:
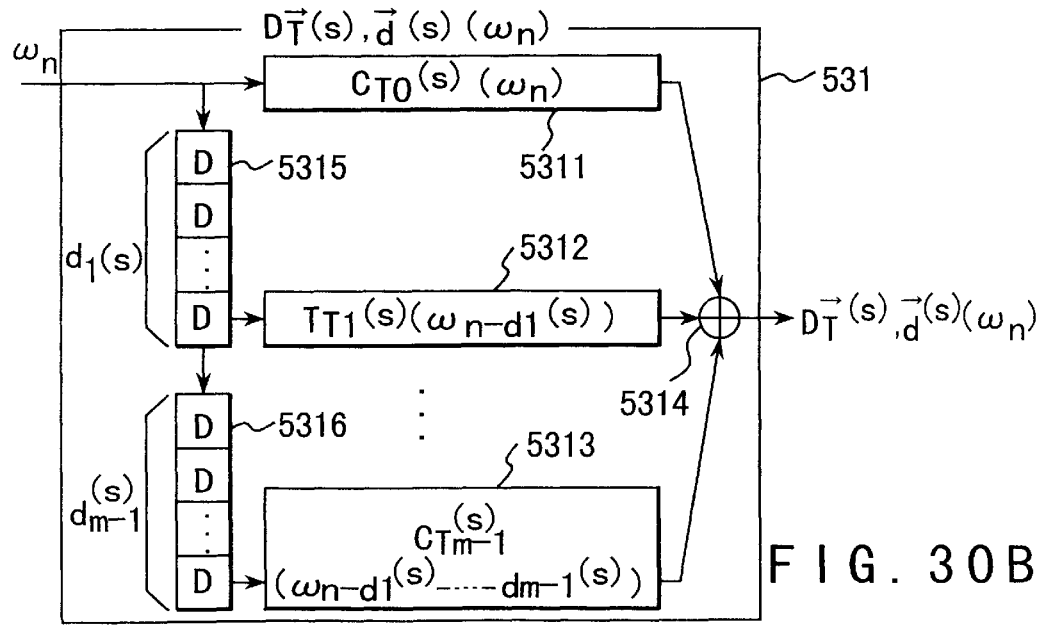

FIGS. 30A and 30B exemplify the structure of a chaotic bit sequence generator by a D sequence. As shown in FIG. 30A, the chaotic bit sequence generator includes a chaos generator 520 and a bit generator 530.

The chaos generator 520 has the same structures as the chaos generator 30 in FIG. 22 for L systems, and generates real-valued sequences of L systems from given first common keys and predetermined nonlinear maps (521, 522, 523).

As shown in FIG. 30B, the bit generator 530 includes D sequence generators 531, 532 and 533 of L systems, each having the same structure as the bit generator 430 in FIG. 28A, and a nonlinear coupling section 534 for nonlinearly coupling plural pieces of bit data output from the individual D sequence generators 531, 532 and 533. The nonlinear coupling is, for example, a process for obtaining an exclusive OR of all input data.

In other words, the chaotic bit sequence generator in this embodiment handles D sequences from L systems, and exclusive OR of those D sequences is obtained.

The generation of a binary sequence will now be discussed specifically.

Suppose that a Chebyshev map expressed by equation (46) is used as a nonlinear map for any of L (=3) systems.

In this case, when m=2, the initial seed of a map $\omega_{0,1}=0.3$, parameter $k_1=2$, the threshold of the first C sequence generator is $\{-0.5, 0, 0.5\}$, the threshold of the second C sequence generator is $\{-0.8, -0.7, -0.1, 0, 0.1, 0.7, 0.8\}$, and d=$\{1\}$ for the first D sequence generator, a binary sequence $D_{\rightarrow T(1), \rightarrow d(1)}(\omega_{n,1})=(-, 1, 0, 1, 0, 1, 1, 0, 1, 0, 1, 1, 0, 0, \ldots)$ which is the output of the first D sequence generator is acquired as shown in FIG. 31.

When m=3, the initial seed of a map $\omega_{0,1}=0.4$, parameter $k_1=4$, the threshold of the first C sequence generator is $\{-0.85, 0, 0.85\}$, the threshold of the second C sequence generator is $\{-0.9, -0.3, 0, 0.3, 0.9\}$, the threshold of the third C sequence generator is $\{-0.4, -0.2, -0.1, 0, 0.1, 0.2, 0.4\}$, and d=$\{1, 2\}$ for the second D sequence generator, a binary sequence $D_{\rightarrow T(2), \rightarrow d(2)}(\omega_{n,2})=(-, -, -, 0, 1, 1, 0, 0, 1, 0, 1, 0, 0, 0, \ldots)$ is acquired as shown in FIG. 18.

When m=4, the initial seed of a map $\omega_{0,1}=0.6$, parameter $k_1=6$, the threshold of the first C sequence generator is $\{-0.75, 0, 0.75\}$, the threshold of the second C sequence generator is $\{-0.6, -0.5, 0, 0.5, 0.6\}$, the threshold of the third C sequence generator is $\{-0.45, -0.35, -0.15, 0, 0.15, 0.35, 0.45\}$, the threshold of the fourth C sequence generator is $\{-0.95, -0.65, -0.55, -0.25, 0, 0.25, 0.55, 0.65, 0.95\}$, and d=$\{1, 2, 1\}$ for the third D sequence generator, a binary sequence $D_{\rightarrow T(3), \rightarrow d(3)}(\omega_{n,3})=(-, -, -, -, 0, 1, 1, 1, 1, 0, 0, 0, 1, 1, \ldots)$ is acquired as shown in FIG. 33.

Thus, the nonlinear coupling section 534 outputs $E_{\rightarrow K}=\{-, -, -, -, 1, 1, 0, 1, 1, 0, 0, 1, 1, 1, \ldots\}$ as shown in FIG. 34.

In this example too, the binary data which have been output from the other C sequence generators than the one ($C_{Tm-1}$) having the largest delay until this C sequence generator $C_{Tm-1}$ outputs the first binary data are not used, and (1, 1, 0, 1, 1, 0, 0, 1, 1, 1, ...) can be used as a keystream sequence.

The C sequence generators in FIG. 30B may be replaced with the bit generator 22 in FIG. 4 or the bit generator 26 in FIG. 8. Alternatively, the bit generator 24 in FIG. 6 may be used as well.

Finally, the computation time required to generate an N-bit sequence is illustrated in FIGS. 35A, 35B and the computation time needed to encipher or decipher an N-bit plaintext or ciphertext is illustrated in FIGS. 36A and 36B. The times were measured by running a program written by ANSI C on a SUN workstation SS4/5. In the diagrams, D sequence 1 is the combination of two C sequences (M=3), D sequence 2 is the combination of two C sequences (M=15), E sequence 1 is the combination of two D sequences 1, and E sequence 2 is the combination of two D sequences 2. FIGS. 36A and 36B show the computation time needed by the conventional DES system and FEAL system for comparison. The units of the numerals in the diagrams are seconds.

It is apparent that the C sequence, Θ sequence, B sequence, A sequence and D sequence of multilevel 1 can be acquired considerably faster than those by the conventional DES system and FEAL system. Even the E sequence of the degree which is acquired by the combination of two D sequences each is generated by the combination of two C sequences with M=15 can ensure about the same computation speed as the conventional DES system and FEAL system.

As apparent from the above, the present cipher system is excellent also in the fast processing speed.

Some of characteristics and features of this cipher system will be described.

A chaotic bit sequence is promising as a good binary pseudorandom generator in the following points. This binary pseudorandom generator is a generalized version of the Rademacher functions for the dyadic map.

1) There are many cryptographically secure keys whose total significant bits are short.

2) It is easy to get a number of different unpredictable balanced sequences of i.i.d. binary random variables simultaneously.

3) The periods of these unpredictable sequences are sufficiently long for almost every seed.

In particular, when a nonlinear map in use has the equidistributivity of the invariant measure, the symmetric property of the invariant measure and the symmetric property of the map and a symmetric threshold set is used as the threshold set, ideal random variables as a binary sequence can be acquired.

The cryptographic security of the present stream cipher system appears to be superior to the conventional block cipher system.

As shown in FIGS. 35A and 35B, cryptography by this stream cipher system is executed faster than that by the block cipher system, so that this stream cipher system can easily implemented by a floating-point microprocessor.

Further, this cipher system can easily realized by using a general-purpose programming language ANSI C or the like which can perform floating-point computations, and can easily guarantee the reproducibility of a real-valued orbit if the same floating-point environment, e.g., the IEEE standard 754, is used on both the transmission end and the receiving end of the communication system.

As discussed above, the chaotic bit sequence has excellent characteristics and features as a keystream sequence in a stream cipher system.

Furthermore, several cryptographic techniques for updating secret keys for such a stream cipher system and delivering the keys to the receiving end can easily be utilized.

Although the foregoing description of the embodiments has been given with reference to the case where a random generator is used as the chaotic bit sequence generator for generating a keystream sequence for a stream cipher, this random generator can be used in various systems. Particularly, as mentioned earlier, if a binary sequence is generated from an ergodic map having three types of symmetric properties, namely, the equidistributivity of the invariant measure (equation (69)), the symmetric property of the invariant measure (equation (85)) and the symmetric property of the map (equation (94)), by using a symmetric threshold set given by equation (84), ideal random variables can be acquired. Thus, this random generator can be used as a good random generator for various purposes.

When the random generator is used in a stream cipher system, the parameters of a map, the initial seed and the thresholds in the binarization are given as common keys. When the random generator is used as an ordinary random generator, however, those should be given as needed.

The details of references cited in this specification are listed below.

[Reference 1] C. E. Shannon, "Communication Theory of Secrecy Systems", Bell Syst. Tech. J., 28 656–715, 1945.

[Reference 2] H. J. Beker F. C. Piper, "Communications security A survey of cryptography, IEE Proc., 129, Pt. A, No. 6, 357–376, 1982.

[Reference 3] D. E. R. Denning, Cryptography and Data Security, Addison-Wesley. Publishing, 1982.

[Reference 4] James L. Massey, "An Introduction to Contemporary Cryptology", Proc. IEEE, 76–5, pp. 533–549, 1988.

[Reference 5] K. Zeng, C. H. Yang, D. Y. Wei, and T. R. N. Rao, "Pseudorandom Bit Generators in Stream-Cipher Cryptography", IEEE Computer, -2, 8–17, 1991.

[Reference 6] H. Niederreiter, "Quasi-Monte Carlo methods and pseudo-random numbers," Bull. Am. Math. Soc., 84, 957–1041 1978.

[Reference 7] D. Knuth, The art of Computer Programming, Vol. 2 Seminumerical Algorithms, 2nd ed. (Addison-Wesley, Reading, Mass., 1981).

[Reference 8] A. Yao, "Theory and applications of trapdoor functions", Proc. the 23rd Annual Sympo. Foundations of Computer Science, 80–91, 1982.

[Reference 9] M. Blum, and S. Micali, "How to generate cryptographically strong sequences of pseudo-random bits", SIAM J. Comput., 13, 850–864, 1984.

[Reference 10] L. Blum, M. Blum and M. Blum and M. Shub, "A simple unpredictable pseudorandom number generator", SIAM J. Comput., 15, 364–383, 1984.

[Reference 11] L. Levin "One-way functions and pseudo-random generators". Proc. the 17th Annual ACM Sympo. on Theory of Computing, 363–365, 1985.

[Reference 12] O. Goldreich, S. Goldwasser, and S. Micali, "How to construct random functions", J. ACM, 33, 792–807, 1986.

[Reference 13] T. Habutsu, Y. Nishio, I. Sasase, and S. Mori, "A Secret Key Cryptosystem by Iterating a Chaotic Map" Proc. Eurocrypt '91, 127–140, 1991

[Reference 14] L. M. Pecora and T. L. Carroll, "Synchronization in Chaotic Systems," Physical Review Letters. 64, 821–824, 1990

[Reference 15] K. M. Cuomo and A. V. Oppenheim, "Circuit Implementation of Synchronized Chaos with Applications to Communications," Physical Review Letters. 71, 65–68, 1993

[Reference 16] U. Parlitz and S. Ergezinger, "Robust Communication based on Chaotic Spreading Sequences," Physics Letters A, 188, 146–150, 1994.

[Reference 17] E. Biham, "Cryptanalysis of the Chaotic Map Cryptosystem Suggested at EUROCRYPT '91," Proc. Eurocrypt '91, 532–534, 1991

[Reference 18] Th. Beth, D. E. Lazic, and A. Mathias, "Cryptanalysis of Cryptosystems based on Remote Chaos Replication." Proc. Crypt '94, 318–331, 1994.

[Reference 19] S. L. Ulam and J. von Neumann, "On combination of stochastic and deterministic processes", Bull. Math. Soc., 53, p. 1120, 1947.

[Reference 20] D. S. Ornstein, "Ergodic Theory, Randomness. and "Chaos", " Science 243, pp.182–186, 1989.

[Reference 21] T. Kohda and A. Tsuneda, "Pseudonoise Sequence by Chaotic Nonlinear Maps and Their Correlation Properties," IEICE Trans. on Communications, E76-B, 855–862, 1993.

[Reference 22] T. Kohda and A. Tsuneda, "Explicit Evaluation of Correlation Functions of Chebyshev Binary and Bit Sequences Based on Perron-Frobenius Operator," IEICE Trans. on Fundamentals of Electronics, Communications and Computer Sciences, E77-A, 1794–1800, 1994.

[Reference 23] Jackson, E. Atlee, Perspective nonlinear dynamics, Cambridge Univ. Press, 1989.

[Reference 24] A. Lasota and M. C. Mackey, Chaos, Fractals, and Noise, Springer-Verlag, 1994.

[Reference 25] S. Oishi H. Inoue, "Pseudo-random number generators nd chaos", Trans. IEICE Japan, E65, pp. 534–541, 1982.

[Reference 26] L. O. Chua, Y. Yao and Q. Yang, "Generating randomness from chaos and constructing chaos with desired randomness", Int. J. Circuit and Applications, 18, pp. 215–240, 1990.

[Reference 27] A. R. Murch and R. H. T. Bates, "Colored noise generation through deterministic chaos", IEEE Trans. on Circuit Systems, 37, 5, pp. 608–613, 1990.

[Reference 28] G. M. Bernstein and M. A. Lieberman, "Secure Random Generation Using Chaotic Circuits", IEEE Trans. Circuits and Systems, 37–9, pp. 1157–1164, 1990.

[Reference 29] R. L. Adler and T. J. Rivlin, "Ergodic and mixing properties of Chebyshev polynomials", Proc. Amer. Math. Soc., 15, pp. 794–796, 1964.

[Reference 30] T. J. Rivlin, Chebyshev polynomials-From Approximation Theory to Algebra and Number Theory, A Wiley-Interscience Publication, (1990).

[Reference 31] Grossmann S., and Thomae, S., "Invariant distributions and stationary correlation functions of one-dimensional discrete processes," Z. Naturforsch. 32a, pp. 1353–1363, 1977.

[Reference 32] T. Kohda and A. Tsuneda, "Auto-/Cross-Correlation Functions of Chaotic Binary/Bit Sequences", Proc. of International Conference on Dynamical Systems and Chaos, Vol. 1, pp. 331–334, 1994.

[Reference 33] T. Kohda and A. Tsuneda, "Statistics of Chaotic Binary Sequences", submitted to IEEE Trans. Information Theory, 1995.

[Reference 34] Ross Anderson, Fast Software Encryption, Lecture Notes in Computer Science, No. 809, Springer-Verlag, 1994.

[Reference 35] M. Kac, Statistical Independence in Probability, Analysis and Number Theory, The Carus Mathematical Monographs, No. 12, The Mathematical Association of America, 1959.

[Reference 36] P. Billingsley, Probability and Measure. John Wiley & Sons, 1995.

[Reference 37] C. M. Goldie and R. G. E. Pinch, Communication Theory, London Mathematical Soc. Student Texts, 20, Cambridge Univ. Press, 1991.

[Reference 38] A. McGrai, "Randomness Properties of Two Chaotic Mappings", Cryptography and Coding III, edited by M. J. Ganley, Clarendon Press, Oxford, pp.265–295, 1993.

[Reference 39] A. Boyarsky and M. Scarowsky, "On A Class of Transformations Which Have Unique Absolutely Continuous Invariant Measures", Tran. Am. Math. Soc. vol. 255, pp.243–262, 1979.

The present examples and embodiments are to be considered as illustrative and not restrictive and the invention is not to be limited to the details given herein, but may be modified within the scope of the appended claims.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An enciphering apparatus comprising:

chaos generation means for generating a real-valued sequence along a chaotic orbit in accordance with a predetermined number of first common keys and a predetermined nonlinear map;

bit generation means for normalizing individual real values in said real-valued sequence over a predetermined interval and for binarizing said normalized real values using values indicated by a predetermined number of second common keys as thresholds to generate a binary sequence; and logic operation means for executing a predetermined logic operation on a binary sequence of an input plaintext and said generated keystream sequence bit by bit to generate a binary sequence of ciphertext.

2. The enciphering apparatus according to claim 1, wherein said first common keys are an initial seed of said predetermined nonlinear map, or an initial seed of said predetermined nonlinear map and a value of a parameter of said nonlinear map; and said second common keys represent a predetermined number of different thresholds based on said predetermined binarization.

3. The enciphering apparatus according to claim 2, wherein said initial seed of said predetermined nonlinear map and said value of said parameter of said nonlinear map are real values.

4. The enciphering apparatus according to claim 1, wherein said predetermined nonlinear map is a Chebyshev map of degree k (k: being a real value equal to or greater than 2) given by a differential equation $\omega_{n+1} = \cos(k \cos^{-1} \omega_n)$; and said first common keys are an initial seed $\omega_0$ of said Chebyshev map where $-1 < \omega_0 < 1$, and a value of said parameter k.

5. The enciphering apparatus according to claim 1, wherein said logic operation means performs an exclusive OR operation or an exclusive AND operation.

6. The enciphering apparatus according to claim 1, wherein said bit generation means binarizes individual real values in said real-valued sequence using values indicated by said second common keys as thresholds.

7. The enciphering apparatus according to claim 1, wherein said bit generation means acquires absolute values of individual real values in said real-valued sequence and binarizes said absolute values of said real values using values indicated by said second common keys as thresholds.

8. The enciphering apparatus according to claim 1, wherein said second common keys are bit numbers indicating bit positions of real values in a binary representation; and said bit generation means selects values of individual real values in said real-valued sequence in a binary representation, at bit positions indicated by said second common keys, to binarize said real values.

9. The enciphering apparatus according to claim 1, wherein said second common keys are bit numbers indicating bit positions of real values in a binary representation; and said bit generation means selects values of normalized values of said real values in said real-valued sequence in a binary representation, at bit positions indicated by said second common keys, to binarize said real values.

10. The enciphering apparatus according to claim 1, wherein said bit generation means acquires plural pieces of binary data of individual real values in said real-valued sequence using values indicated by said plurality of second common keys as thresholds, and performs predetermined nonlinear coupling process on said plural pieces of binary data.

11. The enciphering apparatus according to claim 1, wherein said second common keys are bit numbers indicating bit positions of real values in a binary representation; and
said bit generation means selects values of individual real values in said real-valued sequence or values obtained by performing a predetermined process on said real values, in a binary representation, at bit positions indicated by said second common keys, and performs predetermined nonlinear coupling on said selected values to binarize said real values.

12. The enciphering apparatus according to claim 10, wherein said logic operation means performs an exclusive OR operation or an exclusive AND operation.

13. The enciphering apparatus according to claim 11, wherein said logic operation means performs an exclusive OR operation or an exclusive AND operation.

14. The enciphering apparatus according to claim 1, wherein said chaos generation means executes a program described in a predetermined language by using a floating-point computing device to generate a sequence of values of said predetermined nonlinear map.

15. A keystream generating method for a keystream generating apparatus for use in a stream enciphering apparatus or a stream deciphering apparatus for performing a logic operation on a binary sequence of a plaintext or a ciphertext and a keystream sequence generated based on a predetermined common key to generate a ciphertext or an original plaintext, said keystream generating method comprising the steps of:
generating a real-valued sequence along a chaotic orbit in accordance with a predetermined number of first common keys and a Chebyshev map of degree k (k: being a real value equal to or greater than 2) given by a differential equation $\omega_{n+1}=\cos(k \cos^{-1} \omega_n)$, the first common keys being an initial seed $\omega_0$ of the Chebyshev map where $-1<\omega_0<1$, and a value of the parameter k; and
performing predetermined binarization on each real value in said generated real-valued sequence based on a predetermined number of second common keys to generate a binary sequence.

16. The keystream generating method according to claim 15, wherein the first common keys are an initial seed of the predetermined nonlinear map, or an initial seed of the predetermined nonlinear map and a value of a parameter of the nonlinear map; and the second common keys represent a predetermined number of different thresholds based on the predetermined binarization.

17. A random variable generating method in a stream enciphering system based on a chaotic binary sequence comprising the steps of:
generating a real-valued sequence along a chaotic orbit in accordance with a predetermined number of first common keys and a predetermined nonlinear map;
normalizing individual real values in said real-valued sequence over a predetermined interval and binarizing said normalized real values using values indicated by a predetermined number of second common keys as thresholds to generate a binary sequence; and
executing a predetermined logic operation on a binary sequence of an input plaintext and said generated keystream sequence bit by bit to generate a random variable.

18. The random variable generating method according to claim 17, wherein the initial seed of the predetermined nonlinear map and the value of the parameter of the nonlinear map are real values.

19. The method according to claim 17, wherein said random variable generating step includes:
sequentially delaying said generated real-valued sequence in accordance with given m types of delay amounts (m being an integer equal to or greater than 1);
performing predetermined binarization on said real-value sequence undelayed and on each of said m real-valued sequences to produce m+1 binary sequences; and
executing a predetermined logic operation based on said generated m+1 binary sequences to generate random variables.

20. The random variable generating method according to claim 19, wherein based on a plurality of random variables generated by said method according to claim 19, a predetermined logic operation is performed to generate random variables to be output.

21. A random variable generating method comprising the steps of:
generating a real-valued sequence along a chaotic orbit in accordance with a predetermined nonlinear map with a given real value as an initial seed;
performing binarization on each real value in said generated real-valued sequence with given 2M+1 (M being an integer equal to or greater than 1) values as thresholds to generate 2M+1 binary sequences, said 2M+1 thresholds $t_r$ (r=0 to 2M) satisfying relationships $t_r+t_{2M-r}=d+e$ and $t_i \neq t_j$ (when $i \neq j$) where d and e are respectively a minimum value and a maximum value said nonlinear map can take; and
executing a predetermined logic operation based on said generated 2M+1 binary sequences to generate random variables.

22. The random variable generating method according to claim 21, wherein said logic operation is an exclusive OR.

23. The random variable generating method according to claim 22, wherein said 2M+1 thresholds $t_r$ (r=0 to 2M) satisfy relationships $t_r+t_{2M-r}=d+e$ and $t_i \neq t_j$ (when $i \neq j$) where d and e are respectively a minimum value and a maximum value said nonlinear map can take.

24. The random variable generating method according to claim 21, wherein said nonlinear map has an equidistributivity of the invariant measure, symmetric property of the invariant measure and symmetric property of the map.

25. The random variable generating method according to claim 22, wherein said nonlinear map has an equidistributivity of the invariant measure, symmetric property of the invariant measure and symmetric property of the map.

26. The random variable generating method according to claim 21, wherein ideal random variables are produced by using, as said nonlinear map, one having an equidistributivity of the invariant measure, symmetric property of the invariant measure and symmetric property of the map, and permitting said 2M+1 thresholds $t_r$ (r=0 to 2M) to satisfy relationships $t_r+t_{2M-r}=d+e$ and $t_i \neq t_j$ (when $i \neq j$) where d and e are respectively a minimum value and a maximum value said nonlinear map can take.

27. The random variable generating method according to claim 22, wherein ideal random variables are produced by using, as said nonlinear map, one having an equidistributivity of the invariant measure, symmetric property of the invariant measure and symmetric property of the map, and permitting said 2M+1 thresholds $t_r$ (r=0 to 2M) to satisfy relationships $t_r+t_{2M-r}=d+e$ and $t_i \neq t_j$ (when i≠j) where d and e are respectively a minimum value and a maximum value said nonlinear map can take.

28. An enciphering apparatus comprising:
   real-valued sequence generation means for generating a real-valued sequence along a chaotic orbit in accordance with a predetermined nonlinear map using a real value, indicated by a first common key, as an initial seed;
   binarization means for performing binarization on each real value in said generated real-value sequence with 2M+1 (M being an integer equal to or greater than 1) values indicated by a second common key as thresholds to generate 2M+1 binary sequence, said 2M+1 thresholds $t_r$ (r=0 to 2M) satisfying relationships $t_r+t_{2M-r}=d+e$ and $t_i \neq t_j$ (when i≠j) where d and e are respectively a minimum value and a maximum value said nonlinear map can take;
   first logic operation means for executing a predetermined first logic operation based on said generated 2M+1 binary sequences to generate a keystream sequence; and
   second logic operation means for executing a predetermined second logic operation based on a binary sequence of a plaintext and said keystream sequence to generate a binary sequence of a ciphertext.

29. The enciphering apparatus according to claim 28, wherein said first logic operation and said second logic operation are both exclusive ORs.

30. The enciphering apparatus according to claim 28, wherein said nonlinear map has an equidistributivity of the invariant measure, symmetric property of the invariant measure and symmetric property of the map.

31. The enciphering apparatus according to claim 28, wherein ideal random variables are produced by using, as said nonlinear map, one having an equidistributivity of the invariant measure, symmetric property of the invariant measure and symmetric property of the map, and permitting said 2M+1 thresholds $t_r$ (r=0 to 2M) to satisfy relationships $t_r+t_{2M-r}=d+e$ and $t_i \neq t_j$ (when i≠j) where d and e are respectively a minimum value and a maximum value said nonlinear map can take.

32. An enciphering apparatus comprising:
   real-valued sequence generation means for generating a real-valued sequence along a chaotic orbit in accordance with a predetermined nonlinear map having an equidistributivity of the invariant measure, symmetric property of the invariant measure and symmetric property of the map, using a real value, indicated by a first common key, as an initial seed;
   binarization means for performing binarization on each real value in said generated real-valued sequence with 2M+1 (M being an integer equal to or greater than 1) values indicated by a second common key as thresholds to generate 2M+1 binary sequences;
   first exclusive OR means for performing an exclusive OR of said generated 2M+1 binary sequences to generate a keystream sequence; and
   second exclusive OR means for performing an exclusive OR of a binary sequence of a plaintext and said keystream sequence to generate a binary sequence of a ciphertext,
   whereby a binary sequence of ideal random variables is generated by using, as said nonlinear map, one having an equidistributivity of the invariant measure, symmetric property of the invariant measure and symmetric property of the map, and permitting said 2M+1 thresholds $t_r$ (r=0 to 2M) to satisfy relationships $t_r+t_{2M-r}=d+e$ and $t_i \neq t_j$ (when i≠j) where d and e are respectively a minimum value and a maximum value said nonlinear map can take.

33. The enciphering apparatus according to one of claim 28, wherein when said nonlinear map has a predetermined number of parameters, at least one of said parameters is used as a common key.

34. The enciphering apparatus according to one of claim 29, wherein when said nonlinear map has a predetermined number of parameters, at least one of said parameters is used as a common key.

35. The enciphering apparatus according to one of claim 28, wherein when said nonlinear map has a predetermined number of parameters, at least one of said parameters is used as a common key.

36. The enciphering apparatus according to one of claim 30, wherein when said nonlinear map has a predetermined number of parameters, at least one of said parameters is used as a common key.

37. The enciphering apparatus according to one of claim 31, wherein when said nonlinear map has a predetermined number of parameters, at least one of said parameters is used as a common key.

38. The enciphering apparatus according to one of claim 32, wherein when said nonlinear map has a predetermined number of parameters, at least one of said parameters is used as a common key.

39. The enciphering apparatus according to one of claim 28, wherein said nonlinear map is a Chebyshev map expressed by a differential equation $\omega_{n+1}=\cos(k \cos^{-1} \omega_n)$ where k is a real number equal to or greater than 2; and
   said first common key is information indicative of an initial seed $\omega_0$ of said Chebyshev map ($-1<\omega_0<1$) and said parameter k.

40. The enciphering apparatus according to one of claim 29, wherein said nonlinear map is a Chebyshev map expressed by a differential equation $\omega_{n+1}=\cos(k \cos^{-1} \omega_n)$ where k is a real number equal to or greater than 2; and
   said first common key is information indicative of an initial seed $\omega_n$ of said Chebyshev map ($-1<\omega_0<1$) and said parameter k.

41. The enciphering apparatus according to one of claim 28, wherein said nonlinear map is a Chebyshev map expressed by a differential equation $\omega_{n+1}=\cos(k \cos^{-1} \omega_n)$ where k is a real number equal to or greater than 2; and
   said first common key is information indicative of an initial seed $\omega_0$ of said Chebyshev map ($-1<\omega_0<1$) and said parameter k.

42. The enciphering apparatus according to one of claim 30, wherein said nonlinear map is a Chebyshev map expressed by a differential equation $\omega_{n+1}=\cos(k \cos^{-1} \omega_n)$ where k is a real number equal to or greater than 2; and
   said first common key is information indicative of an initial seed $\omega_0$ of said Chebyshev map ($-1<\omega_0<1$) and said parameter k.

43. The enciphering apparatus according to one of claim 31, wherein said nonlinear map is a Chebyshev map expressed by a differential equation $\omega_{n+1}=\cos(k \cos^{-1} \omega_n)$ where k is a real number equal to or greater than 2; and
   said first common key is information indicative of an initial seed $\omega_0$ of said Chebyshev map ($-1<\omega_0<1$) and said parameter k.

44. The enciphering apparatus according to one of claim 32, wherein said nonlinear map is a Chebyshev map expressed by a differential equation $\omega_{n+1} = \cos(k \cos^{-1} \omega_n)$ where k is a real number equal to or greater than 2; and said first common key is information indicative of an initial seed $\omega_0$ of said Chebyshev map ($-1 < \omega_0 < 1$) and said parameter k.

45. The enciphering apparatus according to claim 39, wherein said parameter k takes an even-numbered value.

46. The enciphering apparatus according to claim 40, wherein said parameter k takes an even-numbered value.

47. The enciphering apparatus according to claim 41, wherein said parameter k takes an even-numbered value.

48. The enciphering apparatus according to claim 42, wherein said parameter k takes an even-numbered value.

49. The enciphering apparatus according to claim 43, wherein said parameter k takes an even-numbered value.

50. The enciphering apparatus according to claim 44, wherein said parameter k takes an even-numbered value.

51. The enciphering apparatus according to one of claims 28, wherein said real-valued sequence generation means executes a program described in a predetermined language by using a floating-point computing device to generate a sequence of values of said nonlinear map.

52. The enciphering apparatus according to one of claims 29, wherein said real-valued sequence generation means executes a program described in a predetermined language by using a floating-point computing device to generate a sequence of values of said nonlinear map.

53. The enciphering apparatus according to one of claims 28, wherein said real-valued sequence generation means executes a program described in a predetermined language by using a floating-point computing device to generate a sequence of values of said nonlinear map.

54. The enciphering apparatus according to one of claims 30, wherein said real-valued sequence generation means executes a program described in a predetermined language by using a floating-point computing device to generate a sequence of values of said nonlinear map.

55. The enciphering apparatus according to one of claims 31, wherein said real-valued sequence generation means executes a program described in a predetermined language by using a floating-point computing device to generate a sequence of values of said nonlinear map.

56. The enciphering apparatus according to one of claims 32, wherein said real-valued sequence generation means executes a program described in a predetermined language by using a floating-point computing device to generate a sequence of values of said nonlinear map.

57. The apparatus according to claim 28, wherein said binarization means includes:

delay means for sequentially delaying said generated real-valued sequences in association with one or plural kinds of delay amounts indicated by a second common key; and a plurality of binarization means, provided in association with said real-valued sequence output from said real-valued sequence generation means and one or a plurality of real-valued sequences delayed by a predetermined amount and output by said delay means, for performing predetermined binarizations on individual real values in the associated real-valued sequences based on associated third common keys.

58. The enciphering apparatus according to claim 57, wherein said real-valued sequence generation means, said delay means, said plurality of binarization means and said first logic operation means are provided for each of a plurality of systems; and wherein said apparatus further comprises fourth logic operation means for performing a predetermined fourth logic operation based on a binary sequence output from said first logic operation means in each system to generate a keystream sequence, whereby based on a binary sequence of a plaintext and said keystream sequence, said second logic operation means performs said second predetermined logic operation to generate a binary sequence of a ciphertext.

59. The enciphering apparatus according to claim 57, wherein each of said plurality of binarization means includes binarization means for performing predetermined binarization on individual real values in the associated real-valued sequence using a plurality of values, indicated by that one of said third common keys which is associated with said binarization means, as thresholds to generate a plurality of binary sequences, and third logic operation means for performing predetermined third logic operation based on said plurality of generated binary sequences to generate said binary sequences to be given to said first logic operation means.

60. The enciphering apparatus according to claim 58, wherein each of said plurality of binarization means includes binarization means for performing predetermined binarization on individual real values in the associated real-valued sequence using a plurality of values, indicated by that one of said third common keys which is associated with said binarization means, as thresholds to generate a plurality of binary sequences, and third logic operation means for performing predetermined third logic operation based on said plurality of generated binary sequences to generate said binary sequences to be given to said first logic operation means.

61. The enciphering apparatus according to claim 57, wherein each of said plurality of binarization means binarizes individual real values in the associated real-valued sequence using a value, indicated by that one of said third common keys which is associated with said binarization means, as a threshold.

62. The enciphering apparatus according to claim 58, wherein each of said plurality of binarization means binarizes individual real values in the associated real-valued sequence using a value, indicated by that one of said third common keys which is associated with said binarization means, as a threshold.

63. The enciphering apparatus according to claim 57, wherein each of said plurality of binarization means binarizes individual real values in the associated real-valued sequence by selecting values at bit positions of values in binary representation, acquired by normalizing said real values in a predetermined range.

64. The enciphering apparatus according to claim 58, wherein each of said plurality of binarization means binarizes individual real values in the associated real-valued sequence by selecting values at bit positions of values in binary representation, acquired by normalizing said real values in a predetermined range.

65. An enciphering method comprising the steps of:

generating a real-valued sequence along a chaotic orbit in accordance with a predetermined nonlinear map having an equidistributivity of the invariant measure, symmetric property of the invariant measure and symmetric property of the map, using a real value, indicated by a first common key, as an initial seed;

performing binarization on each real value in said generated real-valued sequence with 2M+1 (M being an integer equal to or greater than 1) values indicated by a second common key as thresholds to generate 2M+1 binary sequences;

performing an exclusive OR of said generated 2M+1 binary sequences to generate a keystream sequence; and performing an exclusive OR of a binary sequence of a plaintext and said keystream sequence to generate a binary sequence of a ciphertext, whereby a binary sequence of ideal random variables is generated by using, as said nonlinear map, one having an equidistributivity of the invariant measure, symmetric property of the invariant measure and symmetric property of the map, and permitting said 2M+1 thresholds $t_r$ (r=0 to 2M) to satisfy relationships $t_r+t_{2M-r}=d+e$ and $t_i \neq t_j$ (when i≠j) where d and e are respectively a minimum value and a maximum value said nonlinear map can take.

66. A deciphering apparatus, comprising:

chaos generation means for generating a real-valued sequence along a chaotic orbit in accordance with a predetermined number of first common keys and a predetermined nonlinear map;

bit generation means for normalizing individual real values in said real-valued sequence over a predetermined interval and for binarizing said normalized real values using values indicated by a predetermined number of second common keys as thresholds to generate a binary sequence; and means for executing a predetermined logic operation on a binary sequence of an input ciphertext and said generated keystream sequence bit by bit to generate a binary sequence of an original ciphertext.

67. A keystream generating apparatus for use in a stream enciphering apparatus or a stream deciphering apparatus for performing a logic operation on a binary sequence of a plaintext or a ciphertext and a keystream sequence generated based on a predetermined common key to generate a ciphertext or an original plaintext, said keystream generating apparatus comprising:

chaos generation means for generating a real-valued sequence along a chaotic orbit in accordance with a predetermined number of first common keys and a predetermined nonlinear map; and bit generation means for normalizing individual real values in said real-valued sequence over a predetermined interval and for binarizing said normalized real values using values indicated by a predetermined number of second common keys as thresholds to generate to binary sequence.

68. An enciphering method comprising the steps of:

generating a real-valued sequence along a chaotic orbit in accordance with a predetermined number of first common keys and a predetermined nonlinear map;

normalizing individual real values in said real-valued sequence over a predetermined interval and binarizing said normalized real values using values indicated by a predetermined number of second common keys as thresholds to generate to binary sequence; and executing a predetermined logic operation on a binary sequence of an input plaintext and said generated keystream sequence bit by bit to generate a binary sequence of a ciphertext.

69. A deciphering method comprising the steps of:

generating a real-valued sequence along a chaotic orbit in accordance with a predetermined number of first common keys and a predetermined nonlinear map;

normalizing individual real values in said real valued sequence over a predetermined interval and binarizing said normalized real values using values indicated by a predetermined number of second common keys as thresholds to generate a binary sequence; and executing a predetermined logic operation on a binary sequence of an input ciphertext and said generated keystream sequence bit by bit to generate a binary sequence of an original plain text.

70. A keystream generating method for a keystream generating apparatus for use in a stream for use in a stream enciphering apparatus or a stream deciphering apparatus for performing a logic operation on a binary sequence of a plaintext or a ciphertext and a keystream sequence generated based on a predetermined common key to generate a ciphertext or an original plaintext, said keystream generating method comprising the steps of:

generating a real-valued sequence along a chaotic orbit in accordance with a predetermined number of first common keys and a predetermined nonlinear map and normalizing individual real values in said real-valued sequence over a predetermined interval and binarizing said normalized real values using values indicated by a predetermined number of second common keys as thresholds to generate a binary sequence.

71. A computer readable storage medium storing a program for generating a random variable and for controlling a computer, said program comprising:

a computer readable program code means for generating a real-valued sequence along a chaotic orbit in accordance with a predetermined number of first common keys and a predetermined nonlinear map;

a computer readable program code means for normalizing individual real values in said real-valued sequence over a predetermined interval and binarizing said normalized real values using values indicated by a predetermined number of second common keys to generate to binary sequence; and a computer readable program code means for executing a predetermined logic operation on a binary sequence of an input plaintext and the generated keystream sequence bit by bit to generate a binary sequence of a ciphertext.

72. A random variable generating apparatus comprising:

real-valued sequence generation means for generating a real-valued sequence along a chaotic orbit in accordance with a predetermined nonlinear map with a given real value as an initial seed;

binarization means for performing binarization on each real value in said generated real-valued sequence with given 2M+1 (M being an integer equal to or greater than 1) values as thresholds to generate 2M+1 binary sequence, said 2M+1 thresholds $t_r$ (r=0 to 2M) satisfying relationships $t_r+t_{2M-r}=d+e$ and $t_i \neq t_j$ (when i≠j) where d and e are respectively a minimum value and a maximum value said nonlinear map can take; and logic operation means for executing a predetermined logic operation based on said generated 2M+1 binary sequence to generate random variables.

73. A storage medium readable by a computer and having stored a program for generating random variables and controlling said computer in such a manner as to generate a real-valued sequence along a chaotic orbit in accordance with a predetermined nonlinear map with a given real value as an initial seed;

perform binarization on each real value in said generated real-valued sequence with given 2M+1 (M being an integer equal to or greater than 1) values as thresholds to generate 2M+1 binary sequences, said 2M+1 thresholds $t_r$ (r=0 to 2M) satisfying relationships $t_r+t_{2M-r}$=d+e and $t_i \neq t_j$ (when i≠j) where d and e are respectively a minimum value and a maximum value said nonlinear map can take; and execute a predetermined logic operation based on said generated 2M+1 binary sequence to generate random variables.

74. A deciphering apparatus comprising:

real-valued sequence generation means for generating a real-valued sequence along a chaotic orbit in accordance with a predetermined nonlinear map using a real value, indicated by a first common key, as an initial seed;

binary sequence generation means for performing binarization on each real value in said generated real-valued sequence with 2M+1 ( M being an integer equal to or greater than 1) values indicated by a second common key as thresholds to generate 2M+1 binary sequences, said 2M+1 thresholds $t_r$ (r=0 to 2M) satisfying relationships $t_r+t_{2M-r}$=d+e and $t_i \neq t_j$ (when i≠j) where d and e are respectively a minimum value and a maximum value said nonlinear map can take;

first logic operation means for executing a predetermined first logic operation based on said generated 2M+1 binary sequences to generate a keystream sequence; and second logic operation means for executing a predetermined second logic operation based on a binary sequence of a ciphertext and said keystream sequence to generate a binary sequence of a plaintext.

75. A keystream generating apparatus for use in a stream enciphering apparatus or a stream deciphering apparatus for performing a logic operation on a binary sequence of a plaintext or a ciphertext and a keystream sequence generated based on a predetermined common key to generate a ciphertext or an original plaintext, said keystream generating apparatus comprising:

real-valued sequence generation means for generating a real-valued sequence along a chaotic orbit in accordance with a predetermined nonlinear map using a real value, indicated by a first common key, as an initial seed;

binary sequence generation means for performing binarization on each real value in said generated real-valued sequence with 2M+1 (M being an integer equal to or greater than 1) values indicated by a second common key as thresholds to generate 2M+1 binary sequences, said 2M+1 thresholds $t_r$ (r=0 to 2M) satisfying relationships $t_r+t_{2M-r}$=d+e and $t_i \neq t_j$ (when i≠j) where d and e are respectively a minimum value and a maximum value said nonlinear map can take; and logic operation means for executing a predetermined logic operation based on said generated 2M+1 binary sequences to generate a keystream sequence.

76. An enciphering method comprising the steps of:

generating a real-valued sequence along a chaotic orbit in accordance with a predetermined nonlinear map using a real value, indicated by a first common key, as an initial seed;

performing binarization on each real value in said generated real-valued sequence with 2M+1 (M being an integer equal to or greater than 1) values indicated by a second common key as thresholds to generate 2M+1 binary sequence, said 2M=+1 thresholds $t_r$ (r=0 to 2M) satisfying relationships $t_r+t_{2M-r}$=d+e and $t_i \neq t_j$ (when i≠j) where d and e are respectively a minimum value and a maximum value said nonlinear map can take;

executing a predetermined first logic operation based on said generated 2M+1 binary sequences to generate a keystream sequence; and executing a predetermined second logic operation based on a binary sequence of a plaintext and said keystream sequence to generate a binary sequence of a ciphertext.

77. A deciphering method comprising the steps of:

generating a real-valued sequence along a chaotic orbit in accordance with a predetermined nonlinear map using a real value, indicated by first common key, as an initial seed;

performing binarization on each real value in said generated real-valued sequence with 2M +1 (M being an integer equal to or greater than 1) values indicated by a second common key as thresholds to generate 2M+1 binary sequences, said 2M+1 thresholds $t_r$ (r=0 to 2M) satisfying relationships $t_r+t_{2M-r}$=d+e and $t_i \neq t_j$ (when i≠j) where d and e are respectively a minimum value and a maximum value said nonlinear map can take;

executing a predetermined first logic operation based on said generated 2M+1 binary sequences to generate a keystream sequence; and executing a predetermined second logic operation based on a binary sequence of a ciphertext and said keystream sequence to generate a binary sequence of a plaintext.

78. A keystream generating method in a keystream generating apparatus for use in a stream enciphering apparatus or a stream deciphering apparatus for performing a logic operation on a binary sequence of a plaintext or a ciphertext and a keystream sequence generated based on a predetermined common key to generate a ciphertext or an original plaintext, said keystream generating method comprising the steps of:

generating a real-valued sequence along a chaotic orbit in accordance with a predetermined nonlinear map using a real value, indicated by a first common key, as an initial seed;

performing binarization on each real value in said generated real-valued sequence with 2M+1 (M being an integer equal to or greater than 1) values indicated by a second common key as thresholds to generate 2M+1 binary sequences, said 2M+1 thresholds $t_r$ (r=0 to 2M) satisfying relationships $t_r+t_{2M-r}$=d+e and $t_i \neq t_j$ (when i≠j) where d and e are respectively a minimum value and a maximum value said nonlinear map can take; and executing a predetermined logic operation based on said generated 2M+1 binary sequences to generate a keystream sequence.

* * * * *

UNITED STATES PATENT AND TRADEMARK OFFICE
CERTIFICATE OF CORRECTION

PATENT NO.   : 6,014,445
DATED        : January 11, 2000
INVENTOR(S)  : Tohru Kohda et al.

It is certified that error appears in the above-identified patent and that said Letters Patent is hereby corrected as shown below:

Column 54,
Line 45, "$\omega_n$" should read -- $\omega_o$ --.

Signed and Sealed this

Thirteenth Day of August, 2002

Attest:

JAMES E. ROGAN
*Attesting Officer*    *Director of the United States Patent and Trademark Office*